(12) United States Patent
Thompson et al.

(10) Patent No.: US 7,827,090 B2
(45) Date of Patent: *Nov. 2, 2010

(54) APPARATUS AND METHOD FOR DISPLAYING TRADING TRENDS

(75) Inventors: George Thompson, Carrollton, TX (US); George Schardt, Plano, TX (US)

(73) Assignee: WGAL, LLC, Plano, TX (US)

( * ) Notice: Subject to any disclaimer, the term of this patent is extended or adjusted under 35 U.S.C. 154(b) by 1413 days.

This patent is subject to a terminal disclaimer.

(21) Appl. No.: 10/691,257

(22) Filed: Oct. 22, 2003

(65) Prior Publication Data

US 2004/0128225 A1    Jul. 1, 2004

Related U.S. Application Data

(63) Continuation-in-part of application No. 09/888,040, filed on Jun. 23, 2001, now abandoned.

(60) Provisional application No. 60/213,576, filed on Jun. 22, 2000.

(51) Int. Cl.
*G06Q 40/00* (2006.01)

(52) U.S. Cl. ...................................................... 705/37

(58) Field of Classification Search ...................... 705/37
See application file for complete search history.

(56) References Cited

U.S. PATENT DOCUMENTS

| | | | | |
|---|---|---|---|---|
| 5,347,452 | A * | 9/1994 | Bay, Jr. .......................... | 705/37 |
| 5,689,651 | A * | 11/1997 | Lozman ......................... | 705/37 |
| 5,897,621 | A * | 4/1999 | Boesch et al. .................. | 705/26 |
| 6,211,880 | B1 * | 4/2001 | Impink, Jr. ..................... | 345/418 |
| 6,665,558 | B2 * | 12/2003 | Kalgren et al. ............... | 600/510 |
| 6,772,132 | B1 | 8/2004 | Kemp, II et al. | |
| 6,772,146 | B2 * | 8/2004 | Khemlani et al. ......... | 705/36 R |
| 6,792,399 | B1 | 9/2004 | Phillips et al. | |
| 6,882,985 | B1 * | 4/2005 | Kay et al. ....................... | 705/37 |
| 6,897,867 | B2 * | 5/2005 | Katayama .................... | 345/440 |
| 7,043,449 | B1 * | 5/2006 | Li et al. ...................... | 705/36 R |
| 7,130,789 | B2 * | 10/2006 | Glodjo et al. ................. | 705/37 |
| 7,171,384 | B1 | 1/2007 | Fitzpatrick et al. | |

(Continued)

OTHER PUBLICATIONS

Bruce Babcock: Trend Indicators and Price Components: Reality Based Trading Company, 1999, pp. 1-3.*

(Continued)

*Primary Examiner*—Hani Kazimi
*Assistant Examiner*—Bijendra K Shrestha
(74) *Attorney, Agent, or Firm*—Daniel J. Chalker; Chalker Flores, LLP

(57) ABSTRACT

The present invention provides an apparatus and method of determining and displaying trading trends for one or more currency pairs wherein an opening value and a closing value for the one or more currency pairs for two or more time intervals is obtained. An opening value trend using a market trend indicator and the opening values for the investment is calculated, and a closing value trend using the market trend indicator and the closing values for the one or more currency pairs is calculated. A visual indicator comparing the opening value trend to the closing value trend for the one or more currency pairs is then displayed. This method may be incorporated into a computer program embodied in a computer readable medium using code segments to accomplish the method described above.

37 Claims, 32 Drawing Sheets

U.S. PATENT DOCUMENTS

| | | | | |
|---|---|---|---|---|
| 7,194,434 B2 * | 3/2007 | Piccioli | ................... | 705/36 R |
| 2001/0042037 A1 * | 11/2001 | Kam et al. | ................... | 705/36 |
| 2001/0056398 A1 * | 12/2001 | Scheirer | ................... | 705/38 |
| 2002/0055899 A1 * | 5/2002 | Williams | ................... | 705/37 |
| 2002/0069152 A1 * | 6/2002 | B.C et al. | ................... | 705/37 |
| 2002/0087455 A1 * | 7/2002 | Tsagarakis et al. | ................... | 705/37 |
| 2002/0156722 A1 * | 10/2002 | Greenwood | ................... | 705/37 |
| 2002/0161692 A1 * | 10/2002 | Loh et al. | ................... | 705/37 |
| 2002/0184134 A1 | 12/2002 | Olsen | | |
| 2002/0194114 A1 * | 12/2002 | Erdmier | ................... | 705/37 |
| 2003/0088495 A1 * | 5/2003 | Gilbert et al. | ................... | 705/37 |
| 2007/0078755 A1 * | 4/2007 | Olsen et al. | ................... | 705/37 |

OTHER PUBLICATIONS

Kathy et al.: Trading currencies using multiple time frames, 2004, Stock & Commodities, vol. 22 :11, pp. 60-65.*

* cited by examiner

FRESH CROSS OR BOUNCE

STRONG ANGLE OF MOMENTUM

GOOD SEPARATION BETWEEN GREEN AND RED LINE

APPARATUS AND METHOD FOR DISPLAYING TRADING TRENDS

PRIORITY CLAIM

This patent application is a continuation-in-part of U.S. patent application Ser. No. 09/888,040 filed on Jun. 22, 2001, which is a U.S. non-provisional patent application of U.S. provisional patent application serial No. 60/213,576 filed on Jun. 22, 2000.

FIELD OF THE INVENTION

The present invention relates in general to the field of investment software and more particularly to an apparatus and method for providing a visual display of a two-line crossover method signaling buying and selling opportunities of foreign currency pairs in the foreign exchange—called FOREX for short.

BACKGROUND OF THE INVENTION

Our world consists of several national currencies and as individuals or companies from one country trade across borders, the need for foreign currency arises. The foreign exchange market plays a key role in transferring financial payments across borders and moving funds and purchasing power from one currency to another. The movement of different currencies between countries determines a very important price: the exchange rate. It is the exchange rate that allows the currencies to be traded for profit. The foreign exchange is not a physical exchange, but an electronic structure. The (spot) FOREX market is open 24 hours a day, from Sunday evening through Friday afternoon (North American time).

Virtually all large institutions and professional traders conduct most of their foreign exchange dealing in the (spot) FOREX market. The (spot) FOREX market pairs together currencies from different countries and quotes them according to the values of the respective currency. In the example of one common current pair, EUR/USD, the First Currency (EUR-Euro) is known as the Base Currency. It shows how much the Base Currency is worth as measured against the Second Currency (USD—US Dollar). For example, if the EUR/USD rate equals 0.9762, then one Euro is worth 0.9762 US Dollar. If a trader believes that the US Dollar will rise in relation to the Euro, the trader would sell EUR/USD. That is, sell the Euro and buy the US Dollar.

With the advent of electronic trading, it is more critical than ever to make appropriate entry and exit decisions quickly to maximize profits while minimizing losses. This is especially true with day trading. The investor can also be easily overwhelmed by the vast amount of information available about a specific market, industry sector or investment. In addition, when investors trade the live market without any trend indication relative to the foreign currency pair being traded, they are not trading with the trend. The foreign currency pair price, therefore, will move further against the investor's entry point and thousands of dollars can be lost while the investor waits for the movement to come back their way. If the investor is long in the exchange pair, but the trend is short, the foreign currency pair movement may never return the investor's way.

There is, therefore, a need for an apparatus and method to analyze market data (e.g., (spot) FOREX data) and develop trade information, which reduces the risk and loss for the investor. There is also a need for an apparatus and method to provide the investor with greater order entry/exit guidance than might be received through a broker or through monitoring the raw market data.

SUMMARY OF THE INVENTION

The present invention relates to investment software and provides an apparatus and method for displaying trading trends for investments, such as foreign currency pairs. Such an apparatus and method can be used, for example, to display signals for buying and selling opportunities of stocks, bonds and commodities (e.g., foreign currency pairs). The present invention can be used by anyone interested in investments, such as individual investors or investment brokers. As a result, the present invention provides an apparatus and method for minimizing risk when trading in a market, such as the (spot) FOREX market, displaying movements and trends of investment, such as foreign currency pairs, and identifying investment, such as currency pairs, that have a specific trend.

The present invention can be used to analyze market data, such as (spot) FOREX market data, and develop trade information, which reduces the risk and loss for the investor. Thus, traders of stocks, bonds and commodities (e.g., foreign currency pairs) can manage their investment portfolios from their home, office or location of their choice. By providing them with greater order entry/exit guidance than might be received through a broker or through calculating or monitoring their own raw data, the present invention enables the trader to make better trade decisions because it is easier to track the performance of investments, such as foreign currency pairs.

With respect to the FOREX market for example, the present invention allows the investor to customize buttons for certain time-related queries that will output trade date which may be more in line with the investor's style of trading. There are, however, predefined settings that may not be adjusted by the user. The user may also customize which pairs of foreign currencies appear foremost on the present invention, although the set of available foreign currency pairs from which to chose is predetermined.

In addition, the present invention extrapolates trade trends in a selected foreign currency pair and provides the investor with current exchange rate information, up-to-the-second currency valuations, trade trends, trade indicators, fundamental information relative to the foreign currency pairs and active trade information. The investor can watch for an intersection cross of the trade trends and, guided by colors, take the appropriate action. For example, the color green may indicate that the value of the base currency is going up and signal the investor that it is time to enter into a long trade of that currency pair. Conversely, the color red may indicate that the value of the base currency is going down and signal the investor that it is time to enter into a short trade or exit a current trade for that currency pair. Other colors can be used. The present invention also shows the high value and low value of the base currency for during the past 48 hours, current bid and current ask. Trade indicators with customizable time intervals are also color coded. These time intervals allow the investor to monitor the time to best apply the trade.

The present invention allows the investor to access market information or trade data via Internet web sites, dial-up and other network connections and enter the symbol for a security to view a two-line crossover chart indicating the trend of the currency pair. Based upon the chart, the investor selects various strategies which display data indicating desirable trade opportunities. Locating and identifying these trend friendly trades reduces risk. The present invention will also alert the investor when an exit of an investment should occur.

The present invention allows the investor to save the information on completed trades, whether real or practice, in order for the investor to become more proficient in trading with this apparatus and method. The present invention can be used by the investor to calculate leverage, risk/reward ratio and placement of stops for protection of the investor's profits and limitation of loss.

The present invention also allows the investor to practice trades in a live market environment without risking capital. The present invention obtains trade data form the selected market(s) and continuously updates the information provided to the investor each time an investment purchase or sell transaction occurs. Using this information, the present invention provides the entry, exit and trend data to the investor.

The present invention provides an apparatus for determining and displaying trading trends for one or more currency pairs having a computer and a display. The computer is communicably connected to a market information source, and the display is communicably connected to the computer. The computer receives an opening value and a closing value for the one or more currency pairs for two or more time intervals from the market information source, calculates an opening value trend using a market trend indicator and the opening values for the one or more currency pairs, calculates a closing value trend using the market trend indicator and the closing values for the one or more currency pairs, and displays a visual indicator comparing the opening value trend to the closing value trend for the one or more currency pairs on the display.

In addition, the present invention provides a method of determining and displaying trading trends for one or more currency pairs. Market information is obtained for one or more currency pairs for two or more time intervals. An opening value trend is calculated using a market trend indicator and the opening values for the one or more currency pairs. A closing value trend is also calculated using the market trend indicator and the closing values for the one or more currency pairs. Thereafter, a visual indicator is displayed comparing the opening value trend to the closing value trend for the one or more currency pairs. This method may be incorporated into a computer program embodied in a computer readable medium using code segments to accomplish the method described above.

Other features and advantages of the present invention will be apparent to those of ordinary skill in the art upon reference to the following detailed description taken in conjunction with the accompanying drawings.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts in which.

DETAILED DESCRIPTION OF THE INVENTION

Figure 1:
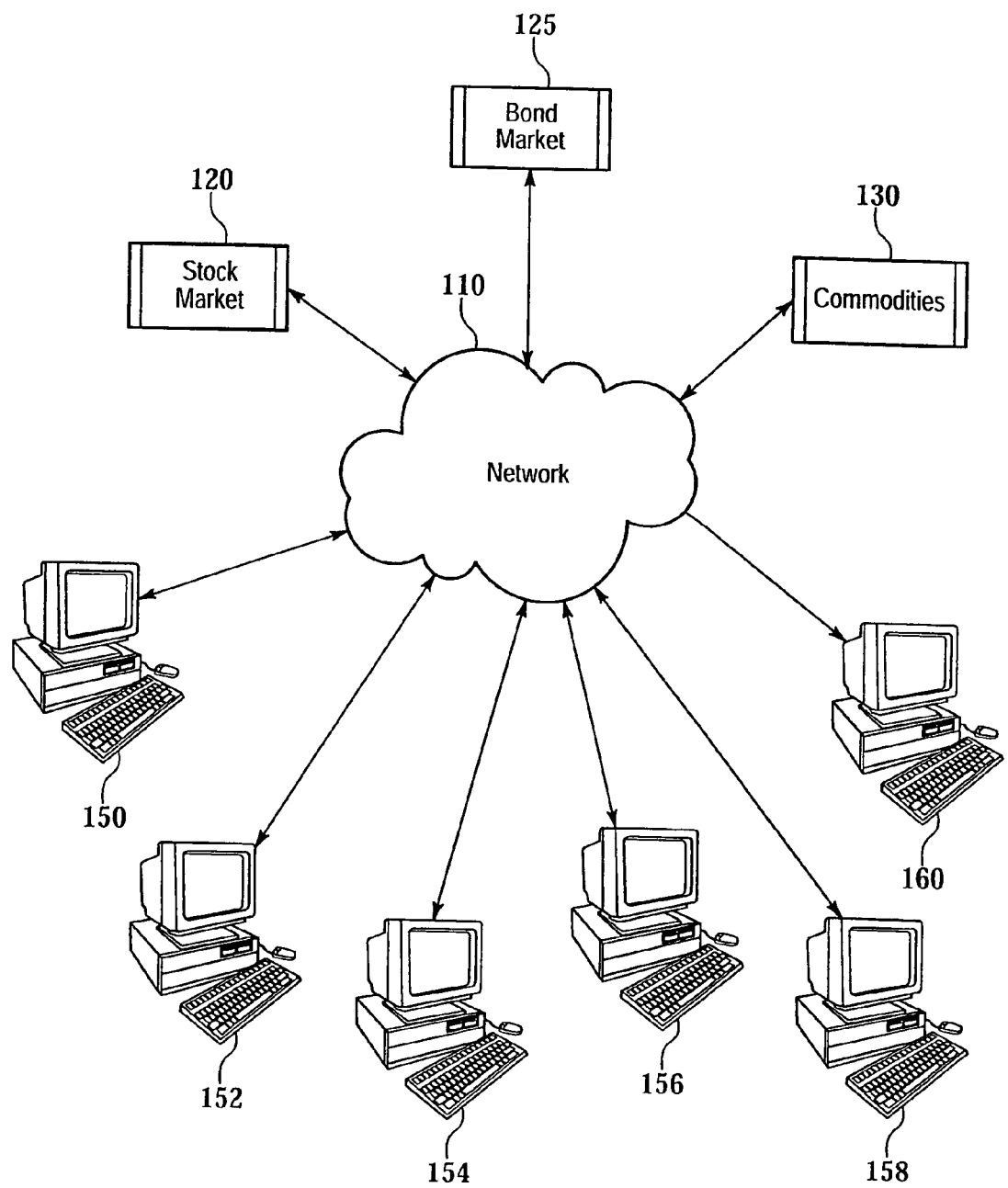
FIG. 1 is a block diagram illustrating the possible interaction between data systems in accordance with one embodiment of the present invention.

It should be understood that the principles and applications disclosed herein can be applied to a wide range of trading scenarios, such as stocks, bonds and commodities. For purposes of explanation and illustration, the present invention is hereafter described in reference to the management of investment portfolios. The present invention relates to investment software and provides an apparatus and method for displaying trading trends for investments, such as foreign currency pairs. Such an apparatus and method can be used, for example, to display signals for buying and selling opportunities of stocks, bonds and commodities (e.g., foreign currency pairs). The present invention can be used by anyone interested in investments, such as individual investors or investment brokers. As a result, the present invention provides an apparatus and method for minimizing risk when trading in a market, such as the (spot) FOREX market, displaying movements and trends of investment, such as foreign currency pairs, and identifying investment, such as currency pairs, that have a specific trend.

The present invention can be used to analyze market data, such as (spot) FOREX market data, and develop trade information, which reduces the risk and loss for the investor. Thus, traders of stocks, bonds and commodities (e.g., foreign currency pairs) can manage their investment portfolios from their home, office or location of their choice. By providing them with greater order entry/exit guidance than might be received through a broker or through calculating or monitoring their own raw data, the present invention enables the trader to make better trade decisions because it is easier to track the performance of investments, such as foreign currency pairs.

With respect to the FOREX market for example, the present invention allows the investor to customize buttons for certain time-related queries that will output trade date which may be more in line with the investor's style of trading. There are, however, predefined settings that may not be adjusted by the user. The user may also customize which pairs of foreign currencies appear foremost on the present invention, although the set of available foreign currency pairs from which to chose is predetermined.

In addition, the present invention extrapolates trade trends in a selected foreign currency pair and provides the investor with current exchange rate information, up-to-the-second currency valuations, trade trends, trade indicators, fundamental information relative to the foreign currency pairs and active trade information. The investor can watch for an intersection cross of the trade trends and, guided by colors, take the appropriate action. For example, the color green may indicate that the value of the base currency is going up and signal the investor that it is time to enter into a long trade of that currency pair. Conversely, the color red may indicate that the value of the base currency is going down and signal the investor that it is time to enter into a short trade or exit a current trade for that currency pair. Other colors can be used. The present invention also shows the high value and low value of the base currency for during the past 48 hours, current bid and current ask. Trade indicators with customizable time intervals are also color coded. These time intervals allow the investor to monitor the time to best apply the trade.

The present invention allows the investor to access market information or trade data via Internet web sites, dial-up and other network connections and enter the symbol for a security to view a two-line crossover chart indicating the trend of the currency pair. Based upon the chart, the investor selects various strategies which display data indicating desirable trade opportunities. Locating and identifying these trend friendly trades reduces risk. The present invention will also alert the investor when an exit of an investment should occur.

The present invention allows the investor to save the information on completed trades, whether real or practice, in order for the investor to become more proficient in trading with this apparatus and method. The present invention can be used by the investor to calculate leverage, risk/reward ratio and placement of stops for protection of the investor's profits and limitation of loss.

The present invention also allows the investor to practice trades in a live market environment without risking capital. The present invention obtains trade data form the selected market(s) and continuously updates the information provided to the investor each time an investment purchase or sell transaction occurs. Using this information, the present invention provides the entry, exit and trend data to the investor.

Now referring to FIG. 1, a block diagram illustrating the possible interaction between data systems in accordance with one embodiment of the present invention is shown. Investors 150, 152, 154, 156, 158 and 160 interact with the various investment markets (Stocks) 120, (Bonds) 125 and (Commodities (e.g., foreign exchange)) 130 via network 110, which may comprise any typical communications network such as telephone, Internet, satellite or any combination thereof. Access to the market information sources or markets 120, 125 and 130 can be achieved through a service specific to each market, or through a third-party server that will allow access to one or more of the markets 120, 125 or 130. Investors 150, 152, 154, 156, 158 and 160 can access the network 110 using a personal computer, workstation or laptop computer. The present invention can be implemented as an application on each investor's computer 150-160, or as a server-based application accessible by investors 150-160 via a network or other communications link. The number of investors 150, 152, 154, 156, 158 and 160 shown in FIG. 1 is simply representative and does not indicate a limitation on the number of investors that may use the present invention at a given time. Nor is the number of investment types or markets 120, 125 and 130 intended to limit the number or types of investments that may analyzed with the present invention.

In one method of accessing the present invention, a personal computer 150-160 equipped with a modem can be used to obtain this data from the market information source or market 120, 125 and 130 via the network 110 at a fee for the exchange in a manner well known in the art. A subscription to a real-time or near-real-time investment reporting system is needed. An example of such a system is PCQuote, which interfaces with the Taltrade ActiveX components. The Taltrade components execute Taltrade Query Language (TQL) commands. These commands retrieve investment information from the markets in real-time. The present invention can use data from multiple sources. The minimum system requirements for a personal computer would be Windows 98/ME/2000/XP/NT 4.0 (Service Pack 3), 64 MB RAM, CD-ROM, 25 MB available hard drive space, an Internet connection and Level I or Level II data feed. The recommended system requirements for a personal computer would be Windows XP, 128 MB RAM, CD-ROM, 25 MB available hard drive space and a high speed Internet connection such as: ISDN, DSL, T1, T3 or cable; or better.

Figure 2:
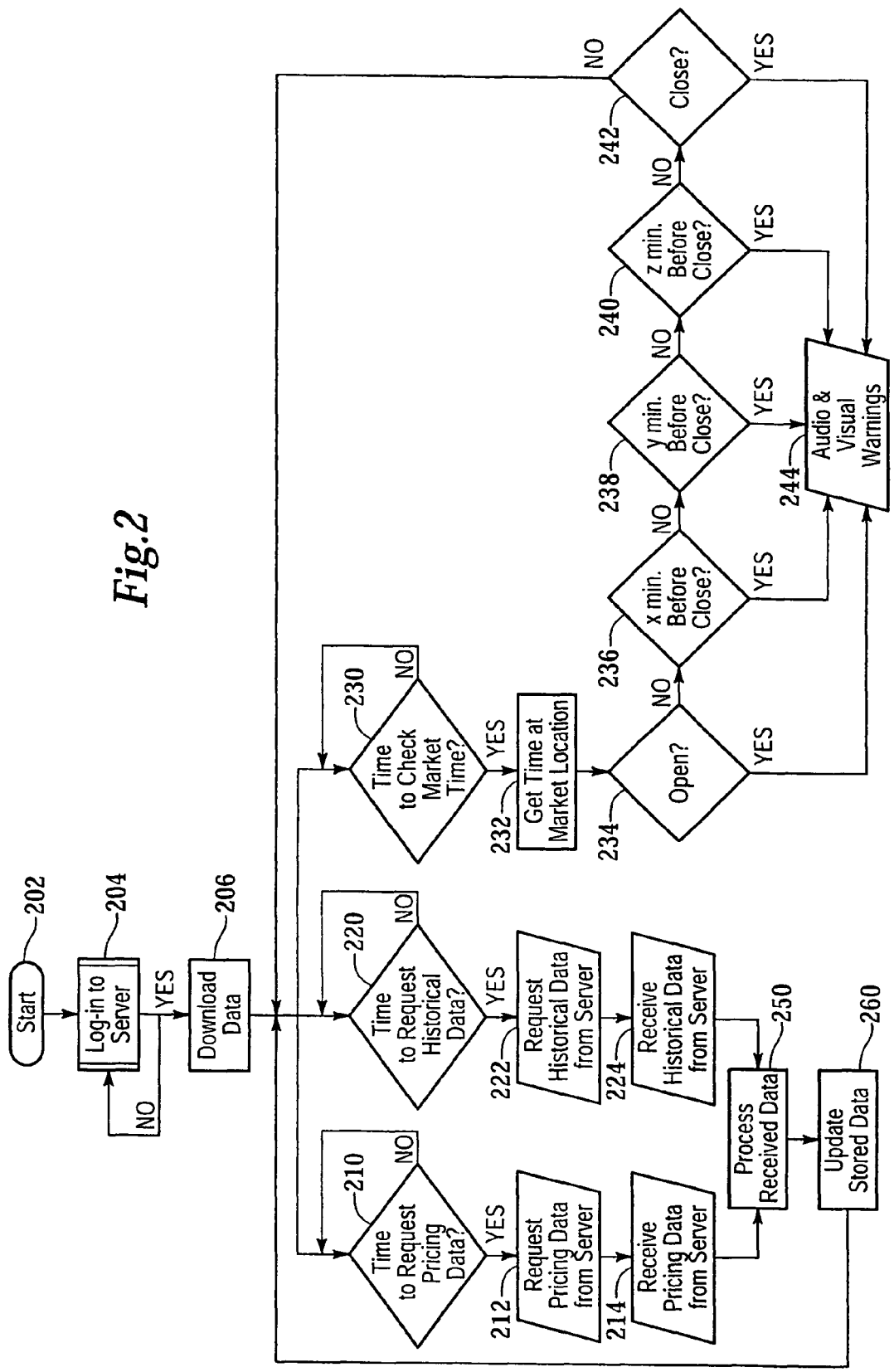
FIG. 2 is a flowchart illustrating the data update process in accordance with one embodiment of the present invention.

Referring now to FIG. 2, a flowchart illustrating the data update process in accordance with one embodiment of the present invention is shown. The present invention starts in block 202 where the investor 150-160 (FIG. 1) selects one or more markets 120, 125 or 130 (FIG. 1) to connect to. The specific servers that may be connected to and the details regarding the connection to be established are typically setup during the installation process of the software. The investor 150-160 (FIG. 1) can change, add or delete available connections and/or markets. Next, the present invention prompts the investor to log-on to a server, which preferably supplies investment information updates in real-time or near-real-time 204. At this point, the present invention downloads investment information in block 206. The download can be performed in a variety of ways. For example, the data may be requested on a regularly scheduled basis, such as every 10 seconds, or in response to the occurrence of some selected event, such as a mouse click. Alternatively, the data may be sent from the market 120, 125, 130 (FIG. 1) or other data source to the investor 150-160 (FIG. 1) on a regularly scheduled basis or in response to the occurrence of some selected event, such as a change in the data. The data request commands are executed on a regular basis by two application timer controls 210 and 220, which send requests to the server at regular intervals via controls 212 and 222. Controls 214 and 224 receive the results from the queries. The results are preferably returned from servers in an asynchronous manner. That is, the requests do not have to wait on the returned data. Windows events are fired when the results are returned. The present invention then processes the received data 250, which is used to update the stored pricing and volume data 260. Historical data that is retrieved from the server is also used to update the stored data 260.

It is beneficial for the investor to be aware of the time at the market location because trading cannot occur prior to the opening of a given market nor after its close. Therefore, a way to notify the investor of the given market's opening and to warn the investor of the given market's impending close also improves the investor's ability to make trade decision. In a preferred embodiment shown in FIG. 2, application timer 230 monitors the time at the market location 232 in order to notify the investor of the opening of the market Setpoint 234 and at several intervals approaching the close of the market Setpoints 236, 238, 240 and 242. If the time at the market location 232 equals the time in any of Setpoints 234, 236, 238, 240 and 242, the investor is notified 244. For example, the opening of the market Setpoint 234 could be 10 a.m., while the intervals approaching the close of the market Setpoints 236, 238, 240 and 242 could be 3:30 p.m., 3:45 p.m., 3:55 p.m. and close at 4 p.m., respectively.

Figure 3:
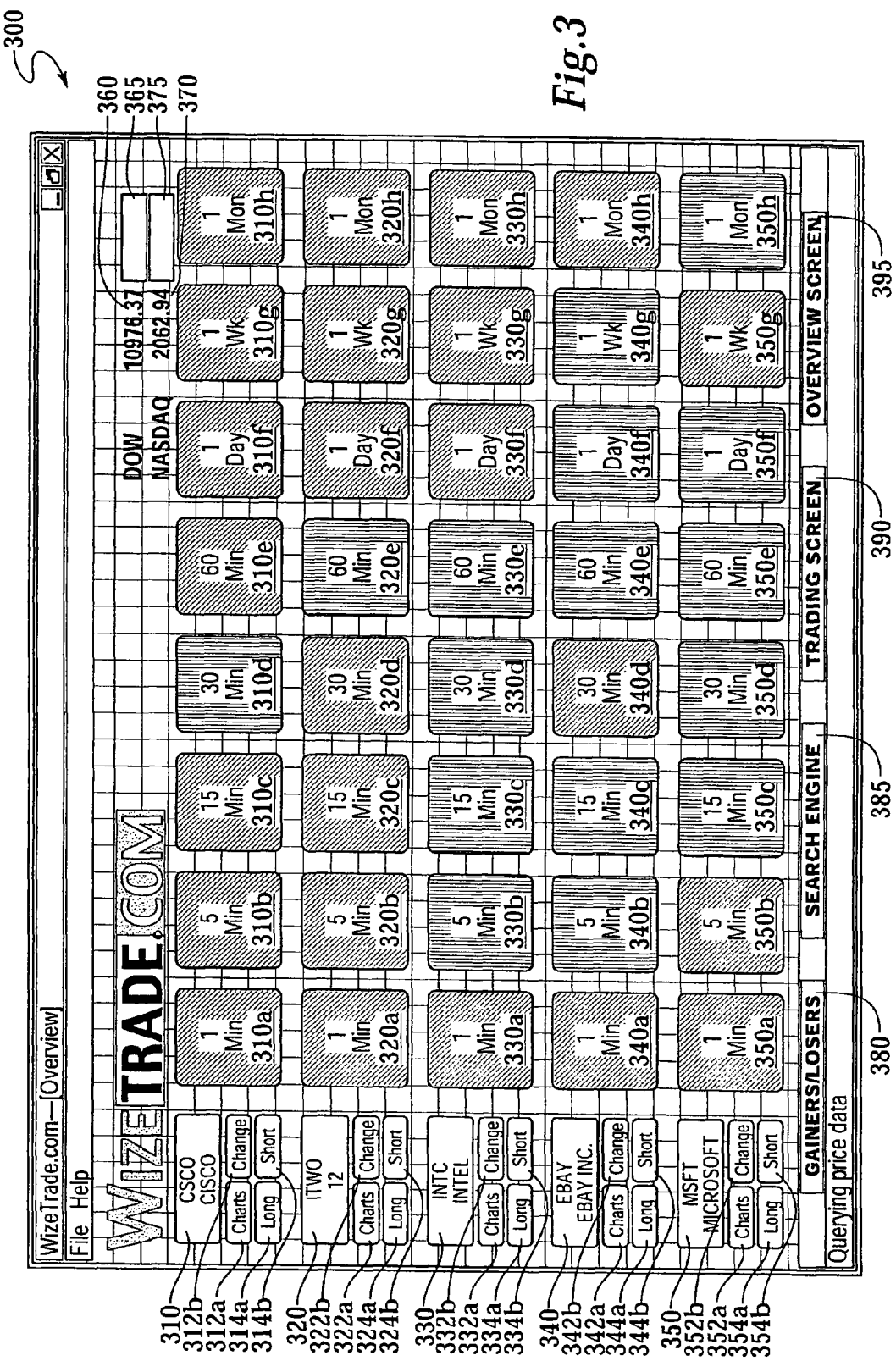
FIG. 3 is the Overview Screen in Overview Mode in accordance with one embodiment of the present invention.

FIG. 3 is the Overview Screen 300 in Overview Mode in accordance with one embodiment of the present invention. The Overview Screen 300 enables the investor to recognize trends and directional movements. This screen is visible most of the time. Overview Screen 300 contains information about several selected investments 310, 320, 330, 340 and 350. In this example, investment 310 is Cisco, 320 is I2, 330 is Intel, 340 is Ebay and 350 is Microsoft. Color coded indicators 310a-310h, 320a-320h, 330a-330h, 340a-340h and 350a-350h are displayed for each of the selected investments 310, 320, 330, 340 and 350. These indicators are preferably laid out in a grid fashion, but can be otherwise configured. Each indicator 310a-310h, 320a-320h, 330a-330h, 340a-340h and 350a-350h represents information for an associated single investment. Each indicator 310a-310h, 320a-320h, 330a-330h, 340a-340h and 350a-350h displays the chosen time interval for that indicator. Time intervals may be in minutes, hours, days, weeks or months. In the example shown, the time interval for indicators 310a, 320a, 330a, 340a and 350a is one minute; the time interval for indicators 310b, 320b, 330b, 340b and 350b is five minutes; the time interval for indicators 310c, 320c, 330c, 340c and 350c is fifteen minutes; the time interval for indicators 310d, 320d, 330d, 340d and 350d is thirty minutes; the time interval for indicators 310e, 320e, 330e, 340e and 350e is sixty minutes; the time interval for indicators 310f, 320f, 330f, 340f and 350f is one day; the time interval for indicators 310g, 320g, 330g, 340g and 350g is one week; and the time interval for indicators 310h, 320h, 330h, 340h and 350h is one month.

As will be described below in reference to FIG. 5, the present invention uses a regression analysis to calculate an opening value trend and a closing value trend for each of the time intervals for each of the investments 310, 320, 330, 340 and 350. The color of the indicators 310a-h, 320a-h, 330a-h, 340a-h and 350a-h is based on a comparison of the opening value trend to the closing value trend for each time interval for each investment 310, 320, 330, 340 and 350, and whether a long trade 314a, 324a, 334a, 344a and 354a or short trade 314b, 324b, 334b, 344b and 354b has been selected. If a long trade 314a, 324a, 334a, 344a and 354a is selected, the indicators 310a-h, 320a-h, 330a-h, 340a-h and 350a-h will be first color when the closing value trend is greater than the opening value trend for each time interval for each investment 310, 320, 330, 340 and 350, and a second color when the closing value trend is less than the opening value trend for each time interval for each investment 310, 320, 330, 340 and 350. For example, indicators 310a, 310b, 310c, 310e, 310f, 310g, 310h, 320a, 320b, 320c, 320d, 320f, 320g, 320h, 330a, 330f, 330g, 330h, 340a, 340d, 340h, 350a, 350b and 350g are green in FIG. 3 indicating favorable trading conditions for investments 310, 320, 330, 340 and 350 within the specified time intervals. Indicators 310d, 320e, 330b, 330c, 330d, 330e, 340b, 340c, 340e, 340f, 340g, 350c, 350d, 350e, 350f and 350h are red in FIG. 3 indicating unfavorable trading conditions for investments 310, 320, 330, 340 and 350 within the specified time intervals. If, however, a short trade 314b, 324b, 334b, 344b and 354b is selected, the indicators 310a-h, 320a-h, 330a-h, 340a-h and 350a-h will be the first color when the closing value trend is less than the opening value trend for each time interval for each investment 310, 320, 330, 340 and 350, and the second color when the closing value trend is greater than the opening value trend for each time interval for each investment 310, 320, 330, 340 and 350. Other colors may be used as the first color or the second color.

Figure 6:
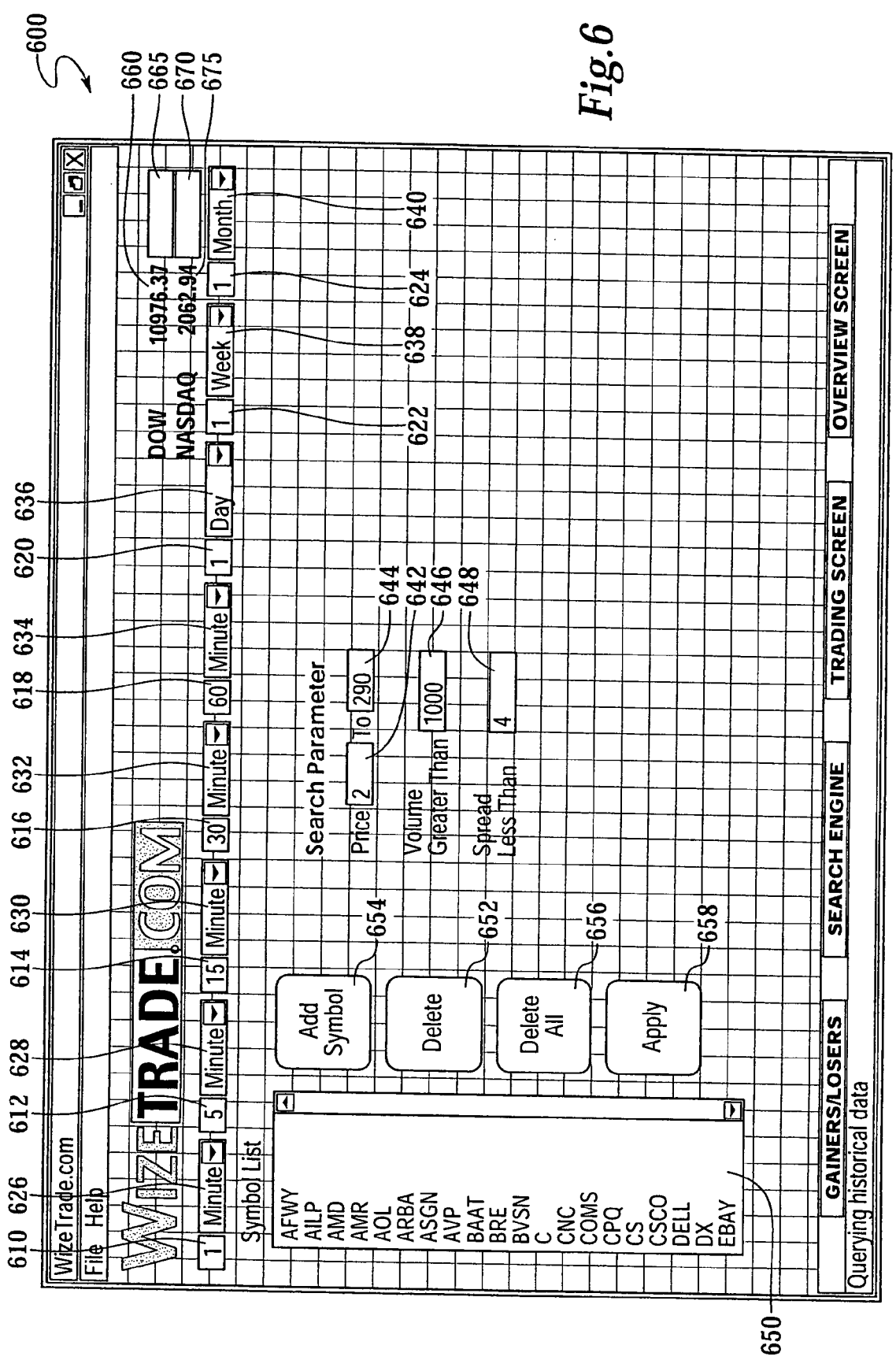
FIG. 6 is the Search Screen in accordance with one embodiment of the present invention.

DOW current totals 360 and 365 and NASDAQ current totals 370 and 375 are also displayed. Chart buttons 312a, 322a, 332a, 342a and 352a display charts for an associated single investment. For example, chart button 312a displays charts for investment 310. Change buttons 312b, 322b, 332b, 342b and 352b enable the investor to change the associated investment. For example, change button 312b changes investment 310. Buttons 380, 385, 390 and 395 enable the investor to navigate through the application screens. This strip of buttons is repeated on each screen and has identical functionality on each screen. For example, selecting button 385 from any screen will take the investor to Search Screen 600 (FIG. 6).

Figure 4:
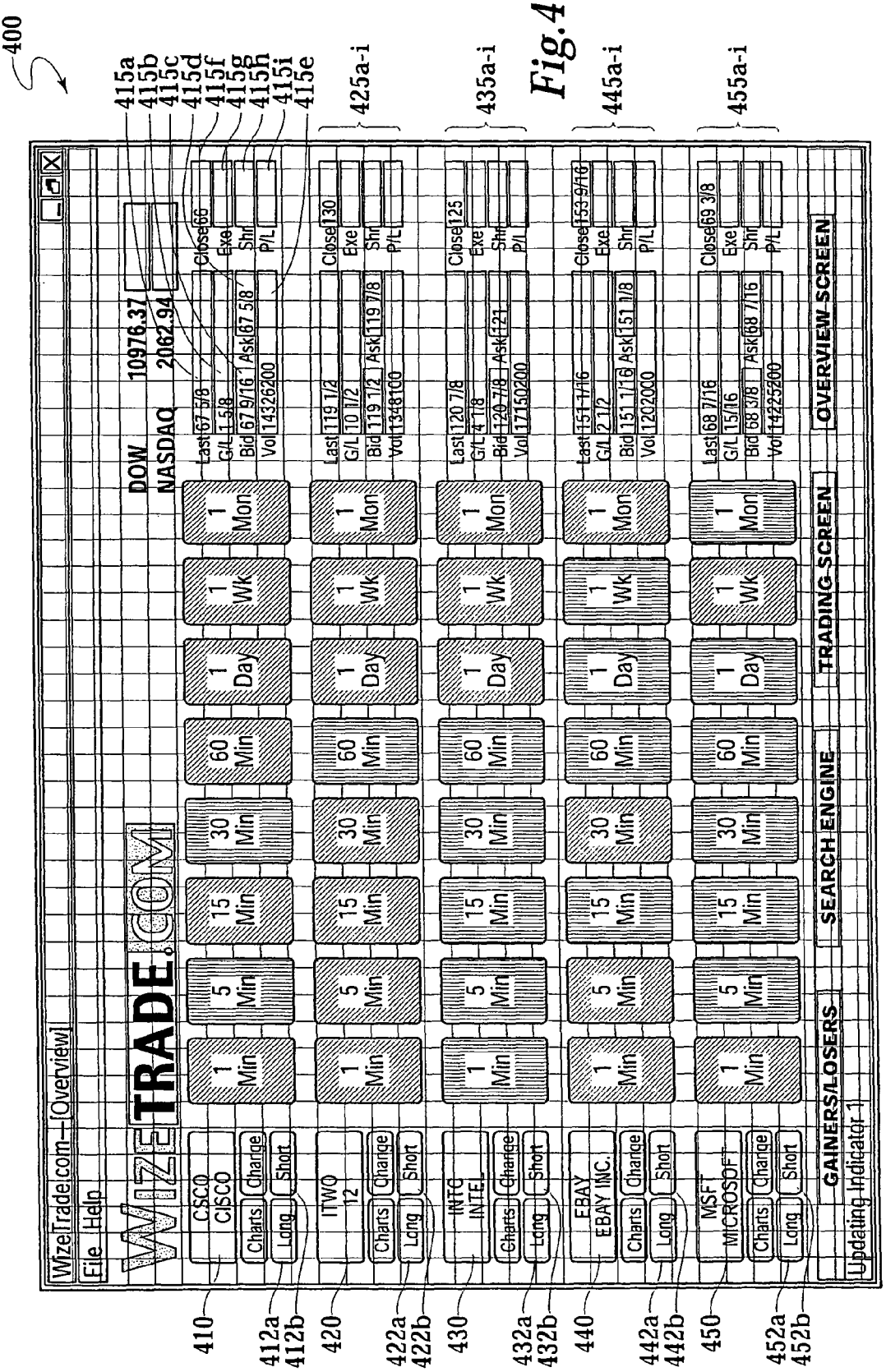
FIG. 4 is the Overview Screen in Trading Mode in accordance with one embodiment of the present invention.

The investor is able to "paper trade" (simulate trading) through Overview Screen 300 by changing to Trading Mode by selecting button 390. FIG. 4, Overview Screen 400 in Trading mode, activates in response to the investor's selection of button 390 (FIG. 3). The elements of Overview Screen 300 (FIG. 3) are decreased in size and pricing and volume information 415a-i, 425a-i, 435a-i, 445a-i and 455a-i for each associated investment 410, 420, 430, 440 and 450 is added. For example, pricing and volume information 415a-i associated with investment 310 is added. Overview Screen 400 in Trading mode displays data such as the last price 415a, 425a, 435a, 445a and 455a, the dollar amount up or down per investment 415b, 425b, 435b, 445b and 455b, the bid price 415c, 425c, 435c, 445c and 455c, the ask price 415d, 425d, 435d, 445d and 455d, the volume 415e, 425e, 435e, 445e and 455e and the closing price 415f, 425f, 435f, 445f and 455f for each investment 410, 420, 430, 440 and 450. The dollar amount up or down per investment 415b, 425b, 435b, 445b and 455b is displayed with color-coding: green may represent a gain, red may represent a loss, while white may represent either no change or no data. Other color combinations can be used.

To simulate trading, the investor enters execute price (Exe) 415g, 425g, 435g, 445g and 455g and the amount of an investment bought or shorted (Shr) 415h, 425h, 435h, 445h and 455h for an associated investment 410, 420, 430, 440 and 450. For example, Exe 415g and Shr 315h are associated with investment 410. The investor chooses from Long or Short on the paper trades for an associated investment 410, 420, 430, 440 and 450 by selecting a Long button 412a, 422a, 432a, 442a and 452a or a Short button 412b, 422b, 432b, 442b and 452b for that investment. For example, Long button 412a and Short button 412b are associated with investment 410. The results of the simulation are shown in P/L 415i, 425i, 435i, 445i and 455i for an associated investment 410, 420, 430, 440 and 450. For example, the results of a trading simulation for investment 410 are displayed in P/L 415i. The results are displayed with color-coding: green may represent a gain, red may represent a loss, while white may represent either no change or no data. Other color combinations can be used. "Paper Trading" information is not carried over from session to session and is lost when the investor terminates the program. By allowing the investor to practice trading in a live market environment without risking capital, the present invention enables equity tracking for year to date, month to date and specified periods of time.

Figure 5:
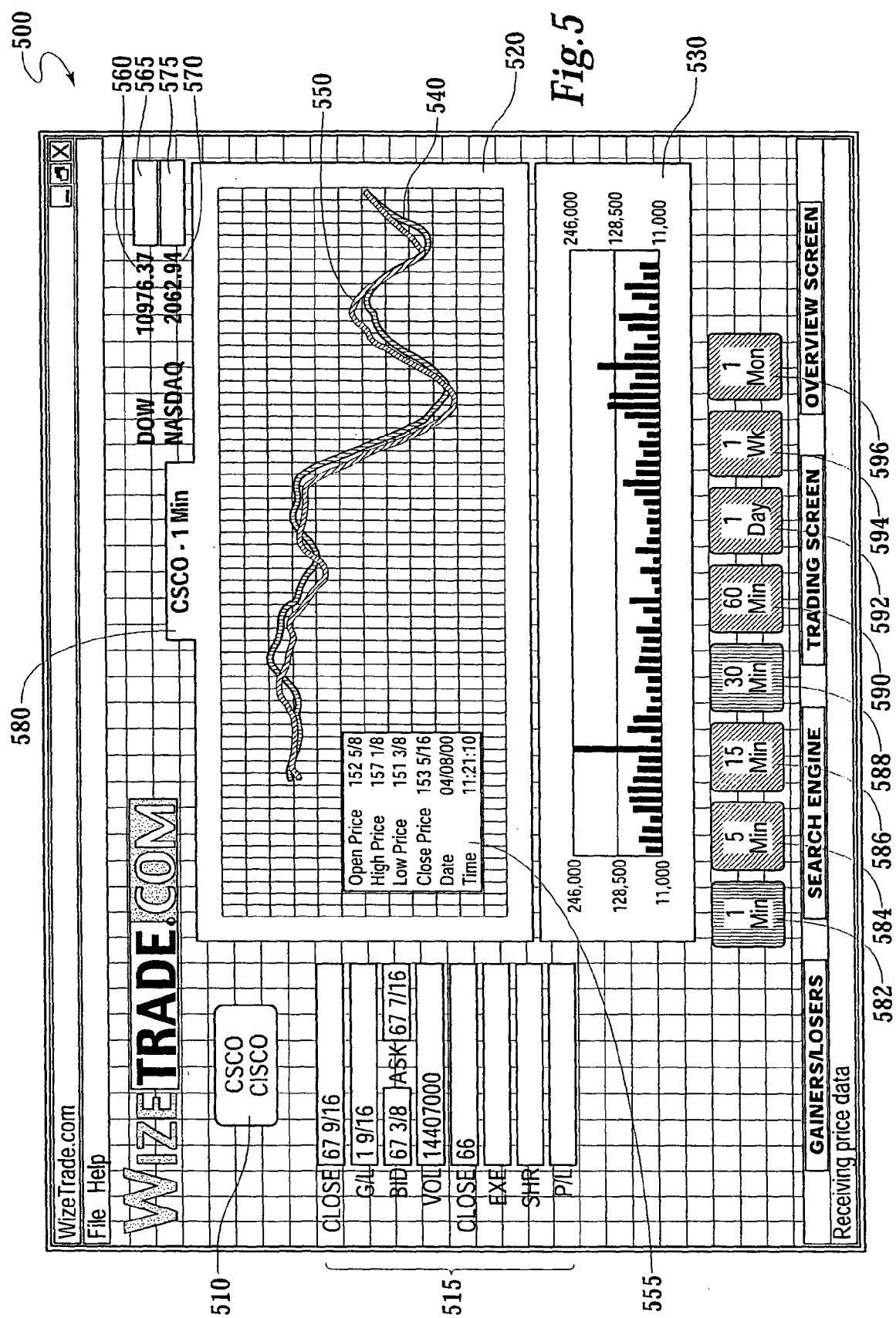
FIG. 5 is the Chart Screen in accordance with one embodiment of the present invention.

FIG. 5, Chart Screen 500, activates in response to the investor's selection of chart buttons 312a, 322a, 332a, 342a and 352a (FIG. 3). The selection of a specific chart button determines for which investment 310, 320, 330, 340 and 350 (FIG. 3) charts will be displayed. For example, selecting chart button 312a (FIG. 3) results in the display of charted data for investment 310 (FIG. 3). The selected investment appears on Chart Screen 500 as 510. A preferred embodiment of the present invention includes the display of updated pricing and volume information 515 and two charts 520 and 530 for investment 510. DOW current totals 560 and 565 and NASDAQ current totals 570 and 575 are also displayed. Chart 520 is the multiple linear regression chart (MLR). Chart 530 is the Volume chart. MLR Chart 520 displays two regression lines 540 and 550, one color coded to indicate opening prices and the other color coded to indicate closing prices. The present invention preferably uses red to indicate opening prices and green to indicate closing prices. Other colors can be used. For purposes of simplification, the following discussion assumes that regression line 540 is red and regression line 550 is green.

Chart interval 580 represents a period of time, which is established by selecting a time interval button 582, 584, 586, 588, 590, 592, 594 and 596. Any position on the green regression line 550 represents a regression of a prior number of period's closing prices. This regression analysis builds and displays a trend of the closing prices of the investment 510 over a period of time. Any position on the red regression line 540 represents a regression of a prior number of period's opening prices. This regression analysis builds and displays a trend of the opening prices of the investment over a period of time. When the green regression line 550 is above the red regression line 540 on the chart, favorable conditions for a long trade occur. When the red regression line 540 is above the green regression line 550 on the chart, favorable conditions for a short trade occur. A critical point occurs where the red regression line 540 and the green regression line 550 cross. When the red regression line 540 crosses the green regression line 550 and ascends above the green regression line 550, the associated time interval indicator 581-588 will become red. When the green regression line 550 crosses the red regression line 540 and ascends above the red regression line 540, the associated time interval indicator 581-588 will become green. These color changes will also occur on indicators 310a-310h, 320a-320h, 330a-330h, 340a-340h and 350a-350h (FIG. 3) for the associated investment. There is a separate chart associated with each time interval indicator 582, 584, 586, 588, 590, 592, 594 and 596. As the present invention updates the calculations and the indicators change, the investor can be notified via audible or visual alerts. The present invention can also sent electronic notifications to the investor.

Regression algorithms are well known to those of ordinary skill in the art. The MLR algorithms calculate the red regression line 540 and the green regression line 550 on MLR regression Chart 520. There is a separate regression routine for each time interval indicator 582, 584, 586, 588, 590, 592, 594 and 596. Each routine performs regression analysis on the pricing history for all selected investments 310, 320, 330, 340 and 350 (FIG. 3). There are two regression calculations performed. One is performed on a number of prior consecutive interval closing prices, such as four (4) prior 5-minute interval closing prices. The other regression is performed on a number of prior interval opening prices, such as three (3) prior 5-minute interval opening prices. The current interval's opening price is not included in this calculation. The regression performed on the closing prices is displayed on MLR Chart 520 as the green regression line 550. The regression performed on the opening prices is displayed on MLR Chart 520 as the red regression line 540. The present invention indicates an entry point in the market by the intersection of the green regression line 550 and the red regression line 540.

The investor may obtain more detailed information concerning a specific point along either the green regression line 550 or the red regression line 540 by clicking on the line at the desired point. The present invention will display Infolist 555 containing information about the selected point.

MLR Chart 520 and Volume Chart 530 are only representative of the market trend indicators and analyses available. The selection of multiple linear regression and volume analyses for a preferred embodiment of the present invention does not indicate that the present invention is limited to only those market trend indicators. There are many market trend indicators that the investor can consult to make better trade decisions, such as the following: stochastics, relative strength, directional movement, commodity channel, simple average, exponential average weighted average, MACD (simple), MACD (exponential), momentum/ROC, midrange, William's %R, parabolic stop, volatility stop, trailing stop, high low stop, Bollinger Bands, Keltner Channel, uniform channel, regression channel, swing lines, cycle forecast, on balance volume, overlay chart, point & figure, moving average, moving linear regression, upper envelope, lower envelope, %K, %D, %D slow, %D averaged, %R, RSI, momentum, acceleration, moving average oscillator, moving average momentum, moving average convergence-divergence oscillator, moving average convergence-divergence, MACD signal line, commodity channel index, rate of change in prices, on balance volume variance, standard deviation, volatility ratio, volatility, skew, kurtosis, Williams Accumulated Distribution, Arm's Ease of Movement, plus directional indicator, minus directional indicator, directional movement and average directional movement.

FIG. 6, Search Screen 600, activates in response to the investor's selection of button 385 (FIG. 3). It displays the search parameters of Price Min 642, Price Max 644, Volume 646 and Spread 648. These parameters are important to prevent the system from identifying unqualified trade opportunities. The investor can create a custom list 650 of investments, which is kept from session to session. This is done by adding an investment to custom list 650 via Add 654, deleting an investment from custom list 650 via Delete 652 or deleting all the investments on custom list 650 via Delete All 656. The present invention enables the investor to identify and restrict investment price ranges above Price Min 642 and below Price Max 644 and indicate the Volume 646 minimum within the search engine parameters. The investor can input a maximum Spread 648 and the system will not identify any trade opportunity that exceeds maximum Spread 648. The search is activated by selecting Apply 658. The investor may also set units 626, 628, 630, 632, 634, 636, 638 and 640 and time 610, 612, 614, 616, 618, 620, 622 and 624 interval settings for the button indicators illustrated on the preceding figures. These changes are completed by selecting Apply 658. DOW current totals 660 and 665 and NASDAQ current totals 670 and 675 are also displayed.

Figure 7:
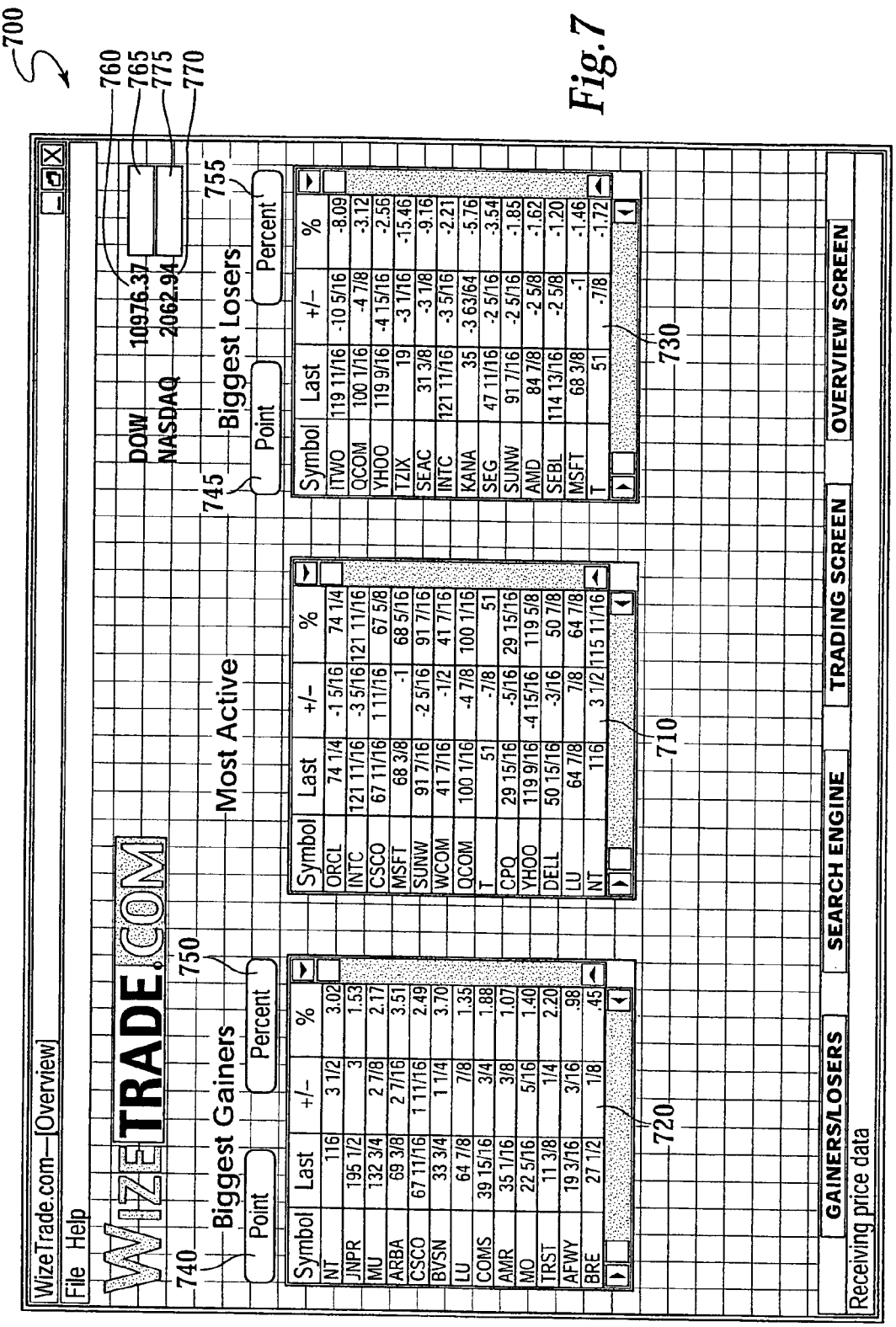
FIG. 7 is the Gainers/Losers Screen in accordance with one embodiment of the present invention.

FIG. 7, Gainers/Losers Screen 700, activates in response to the investor's selection of button 380 (FIG. 3). The Gainers/Losers Screen 700 displays the investor's most active trading investments 710, the investor's highest gaining investments 720 and the investor's highest losing investments 730. The investor can sort investments by point 740 and 745 or percentage 750 and 755. DOW current totals 760 and 765 and NASDAQ current totals 770 and 775 are also displayed.

FIGS. 8A-8E display the processing flows for the options of screens FIGS. 3-7. Application Navigation 900 is the same in each of the system screens. Selecting View Gainers/Losers Screen 910 results in the display of FIG. 7, enabling its associated processing of FIG. 8E. Selecting View Search Screen 920 results in the display of FIG. 6, enabling its associated processing of FIG. 8D. Selecting View Overview Screen in Trading Mode 930 results in the display of FIG. 4, enabling its associated processing of FIG. 8B. Selecting View Overview Screen in Overview Mode 940 results in the display of FIG. 3, enabling its associated processing of FIG. 8A.

Figure 8A:
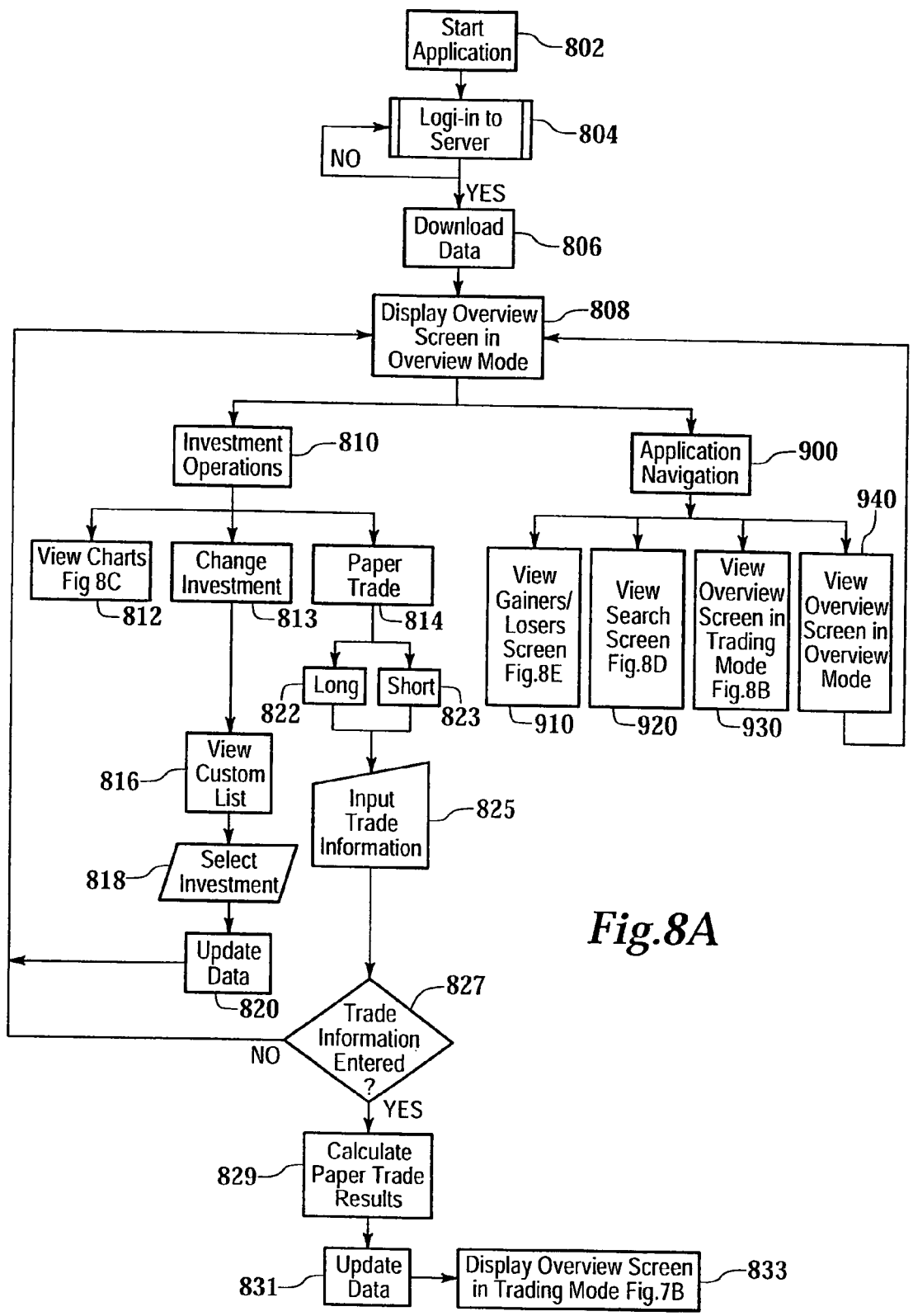
FIG. 8A is a flowchart illustrating the application start-up and processing flow for the Overview Screen in Overview Mode in accordance with one embodiment of the present invention.

FIG. 8A focuses on the application start-up and processing flow for FIG. 3. The present invention starts in block 802 where the investor 150-160 (FIG. 1) selects one or more markets 120, 125 or 130 (FIG. 1) to connect to. The specific servers that may be connected to and the details regarding the connection to be established are typically setup during the installation process of the software. The investor 150-160 (FIG. 1) can change, add or delete available connections and/or markets. Next, the present invention prompts the investor to log-on to a server which preferably supplies investment information updates in real-time or near-real-time 804. At this point, the application updates investment information in block 806. After updating, the system displays the Overview Screen in Overview Mode 808.

A preferred embodiment of the present invention enables the investor to perform three main investment operations 810: view charts 812, change investments 813 and paper trade 814. Chart viewing will be more fully explained in FIG. 8C. When the investor selects change investment 813, the system displays a list of currently stored investments 816. The creation of this list will be more fully explained in FIG. 8D. After viewing the possible investment choices 816, the investor then selects an investment 818. The system updates the screen data 820 and then redisplays the Overview Screen in Overview Mode 808 with the newly selected investment and its associated timer interval statuses.

When the investor decides to engage in "paper trading" 814, there are two possible options: Long 822 and Short 823. The process flow for each is identical, except for the data used and the calculations performed. These calculations were previously described in reference to FIG. 5. In order to perform the calculations, the system must have trade information with which to operate. Therefore, the investor has to supply trade information 825. The system then checks for the necessary input 827. If the investor has not input trade information 825 and 827, then all that happens is the system continues to display the current Overview Screen in Overview Mode 808.

If the investor has entered trade information 825 and 827, the system calculates the paper trade results 829, update the screen data 831 and then displays the Overview Screen in Trading Mode 833.

Figure 8B:
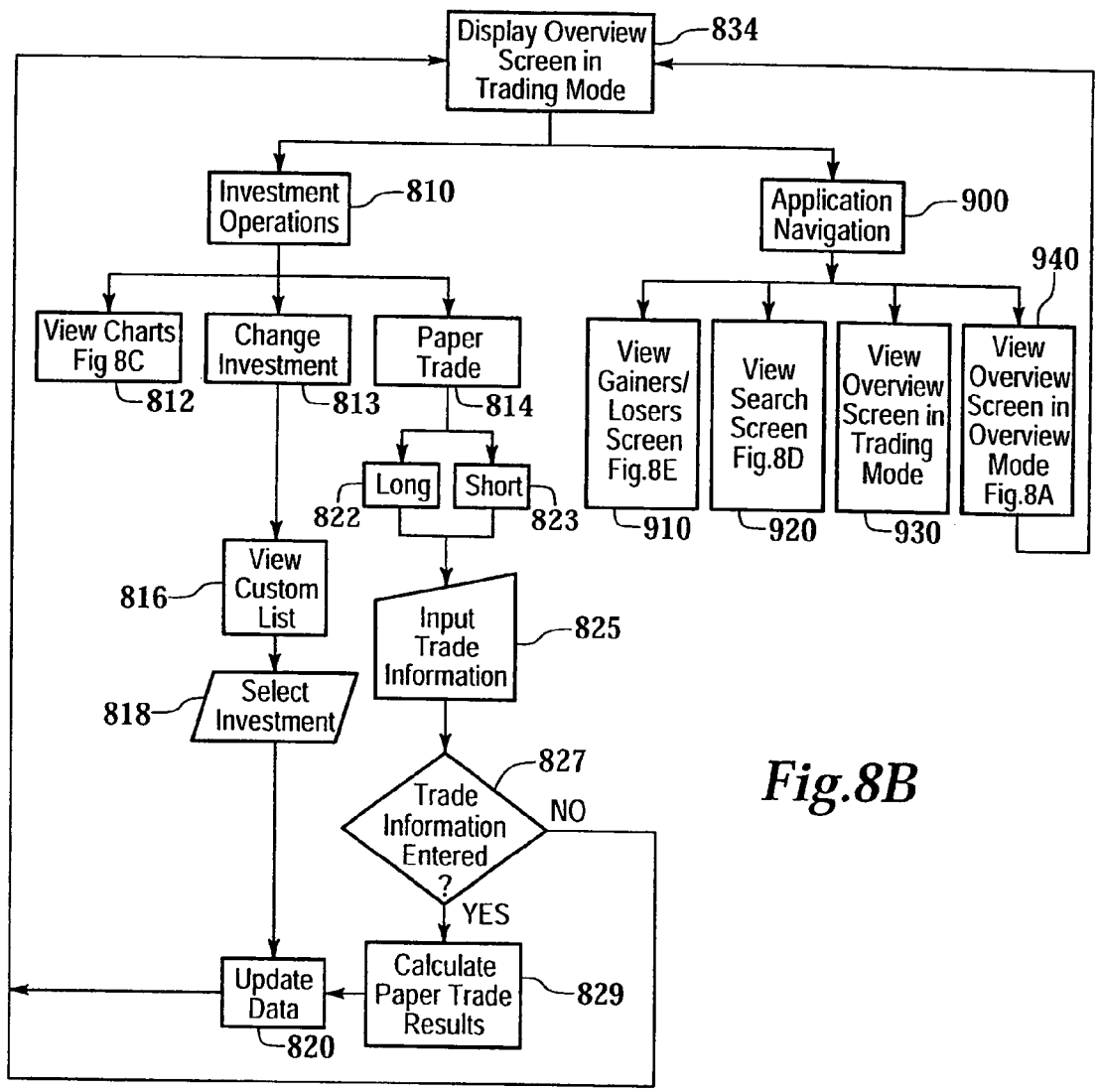
FIG. 8B is a flowchart illustrating the processing flow for the Overview Screen in Trading Mode in accordance with one embodiment of the present invention.

The processing of the Overview Screen in Trading Mode 834 shown in FIG. 8B is very similar to that shown in FIG. 8A. The difference is that regardless of whether the investor selects change investment 813 or paper trade 814, the present invention displays the results on the Overview Screen in Trading Mode 834. If changes have been made in the investment selection 813 or if trade information has been entered 825 and 829, the underlying data will be updated 820 and then displayed 834. If data changes have not been made, the system continues to display the Overview Screen in Trading Mode 834.

Figure 8C:
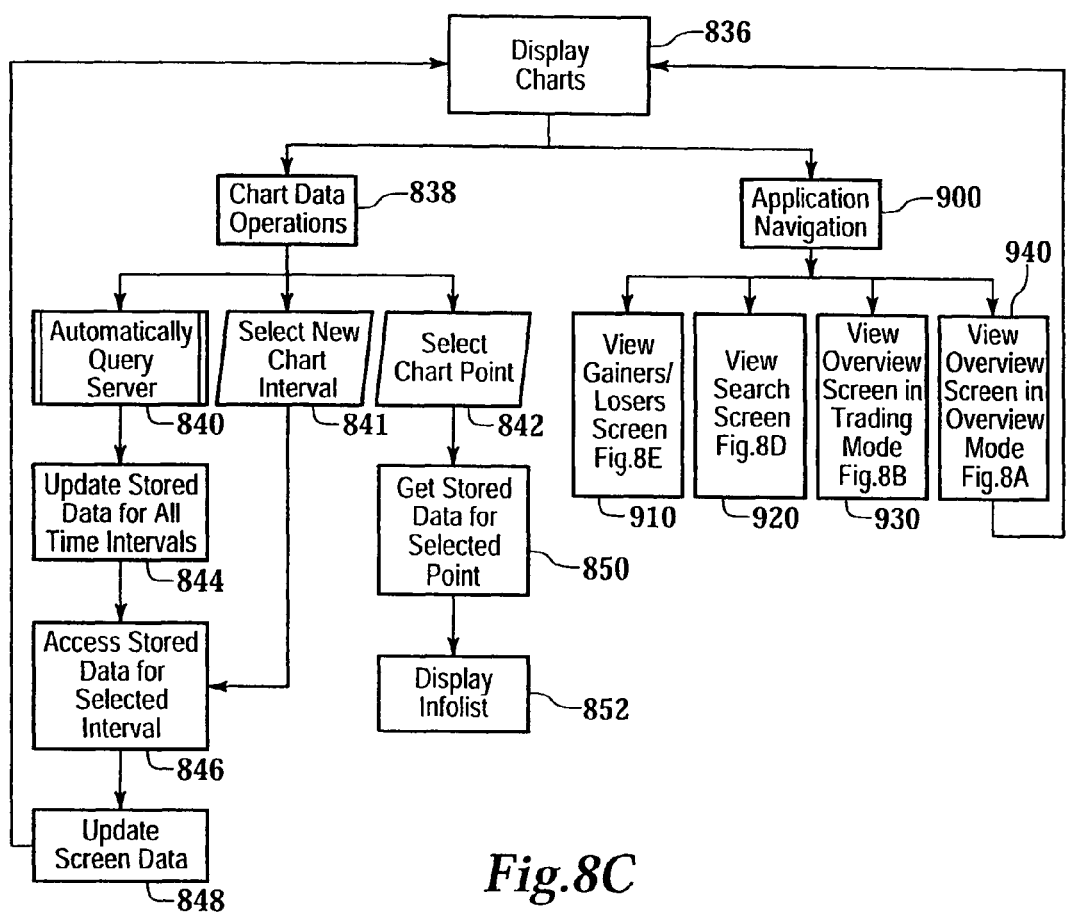
FIG. 8C is a flowchart illustrating the processing flow for the Chart Screen in accordance with one embodiment of the present invention.

The processing which occurs when FIG. 5 is displayed is shown in FIG. 8C. When a chart is displayed 836, there are three possible chart data operations 838 that may occur: automatic data updating, changing chart intervals or viewing specific data for a selected data point. The chart is automatically updated from the investment data system 840. Stored data is updated 844 for all the time intervals set in the system for each of the investments selected by the investor in either FIG. 3 or FIG. 4. After the stored data is updated, the system re-accesses the data 846, updates the screen 848 and displays the charts 836. The displayed chart may be for any one of the time intervals set in the system and the investor may navigate between each of the time intervals for the chart by selecting a new chart interval 841. After a new interval has been selected 841, the system accesses the data for the selected interval 846, updates the screen 848 and displays the charts 836. The investor can view more detailed data for a specific chart point by selecting the point 842. The system then gets the stored data for the selected point 850 and displays it on the screen 852. The stored data for the selected point is displayed in the Infolist 555 (FIG. 5).

Figure 8D:
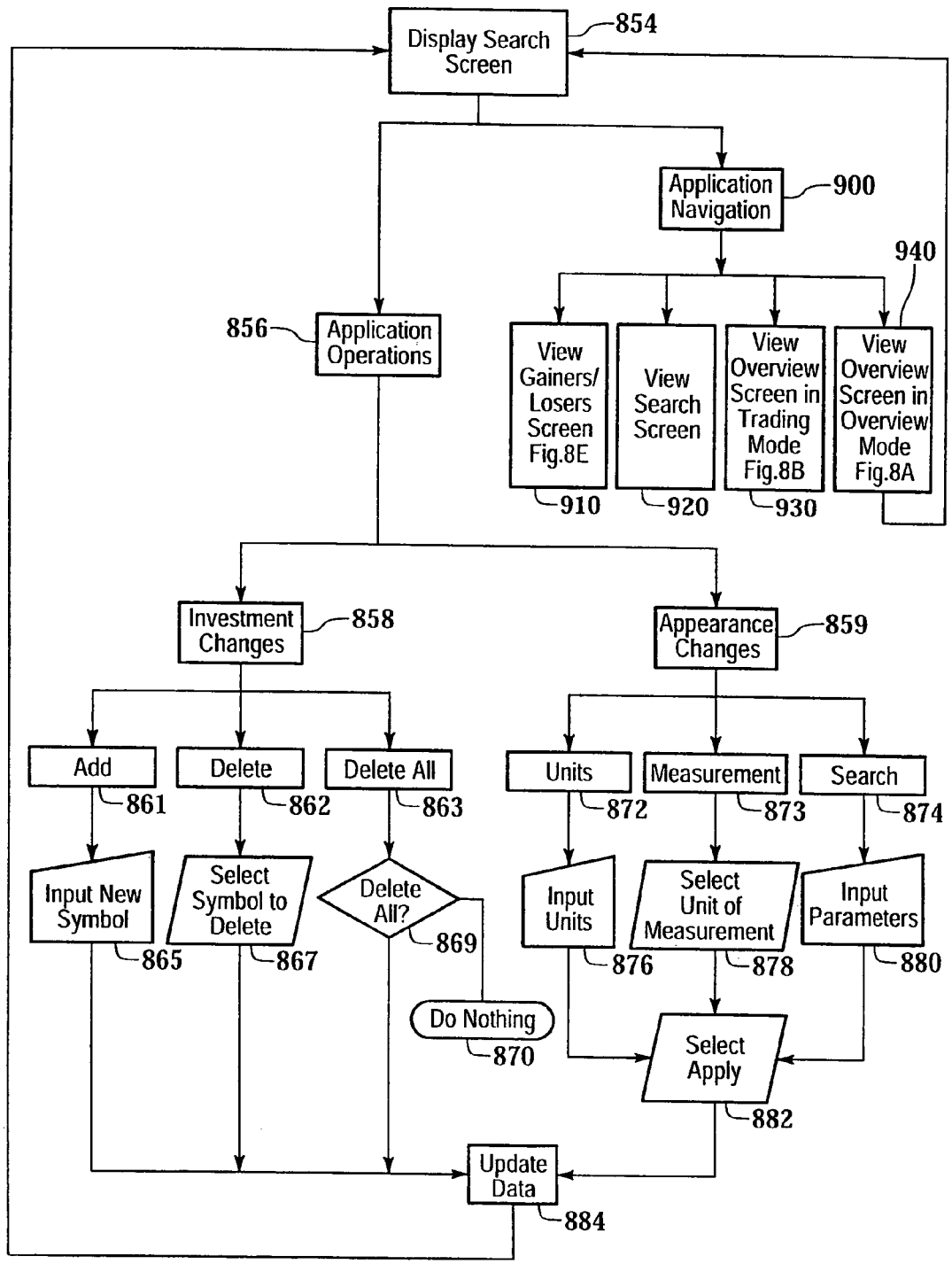
FIG. 8D is a flowchart illustrating the processing flow for the Search Screen in accordance with one embodiment of the present invention.

Not only can the investor search through the available investments to select those that meet a certain criteria, but the investor can also make changes to some of the system parameters through the Search Screen 854 processing of FIG. 8D. There are two main types of changes that result through the use of the Search Screen 600 (FIG. 6). The application operations 856 that can be performed are investment changes 858 and appearance changes 859. The investment symbols appear in the custom list 650 (FIG. 6) can be changed by making investment changes 858. The investor can add 861 new investments, delete 862 an existing investment or delete all 863 of the investments displayed in the custom list 650 (FIG. 6). When the investor adds 861 new investments, the system will prompt the investor to input the new investment symbol 865, then the system will update the data 884 and display the Search Screen 854. If the investor chooses to delete 862 a symbol, the system will prompt the investor to select an investment symbol 867 from custom list 650 (FIG. 6) for deletion. Then, the system will update the data 884 and display the Search Screen 854. Alternatively, if the investor chooses to delete all 863 the investments in custom list 650 (FIG. 6), the system will ask for confirmation 869 that the investor wants to delete the entire list. If the investor affirms the requested deletion of the entire list, then the system updates the data 884 to reflect no entries and displays the Search Screen 854.

The other changes are made to the appearance 859 of the data relative to which investments are displayed for the screens of FIGS. 3-7 and which time intervals the system uses for calculations. When the investor conducts a search 874, the system prompts the investor for the search parameters 880.

Once those parameters have been entered, the investor selects Apply 882. The screen data is updated 884 to reflect only those investments that met the search parameters. The Search Screen is displayed 854, showing the matching investments in custom list 650 (FIG. 6). The investor can also change the units 872 for the time intervals used throughout the system. The investor may input the desired units 876 in whole numbers and then select Apply 882. The data will be updated 884 to display the Search Screen 854 with the newly entered units. Measurement 873 changes are similarly made. However, instead of inputting a new unit of measurement, the investor selects a unit of measurement 878 from a list. Then, the investor selects Apply 882, the system updates the data 884 and displays the Search Screen 854 with the newly entered units of measurement.

Figure 8E:
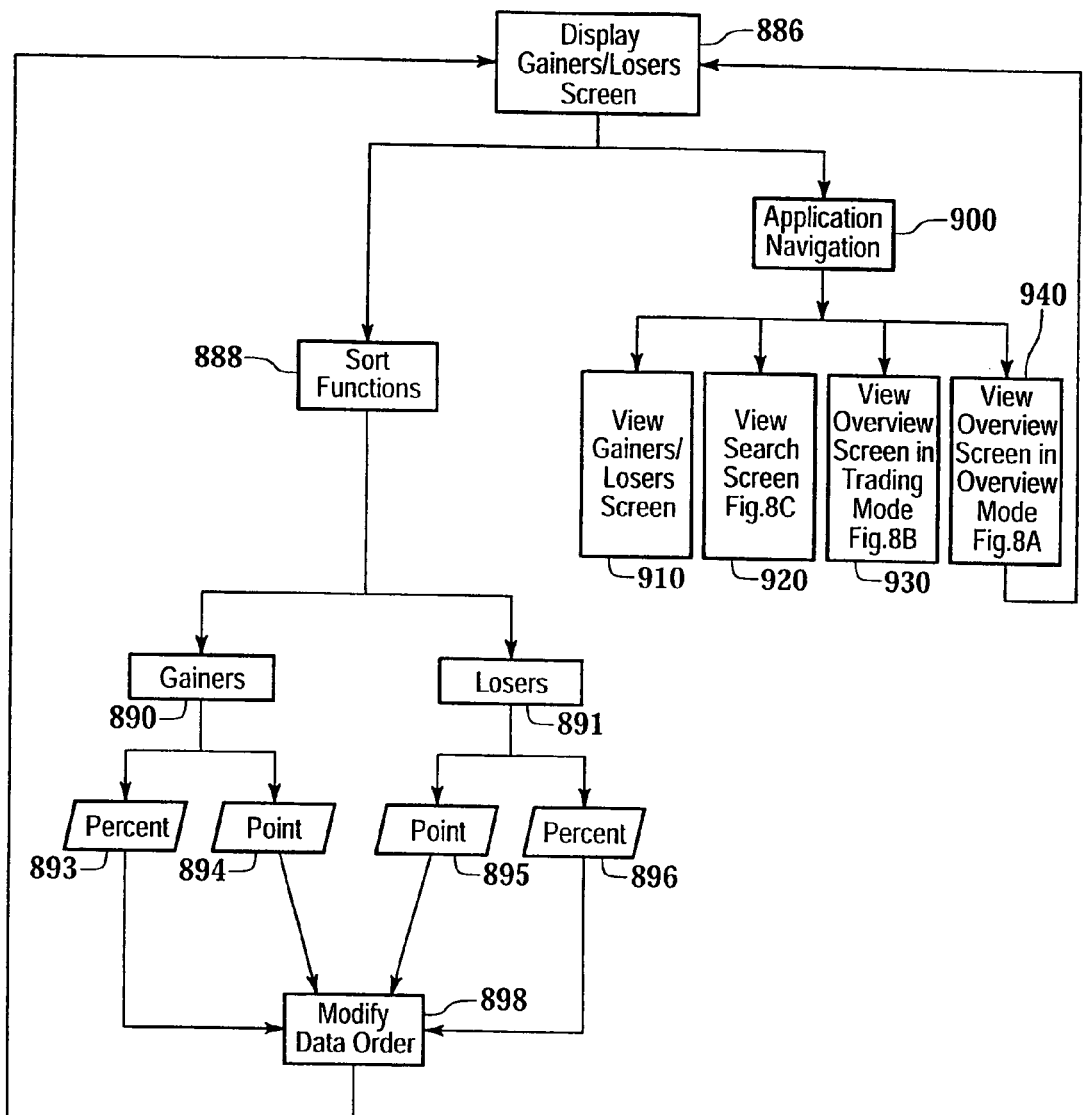
FIG. 8E is a flowchart illustrating the processing flow for the Gainers/Losers Screen in accordance with one embodiment of the present invention.

FIG. 8E displays the processing flow for FIG. 7. When the Gainers/Losers Screen is displayed 886, the investor has the ability to sort 888 the data displayed on that screen. The investor may sort the Gainers 890 by point 893 or percent 894. A point 895 and percent 896 sort is also available for Losers 898.

Figure 9:
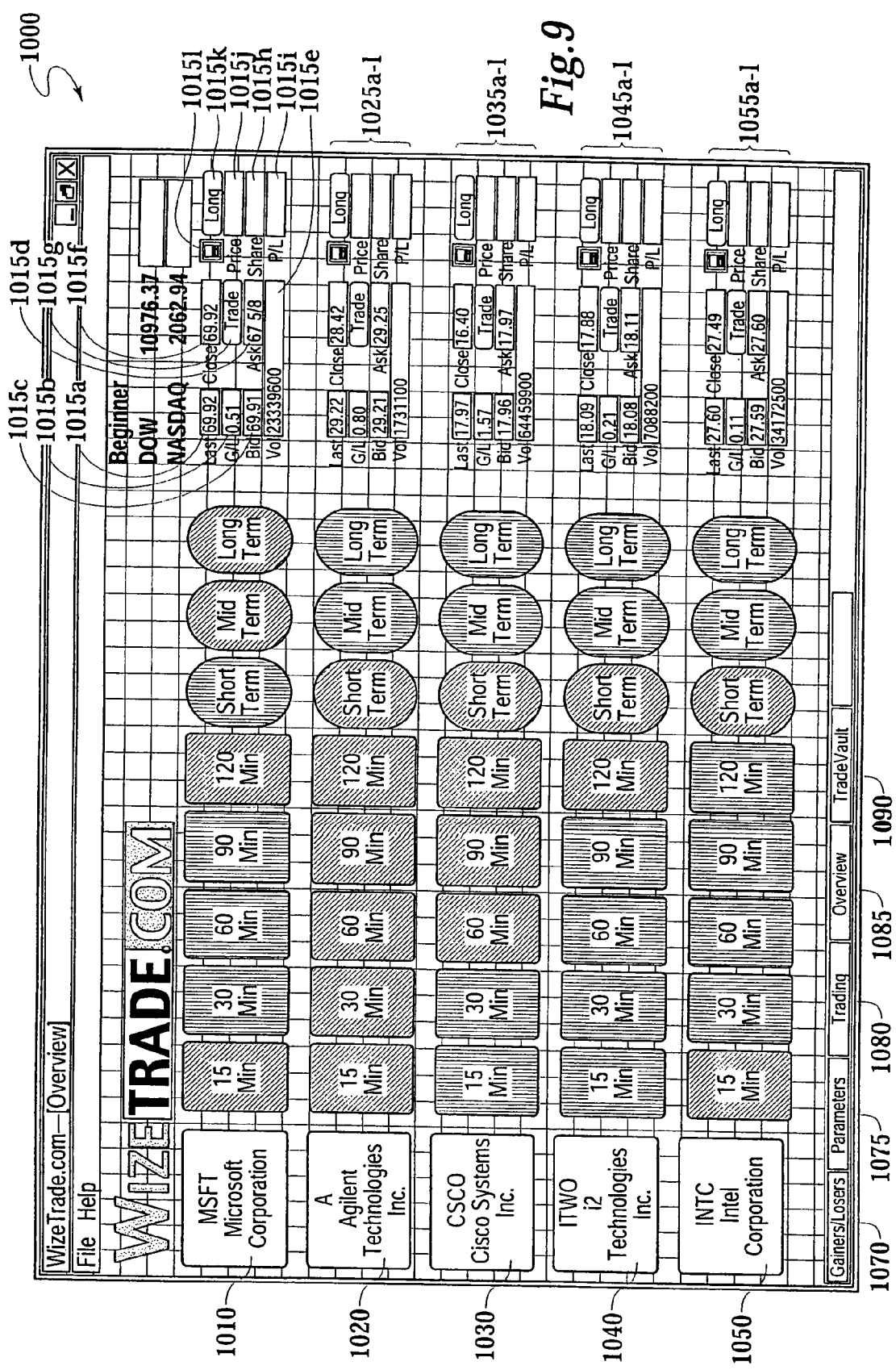
FIG. 9 is the Trading Screen in accordance with another embodiment of the present invention.

Now referring to FIG. 9, the Trading Screen 1000 in accordance with another embodiment of the present invention is shown. Pricing and volume information 1015*a-i*, 1025*a-i*, 1035*a-i*, 1045*a-i* and 1055*a-i* for each associated investment 1010, 1020, 1030, 1040 and 1050 is shown. The pricing and volume information includes data such as the last price 1015*a*, 1025*a*, 1035*a*, 1045*a* and 1055*a*, the dollar amount up or down per investment 1015*b*, 1025*b*, 1035*b*, 1045*b* and 1055*b*, the bid price 1015*c*, 1025*c*, 1035*c*, 1045*c* and 1055*c*, the ask price 1015*d*, 1025*d*, 1035*d*, 1045*d* and 1055*d*, the volume 1015*e*, 1025*e*, 1035*e*, 1045*e* and 1055*e*, the closing price 1015*f*, 1025*f*, 1035*f*, 1045*f* and 1055*f*, a trade button 1015*g*, 1025*g*, 1035*g*, 1045*g* and 1055*g*, the number of shares 1015*h*, 1025*h*, 1035*h*, 1045*h* and 1055*h*, the profit/loss 1015*i*, 1025*i*, 1035*i*, 1045*i* and 1055*i*, the execute price 1015*j*, 1025*j*, 1035*j*, 1045*j* and 1055*j*, a long/short trade button 1015*k*, 1025*k*, 1035*k*, 1045*k* and 1055*k*, and a save button 1015*l*, 1025*l*, 1035*l*, 1045*l* and 1055*l* for each investment 1010, 1020, 1030, 1040 and 1050. The dollar amount up or down per investment 1015*b*, 1025*b*, 1035*b*, 1045*b* and 1055*b* is displayed with color-coding: green may represent a gain, red may represent a loss, while white may represent either no change or no data. Other color combinations can be used.

To execute a trade, the investor enters the execute price (Price) 1015*j*, 1025*j*, 1035*j*, 1045*j* and 1055*j* and the amount of an investment bought or shorted (Share) 1015*h*, 1025*h*, 1035*h*, 1045*h* and 1055*h* for an associated investment 1010, 1020, 1030, 1040 and 1050. The investor chooses from Long or Short for an associated investment 1010, 1020, 1030, 1040 and 1050 by clicking on the long/short button 1015*k*, 1025*k*, 1035*k*, 1045*k* and 1055*k* for that investment. The results of the trade are shown in P/L 1015*i*, 1025*i*, 1035*i*, 1045*i* and 1055*i* for an associated investment 1010, 1020, 1030, 1040 and 1050. The results are displayed with color-coding: green may represent a gain, red may represent a loss, while white may represent either no change or no data. Other color combinations can be used. The trade button 1015*g*, 1025*g*, 1035*g*, 1045*g* and 1055*g* either execute the trade (real or simulated) or connects the investor to the electronic or online brokerage service. The save button 1015*l*, 1025*l*, 1035*l*, 1045*l* and 1055*l* saves the transaction so that the investor can keep track of his or her historical trading activity.

Figure 11:
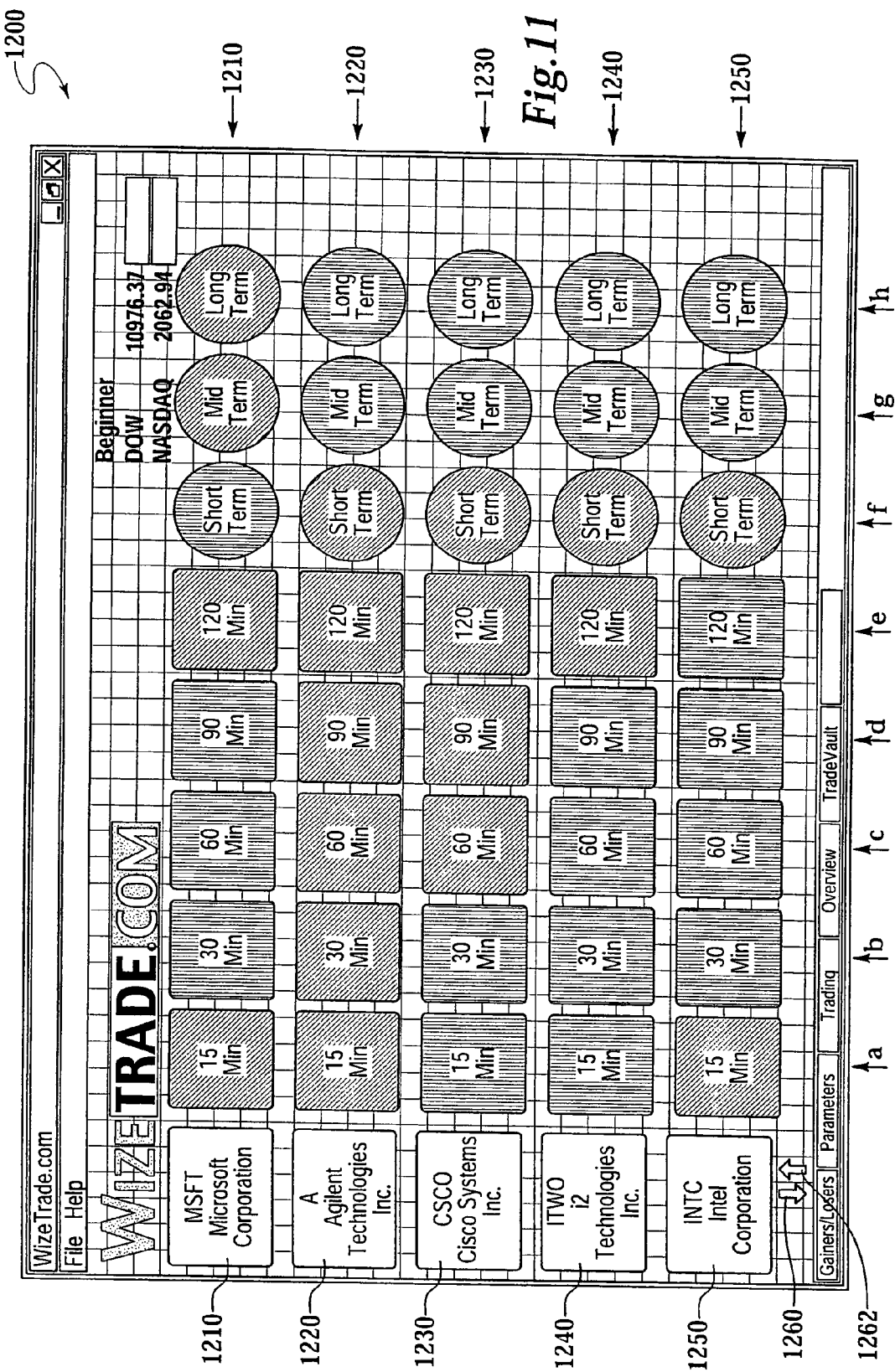
FIG. 11 is the Overview Screen in accordance with another embodiment of the present invention.
Figure 12:
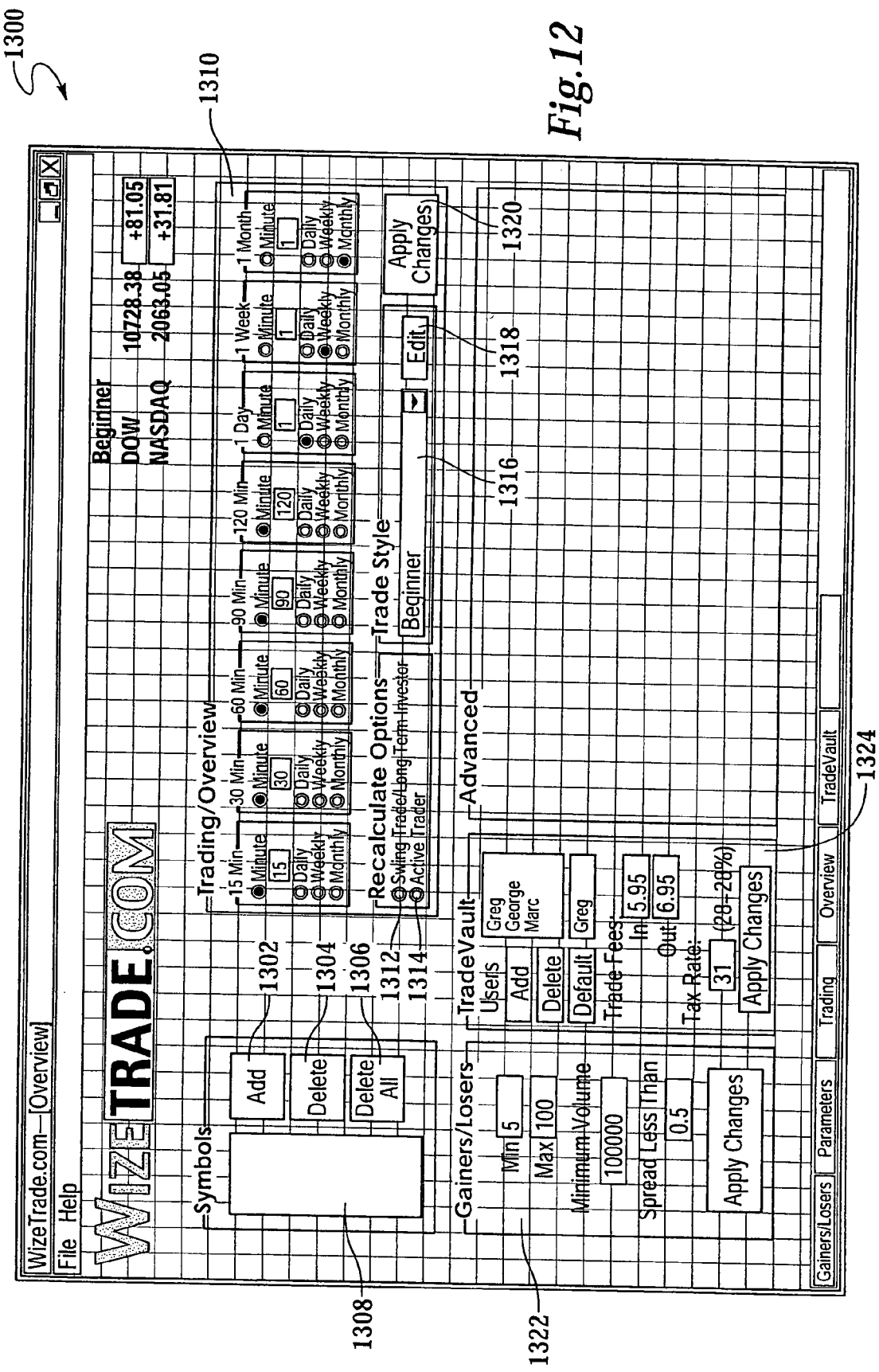
FIG. 12 is the Parameters Screen in accordance with another embodiment of the present invention.
Figure 13:
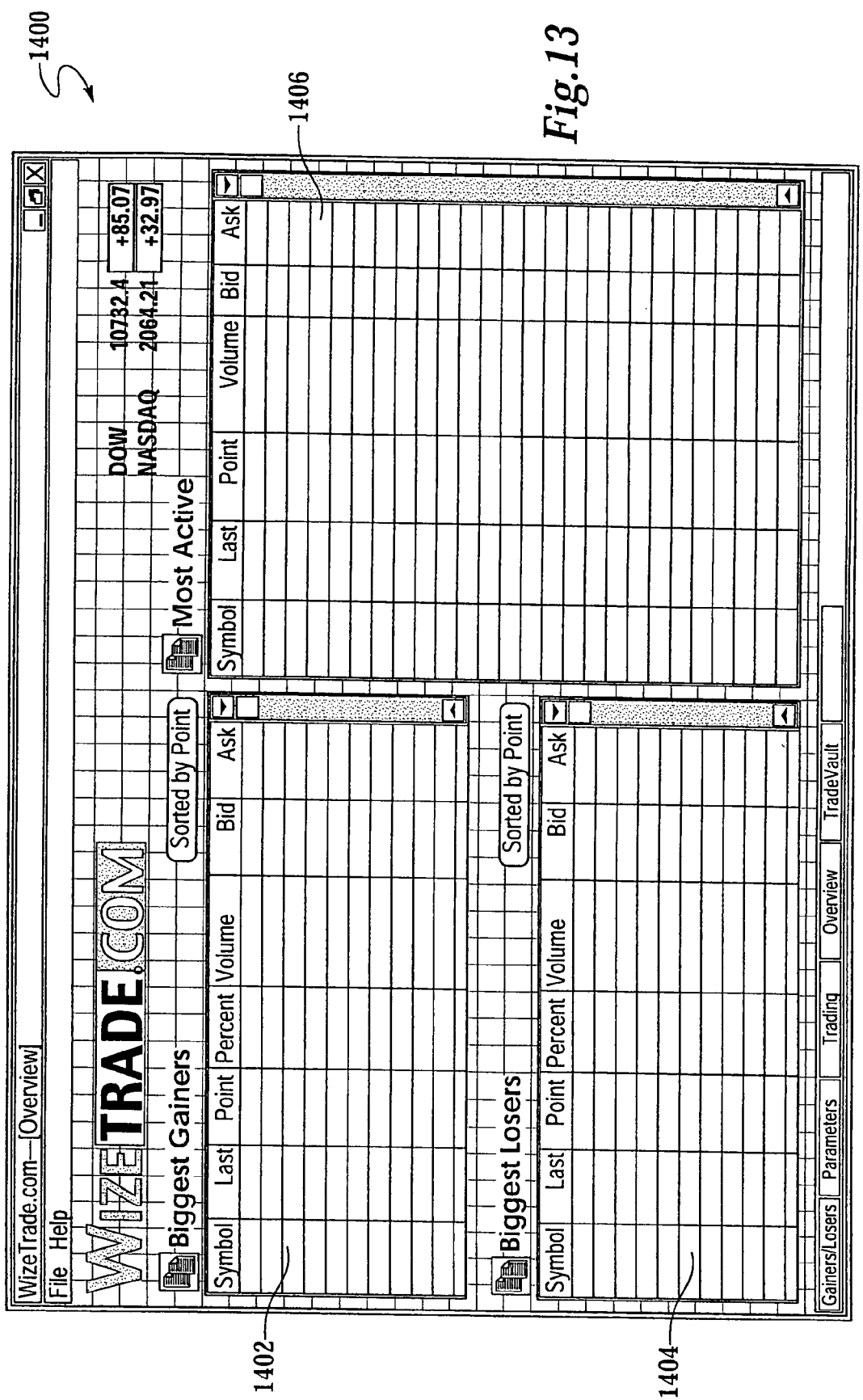
FIG. 13 is the Gainers/Losers Screen in accordance with another embodiment of the present invention.

Buttons 1070, 1075, 1080, 1085 and 1090 enable the investor to navigate through the application screens. This strip of buttons is repeated on each screen and has identical functionality on each screen. Button 1070 corresponds to the Gainer/Losers Screen 1350 (FIG. 13). Button 1075 corresponds to the Parameters Screen 1300 (FIG. 12). Button 1080 corresponds to the Traders Screen 1000 (FIG. 9). Button 1085 corresponds to the Overview Screen 1200 (FIG. 11). Button 1090 corresponds to the Trade Vault Screen 1100 (FIG. 10).

Figure 10:
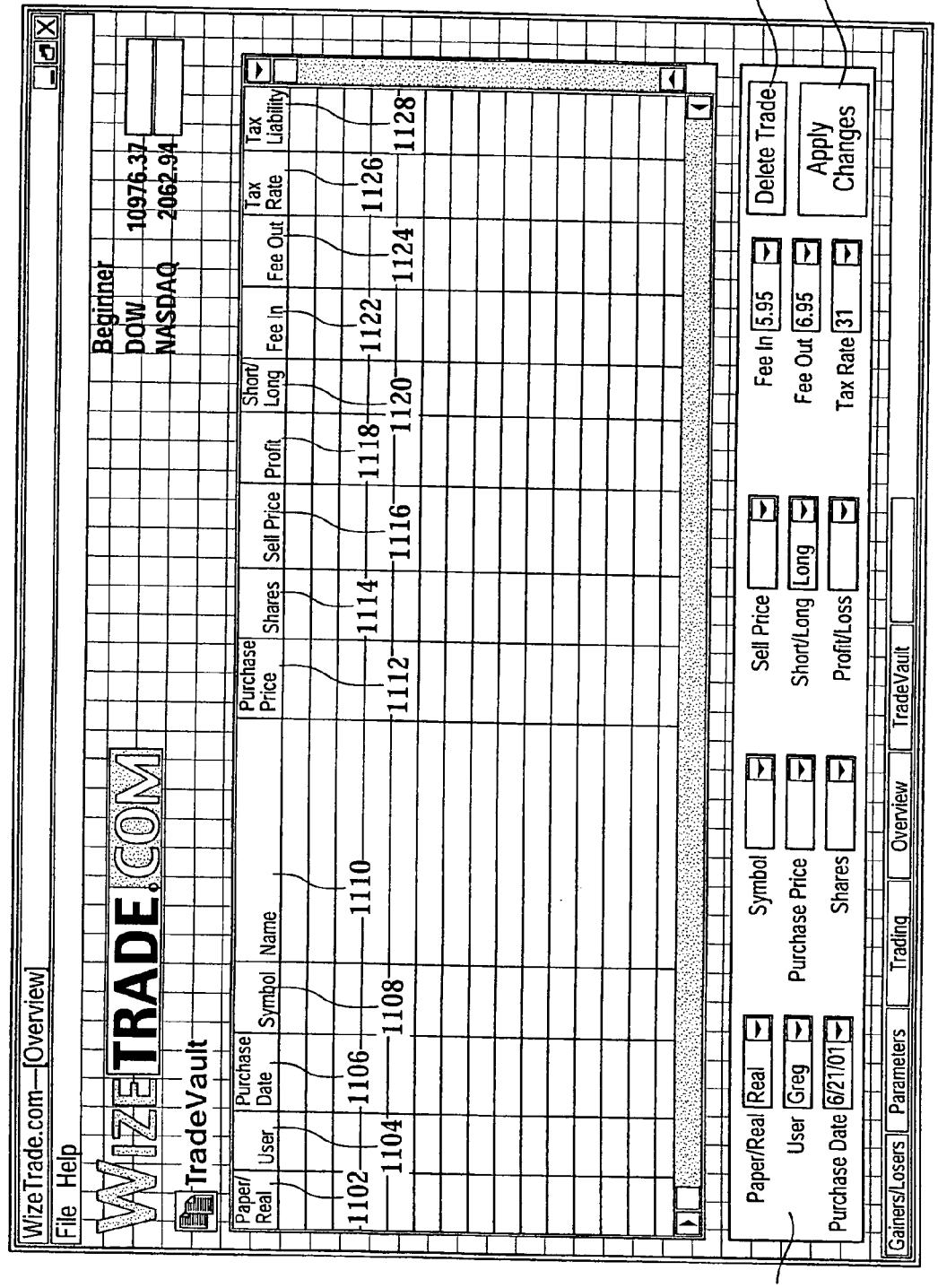
FIG. 10 is the Trade Vault Screen in accordance with another embodiment of the present invention.

FIG. 10 is the Trade Vault Screen 1100 in accordance with another embodiment of the present invention. The Trade Vault shows the paper and real trades that were saved by the investor by using the save button 1015*l*, 1025*l*, 1035*l*, 1045*l* and 1055*l* in FIG. 9. The Trade Vault Screen shows whether the trade was simulated (paper) or real 1102, the user 1104, the purchase date 1106, the trading symbol 1108, the investment name 1110, the purchase price 1112, the number of shares 1114, the selling price 1116, the profit 1118, whether the trade was long or short 1120, the fee in 1122, the fee out 1124, the tax rate 1126 and the tax liability 1128. Data can be changed or added using the input section 1130. The changes can be applied using the apply changes button 1132. Trades can be deleted using the delete trade button 1134.

FIG. 11 is the Overview Screen 1200 in accordance with another embodiment of the present invention. The Overview Screen 1200 enables the investor to recognize trends and directional movements. Overview Screen 1200 contains information about several selected investments 1210, 1220, 1230, 1240 and 1250. Color coded indicators 1210*a*-2110*h*, 1220*a*-1220*h*, 1230*a*-1230*h*, 1240*a*-1240*h* and 1250*a*-1250*h* are displayed for each of the selected investments 1210, 1220, 1230, 1240 and 1250. These indicators are preferably laid out in a grid fashion, but can be otherwise configured. Each indicator 1210*a*-1210*h*, 1220*a*-1220*h*, 1230*a*-1230*h*, 1240*a*-1240*h* and 1250*a*-1250*h* represents information for an associated single investment. Each indicator 1210*a*-1210*h*, 1220*a*-1220*h*, 1230*a*-1230*h*, 1240*a*-1240*h* and 1250*a*-1250*h* displays the chosen time interval for that indicator. Time intervals may be in minutes, hours, days, weeks or months. In the example shown, the time interval for indicators 1210*a*, 1220*a*, 1230*a*, 1240*a* and 1250*a* is fifteen minutes; the time interval for indicators 1210*b*, 1220*b*, 1230*b*, 1240*b* and 1250*b* is thirty minutes; the time interval for indicators 1210*c*, 1220*c*, 1230*c*, 1240*c* and 1250*c* is sixty minutes; the time interval for indicators 1210*d*, 1220*d*, 1230*d*, 1240*d* and 1250*d* is ninety minutes; the time interval for indicators 1210*e*, 1220*e*, 1230*e*, 1240*e* and 1250*e* is one hundred and twenty minutes; the time interval for indicators 1210*f*, 1220*f*, 1230*f*, 1240*f* and 1250*f* is short term (days; the time interval for indicators 1210*g*, 1220*g*, 1230*g*, 1240*g* and 1250*g* is mid-term (weeks); and the time interval for indicators 1210*h*, 1220*h*, 1230*h*, 1240*h* and 1250*h* is long term (months). The investor can use the page down button 1260 and page up button 1265 to scroll through various investments being tracked.

FIG. 12 is the Parameters Screen 1300 in accordance with another embodiment of the present invention. The investor can use the Parameters Screen 1300 to add 1302, delete 1304, or delete all 1306 investments (symbols) 1308 being tracked, change the time intervals displayed in the Trading Screen 1000 (FIG. 9) and the Overview Screen 1200 (FIG. 11) using the entry fields and toggle fields in the Trading/Overview section 1310. The investor can set the recalculation options to swing trade/long term investor 1312 or active trade mode 1314. The investor can also use various preset or stored sets of time intervals by selecting a trade style 1316, such as beginner, expert, long term investor or day trader. These preset or stored time intervals can be edited using the edit button 1318. Changes are applied using the apply changes button 1320. The settings for the Gainers/Losers Screen 1350 (FIG. 13)

and the Trade Vault Screen 1100 (FIG. 10) can be set using sections 1322 and 1324 respectively.

FIG. 13 is the Gainers/Losers Screen 1350 in accordance with another embodiment of the present invention. This screen 1350 shows the biggest gainers in section 1352, the biggest losers in section 1354 and the most active in section 1356.

An implementation of the present invention will now be described with respect to foreign exchange. Foreign exchange involves trading one nation's currency for the currency of another nation. As individuals or companies from one country trade across borders, the need for foreign currency arises. For example, when a U.S. importer buys French wine, either the importer needs euros to pay the French merchant or the French merchant must accept U.S. dollars and convert them to euros.

Foreign exchange trading takes place in financial centers all over the world, including New York, London, Hong Kong, Singapore, Frankfurt, Tokyo, and many others. These financial centers are linked to one another in a unified, cohesive, international market, so at any given time, around the clock, there's a major financial center open where banks, hedge funds, international corporations, and individual speculators all over the world are active participants. Most foreign exchange ("FOREX") activity consists of the spot business between the U.S. dollar and the six major currencies (Japanese Yen, British Pound, Swiss Franc, Canadian Dollar and Australian Dollar).

Many traders have made the switch from currency futures to spot FOREX trading. Spot FOREX offers better liquidity and generally a lower cost of trading than currency futures. Banks and brokers in spot FOREX can quote markets 24 hours a day. Furthermore, the spot FOREX market is not burdened by exchange and NFA ("National Futures Association") fees, which are generally passed on to the customer in the form of higher commissions. For these reasons, virtually all professional traders and institutions conduct most of their FOREX in the spot FOREX market, not in currency futures.

The mechanics of trading spot FOREX are similar to those of currency futures. The most important initial difference is the way in which currency pairs are quoted. Currency futures are always quoted as the currency versus the US dollar. In Spot FOREX, some currencies are quoted this way, while others are quoted as the US dollar versus the currency. For example, in spot FOREX, EURUSD is quoted the same way as Euro futures. In other words, if the Euro is strengthening, EURUSD will rise just as Euro futures will rise. On the other hand, USDCHF is quoted as US dollars with respect to Swiss Francs, the opposite of Swiss Franc futures. So if the Swiss Franc strengthens with respect to the US dollar, USDCHF will fall, while Swiss Franc futures will rise. The rule in spot FOREX is that the first currency shown is the currency that is being quoted in terms of direction. For example, "EUR" in EURUSD and "USD" in USDCHF is the currency that is being quoted. The following table illustrates which spot currencies move parallel to the futures contract and which move inversely (opposite):

| Forex Symbol | Currency Pair | Futures Symbol | Directional Relationship |
| --- | --- | --- | --- |
| GBPUSD | British Pound/US Dollar | BP | Parallel |
| EURUSD | Euro/US Dollar | EU | Parallel |
| USDJPY | US Dollar/Japanese Yen | JY | Inverse |
| USDCHF | US Dollar/Swiss Franc | SF | Inverse |

-continued

| Forex Symbol | Currency Pair | Futures Symbol | Directional Relationship |
| --- | --- | --- | --- |
| USDCAD | US Dollar/Canadian Dollar | CD | Inverse |
| AUDUSD | Australian/US Dollar | AD | Parallel |
| NZDUSD | New Zealand Dollar/US Dollar | ND | Parallel |

The movement of different currencies between countries determines a very important price: the exchange rate. It is the exchange rate that allows the currencies to be traded for profit. The foreign exchange is not traded on a physical exchange like the stock market. It is traded via the telephone or thru the internet. This electronic structure has contributed to making the Foreign Exchange Market the largest marketplace in the world. With over $1.5 trillion dollars traded per day versus $25 billion per day traded on the New York Stock Exchange, the Foreign Exchange Market offers many trading opportunities due to the low cost of executing the transactions and the speed at which the execution occurs. The spot FOREX market is open 24 hours a day, six days a week, Sunday evening thru Friday afternoon. Virtually all large institutions and professional traders conduct most of their foreign exchange dealing in the spot FOREX market. The spot FOREX market pairs together currencies from different countries and quotes them according to the values of the respective currency. Listed in the chart below are some of the most common currency pairs. In the column title "Currency Pair", the First Currency is known as the Base Currency. It shows how much the Base Currency is worth as measured against the Second Currency. For example, if the EUR/USD rate equals 0.9762, then one Euro is worth 0.9762 US Dollar. If a trader believes that the US Dollar will rise in relation to the Euro, the trader would sell EUR/USD. That is sell the Euro and buy the US Dollar.

| Symbol | Currency Pair | Trading Terminology |
| --- | --- | --- |
| EUR/USD | Euro/US Dollar | Euro |
| USD/CHF | US Dollar/Swiss Franc | Swissy |
| GBP/USD | British Pound/US Dollar | Cable |
| USD/JPY | US Dollar/Japanese Yen | Dollar Yen |
| USD/CAAD | US Dollar/Canadian Dollar | Dollar Canada |
| AUD/USD | Australian Dollar/US Dollar | Aussie Dollar |
| EUR/GBP | Euro/British Pound | Euro Sterling |
| EUR/JPY | Euro/Japanese Yen | Euro Yen |
| EUR/CHF | Euro/Swiss Franc | Euro Swiss |
| GBP/CHF | British Pound/Swiss Franc | Sterling Swiss |
| GBP/JPY | British Pound/Japanese Yen | Sterling Yen |
| CHF/JPY | Swiss Franc/Japanese Yen | Swiss Yen |
| NSD/USD | New Zealand Dollar/US Dollar | Kiwi |
| USD/ZAR | US Dollar/South African Rand | Dollar Zar |
| GLD/USD | (spot) Gold | Gold |
| SLV/USD | (spot) Silver | Silver |

When you decide to buy or sell a currency pair, you open your brokers Dealing Station Software and place an order. The software will provide the current trading price of the currency pair in question. You then decide how many lots you wish to trade. Your software will only allow you to trade as much as you have on deposit. If you're going to Buy, click in the BUY section for that Currency Pair and the Bid price will appear with the current price. If you're going to Sell, click in the Sell section for that Currency Pair and the Ask price will appear with the current price. If this is the price that you wish to accept, click OK and you will see your position appear in the OPEN POSITION part of your screen. If you would like to BUY or SELL a currency pair at a particular price you may execute a Limit Order by clicking on the ENTRY Button and setting a particular price in which to buy. You may also enter a stop loss for this position in the event it is filled and an exit Limit order for a profit target. Your account will be debited for the number of lots you control at the time of the transaction. If you don't have enough cash in your account to cover the cost of the position, the software will not allow you to enter the market.

The FOREX version of the present invention will now be described in reference to FIGS. 14-24. Each major screen of the present invention contains a header area 1402, a data area 1404 and one or more navigation buttons or tabs on a menu bar 1406. The header area 1402 contains information that is to be displayed on all screens, whereas the data area 1404 will change depending of the screen being displayed. The navigation tabs 1406 are used to switch screens. As shown, the header area 1402 contains the symbol 1408, current bid direction 1410 and current bid 1412 for various exchange pairs. Other information can be placed in the header area 1402. The navigation tabs 1406 include tabs to go directly to the Tutorial Screen 1420, Quick Quote Screen 1422, Parameters Screen 1424, Trading Screen 1426, Trade Vault Screen 1428 and Money Management Screen 1430. Other screens can be used. The present invention also includes "pop-up" screens, which allow the user to configure different aspects of the application.

Figure 14:
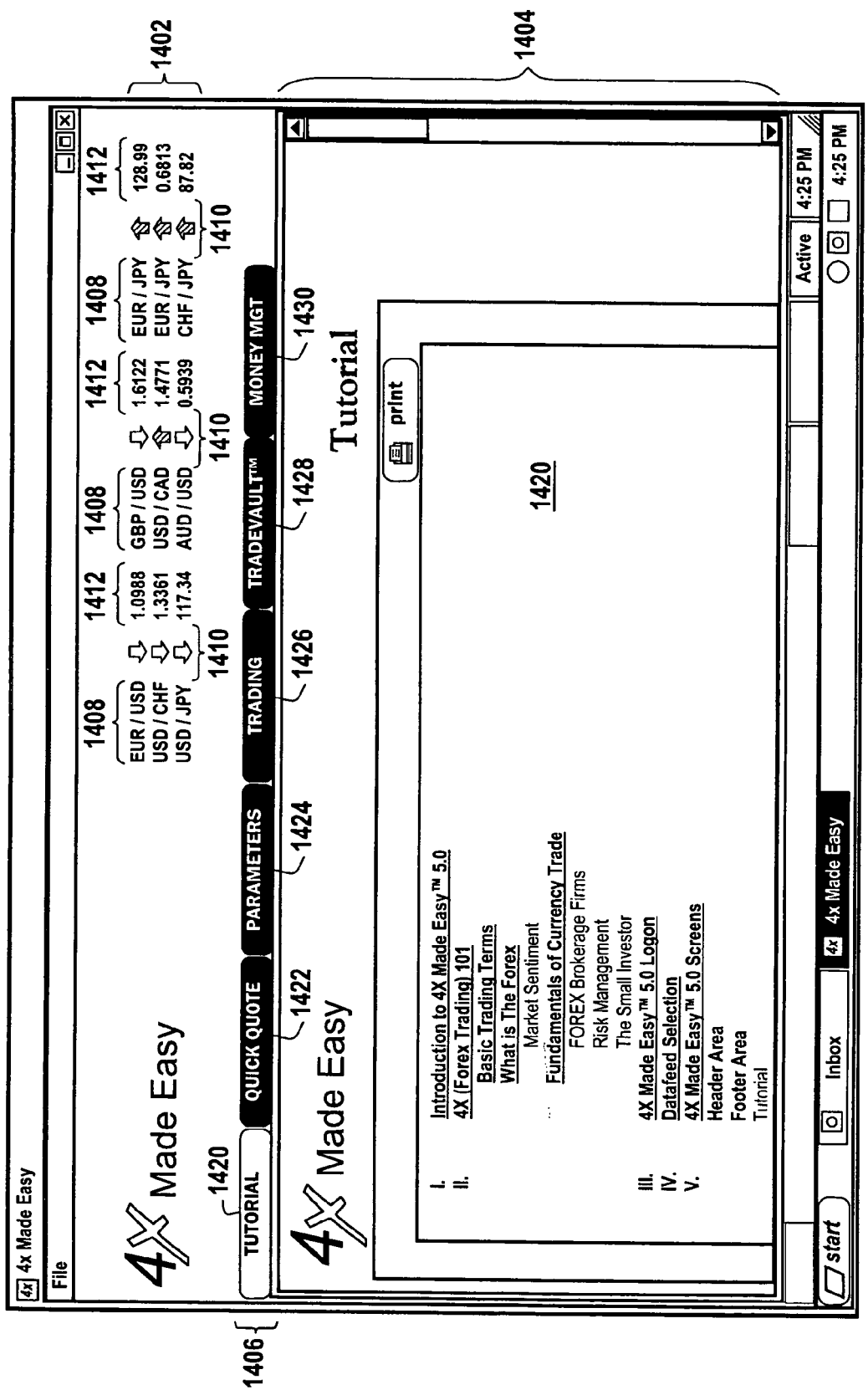
FIG. 14 is a Tutorial Screen in accordance with a FOREX embodiment of the present invention.

Now referring to FIG. 14, the Tutorial Screen 1420 will now be described. The Tutorial Screen 1420 contains information about FOREX trading and the software. This screen can be accessed by clicking on the Tutorial Screen tab 1420 from any other screen.

Figure 15:
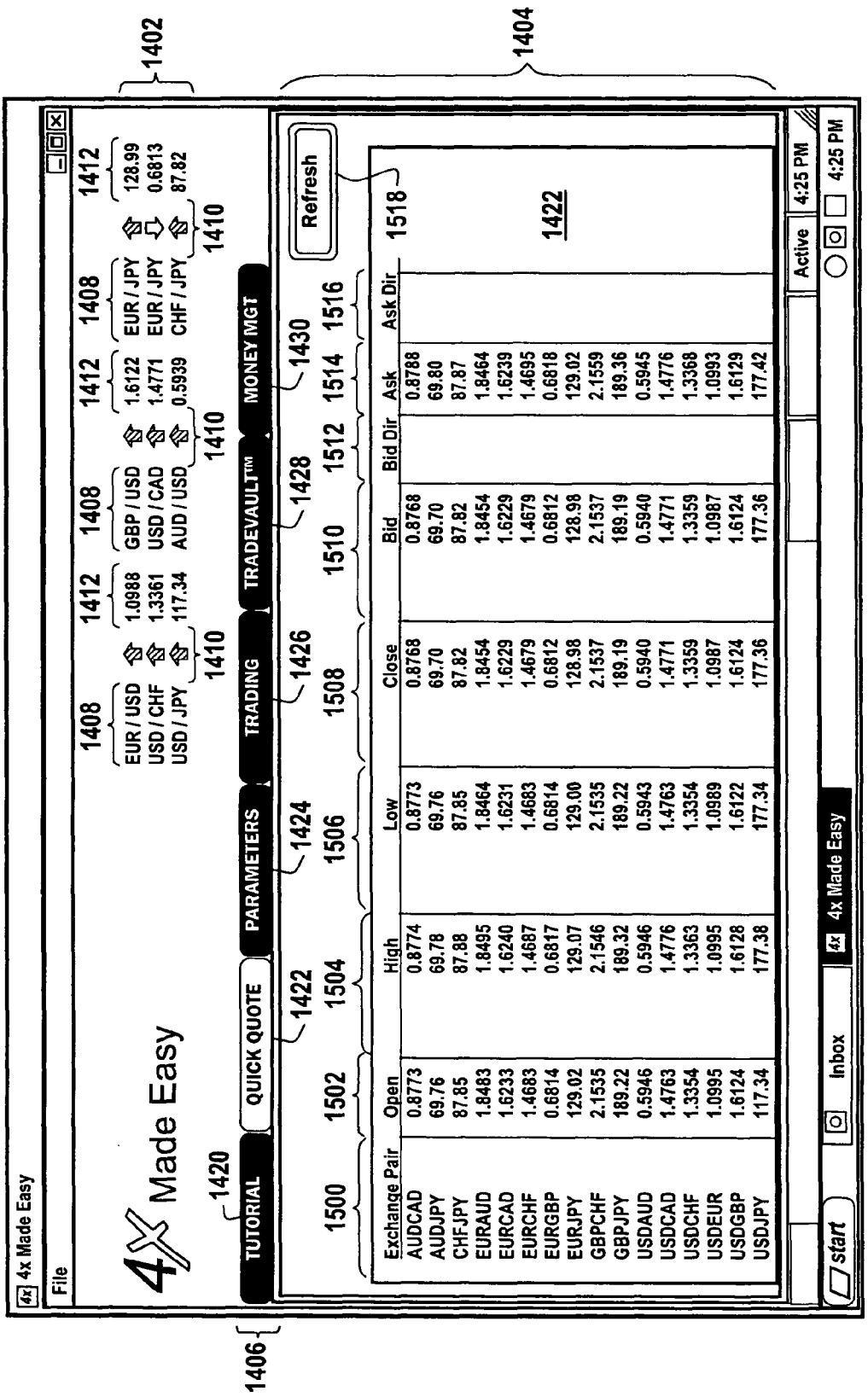
FIG. 15 is the Quick Quote Screen in accordance with a FOREX embodiment of the present invention.

Referring now to FIG. 15, the Quick Quote Screen 1422 provides an overview of all the current information for the exchange pairs. The Quick Quote Screen 1422 lists the Open 1502, High 1504, Low 1506, Close 1508, Bid 1510, Bid Direction 1512, Ask 1514 and Ask Direction 1516 for each exchange pair 1500. The Volume can also be listed. The data can be manually updated by clicking on the Refresh button 1518.

Figure 16:
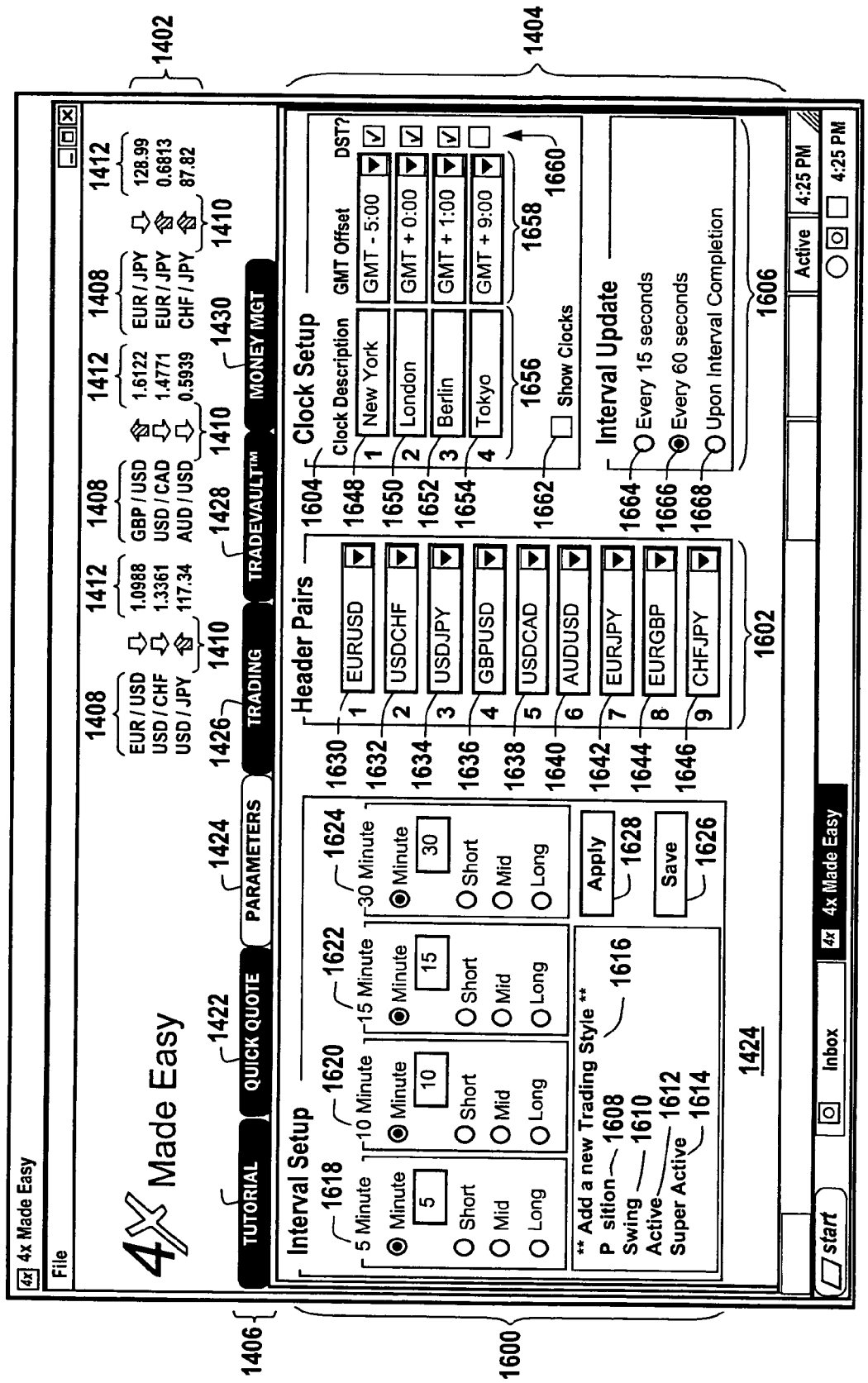
FIG. 16 is a Parameters Screen in accordance with a FOREX embodiment of the present invention.

Now referring to FIG. 16, the Parameters Screen 1424 allows the user to select the Interval Setup 1600, Header Pairs 1602 displayed in the header 1402, Clock Setup 1604 and Interval Update 1606. The Interval Setup 1600 allows the user to select different predefined trading styles (Position 1608, Swing 1610, Active 1612, Super Active 1614), or create his or her own custom trading style 1616. The trading styles 1608-1616 are used to set the four Trend Arrows for the Trading Screen 1426. The predefined trading styles 1608-1616 are:

POSITION or LONG TERM (30, 90, 240, Day intervals)—placing trading that will last one to three weeks or longer enabling you to take profit from the overall long-term trend;

SWING (30, 60, 90, 180 minute intervals)—placing trades for one to three days enabling you to take profit from intermediate trends;

ACTIVE (10, 30, 60, 90 minute intervals)—1, 30 minute up and down cycles within the above 2 trends; and SUPER ACTIVE or AGGRESSIVE (5, 10, 15, 30 minute intervals)—3, 5, 10, 15 minute trends within all of the above trends.

A custom trading style can be created by clicking and highlighting the "Add a new Trading Style" line 1616. The desired time frame is then entered into the Interval Setup boxes 1618, 1620, 1622 and 1624. The custom trading style 1616 can then be saved by clicking the Save button 1626. Any of the trading styles 1608-1616 can be selected and used to populate the Trading screen 1426 by clicking and highlighting the trading style 1608-1616 and then clicking the Apply or Select button 1628.

The Header Pairs 1602 that are displayed in the header section 1402 of the screens can be changed using the nine boxes 1630-1646 to select a exchange pair to be displayed. A pop-up menu of the available symbols will appear when the button in the appropriate box 1630-1646 is clicked. Once selected, the exchange pair will be automatically set on the top of the screens in header section 1402. The Clock Setup 1604 is used to set various time zones to be displayed. Up to four time zones 1648, 1650, 1652, 1654 can be displayed by providing a clock description 1656, GMT offset 1658 and whether Daylight Savings Time ("DST") 1660 is in effect. The clocks can be toggled on or off using the Show Clocks box 1662. The Interval Update 1606 can be set to update every 15 seconds, 60 seconds or upon interval completion by clicking on boxes 1664, 1666, 1668.

Figure 17:
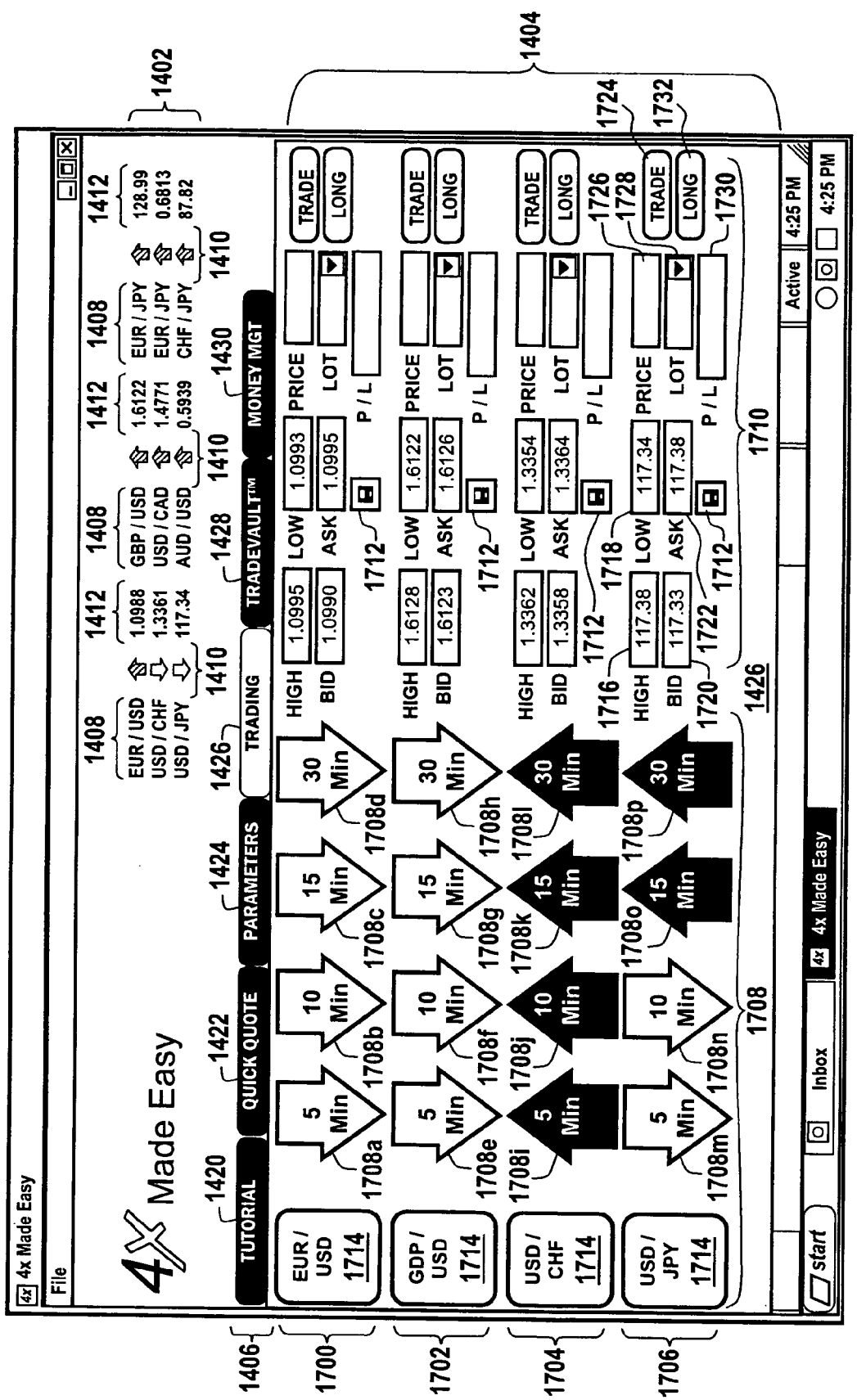
FIG. 17 is a Trading Screen in accordance with a FOREX embodiment of the present invention.

Referring now to FIG. 17, the Trading Screen 1426 provides detailed, real-time information on up to four currency pairs 1700, 1702, 1704, 1706 at a time that can be used to determine if the specific currency pair is viable for trading. The overall trend of these currency pairs is shown for various intervals by color coded indicator, such as up (green) and down (red) arrows 1708, as well as the last price, current bid and ask and the high and low for the day (collectively 1710). These indicators are preferably laid out in a grid fashion, but can be otherwise configured. Each indicator 1708a-1708d, 1708e-1708h, 1708i-1708l and 1708m-1708p represents information for an associated single currency pair 1700, 1702, 1704 and 1706. Each indicator 1708a-1708d, 1708e-1708h, 1708i-1708l and 1708m-1708p displays the chosen time interval for that indicator. Time intervals may be in minutes, hours, days, weeks or months. In the example shown, the time interval for indicators 1708a, 1708e, 1708i and 1708m is five minutes; the time interval for indicators 1708b, 1708f, 1708j and 1708n is ten minutes; the time interval for indicators 1708c, 1708g, 1708k and 1708o is fifteen minutes; and the time interval for indicators 1708d, 1708h, 1708l and 1708p is thirty minutes.

As will be described below in reference to FIG. 19, the present invention uses a regression analysis to calculate an opening value trend and a closing value trend for each of the time intervals for each of the investments 1700, 1702, 1704 and 1706. The color of the indicators 1708a-1708d, 1708e-1708h, 1708i-1708l and 1708m-1708p is based on a comparison of the opening value trend to the closing value trend for each time interval for each investment 1700, 1702, 1704 and 1706, and whether a long or short trade 1724 has been selected for the respective investments. If a long trade 1724 is selected, the indicators 1708a-1708d, 1708e-1708h, 1708i-1708l and 1708m-1708p will be a first color when the closing value trend is greater than the opening value trend for each time interval for each investment 1700, 1702, 1704 and 1706, and a second color when the closing value trend is less than the opening value trend for each time interval for each investment 1700, 1702, 1704 and 1706. For example, indicators 1708i, 1708j, 1708k 1708l, 1708o and 1708p are green in FIG. 17 indicating favorable trading conditions for investments 1704 and 1706 within the specified time intervals. Indicators 1708a, 1708b, 1708c, 1708d, 1708e, 1708f, 1708g, 1708h, 1708m and 1708n are red in FIG. 17 indicating unfavorable trading conditions for investments 1700, 1702 and 1706 within the specified time intervals. If, however, a short trade 1724 is selected, the indicators 1708a-1708d, 1708e-1708h, 1708i-1708l and 1708m-1708p will be the first color when the closing value trend is less than the opening value trend for each time interval for each investment 1700, 1702, 1704 and 1706, and the second color when the closing value trend is greater than the opening value trend for each time interval for each investment 1700, 1702, 1704 and 1706. Other colors may be used as the first color or the second color.

Figure 18:
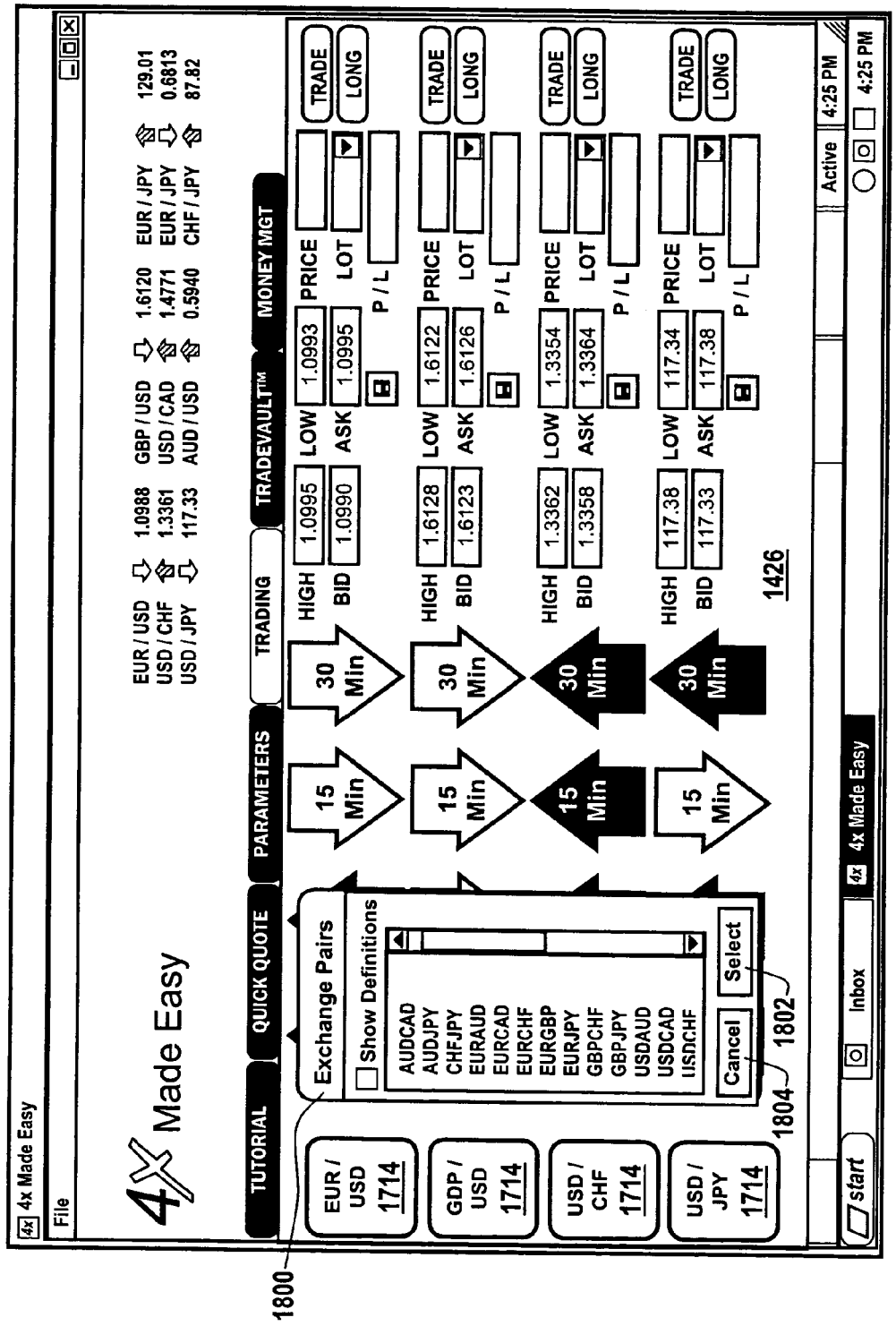
FIG. 18 is an Exchange Pairs List Screen in accordance with a FOREX embodiment of the present invention.

Each trade for a currency pair can be stored in the trade vault using button 1712. This information is then tracked with the real time profit and loss of the user's outstanding trades as well as historical record of the user's trades. The user can change the currency pair by clicking on the grey symbol buttons 1714. As shown in FIG. 18, button 1714 will display the Exchange Pairs List Screen 1800. The user changes the currency pair for the corresponding symbol button 1714 by selecting and highlights the desired currency pair and clicking the Select button 1802. The change can be cancelled by clicking the Cancel button 1804. Likewise, clicking upon any of the four arrow indicators 1708 in FIG. 17 will call up the corresponding charts screen 1900 (FIG. 19). Now referring back to FIG. 17, at the right end of each currency pair row 1700, 1702, 1704, 1706 on the Trading Screen 1426 is an area that displays numeric streaming (real-time) information for that pair. The streaming information displayed is:

- High 1716—The highest price listed on the trading chart;
- Low 1718—The lowest price listed on the trading chart;
- Bid Price 1720 and Ask Price 1722;
- TRADE 1724—The user clicks this to enter the price he or she entered the market at;.
- Price 1726—The user types in the price he or she entered the market;
- LOT 1728—Represents the amount of lots traded on this particular trade;
- P/L 1730—Presents the color coded real-time profit or loss of the trade (after deducting broker spread), which is calculated automatically and shown in the profit (P/L) text box; and
- LONG/SHORT 1732—If the green Long button is selected once it will toggle to a red Short button, and recalculate the profit or loss as if you were "selling short"; and
- DISKETTE Button 1712—Saves the trade to the trade vault.

Figure 19:
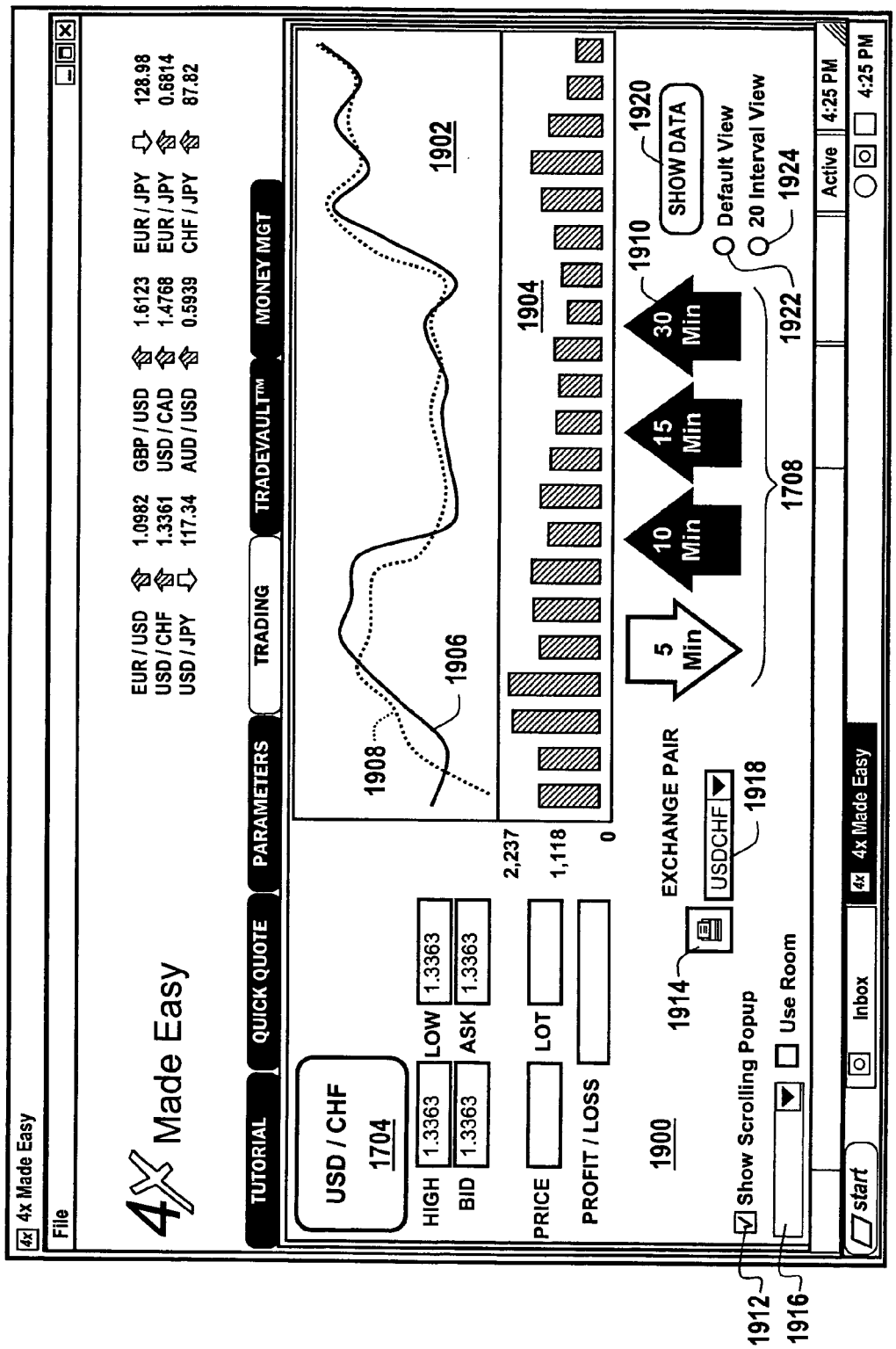
FIGS. 19, 20 and 21 are various Chart Screens in accordance with a FOREX embodiment of the present invention.

Now referring to FIG. 19, the Chart Screen 1900 is displayed for the selected arrow and time frame of the currency pairs 1700-1706 (FIG. 17) by clicking on one of the four trend arrows 1708 (FIG. 17). The Chart Screen 1900 initially displays two graphs 1902 and 1904. The upper graph 1902, which is a multiple linear regression chart (MLR), displays two color coded regression lines, a red line 1906 and a green line 1908, generated using the present invention's algorithm against the selected time interval. The present invention preferably uses red to indicate opening prices and green to indicate closing prices. Other colors can be used. In general, the red line 1906 incorporates the algorithms and factors that tend to drive a price downward. Conversely, the green line 1908 integrates the algorithms and factors tend to drive the price upward. A user can quickly determine his or her your entry and exit points based on the crossover lines, which are displayed with red and green lights.

Any position on the green regression line 1908 represents a regression of a prior number of period's closing prices, such as four (4) prior five minute interval closing prices. This regression analysis builds and displays a trend of the closing prices of the investment 1704 over a period of time. Any position on the red regression line 1906 represents a regression of a prior number of period's opening prices, such as three (3) prior five minute interval opening prices. The current interval's opening price is not included in this calculation. This regression analysis builds and displays a trend of the opening prices of the investment over a period of time. When the green regression line 1908 is above the red regression line 1906 on the chart, favorable conditions for a long trade occur. When the red regression line 1906 is above the green regression line 1908 on the chart, favorable conditions for a short trade occur. A critical point occurs when the red regression line 1906 and the green regression line 1908 cross. When the green regression line 1908 crosses the red regression line 1906 and ascends above the red regression line 1906, the associated time interval indicator 1708 will become green. When the red regression line 1906 crosses the green regression line 1908 and ascends above the green regression line 1908, the associated time interval indicator 1708 will become red. The longer term trend indicators 1708 start to turn red as the movement continues. If a long position was initiated on the symbol currently being analyzed, an exit point would be increasingly considered as more lights 1708 turned from green to red. Conversely, if the user was in a short trade, as more and more indicators 1708 changed from red to green, the more imminent the time to cover the short. There is a separate chart associated with each time interval indicator 1708. As the present invention updates the calculations and the indicators change, the investor can be notified via audible or visual alerts. The present invention can also sent electronic notifications to the investor.

More specifically, the algorithm uses seven critical data factors to perform "real-time" calculations at the rate of 800-1500 calculations per second to determine point of entry, point of exit, and trend analysis. The first four indicators are the Open, High, Low, and Close of each of the four time intervals. The next two are each Up tick and Down tick for every one of the four time intervals. The last, and most important, of the seven critical data factors is the Historic Data, exponentially weighted to volume because of the intrinsic price properties as it relates to the investment's price performance. The present invention then takes these seven critical data factors and integrates them into two summation formulas, the X+Y (represented by the green line) and the X−Y (represented by the red line). Both summation formulas are then calculated by an algorithm, which is then displayed by a red/green light indicator 1708 (FIG. 17).

The investor may obtain more detailed information concerning a specific point along either the green regression line 1908 or the red regression line 1906 by clicking on the line at the desired point. Note that graphs 1902 and 1904 are only representative of the market trend indicators and analyses available. The selection of multiple linear regression and volume analyses for a preferred embodiment of the present invention does not indicate that the present invention is limited to only those market trend indicators. There are many market trend indicators that the investor can consult to make better trade decisions, such as the following: stochastics, relative strength, directional movement, commodity channel, simple average, exponential average weighted average, MACD (simple), MACD (exponential), momentum/ROC, midrange, William's % R, parabolic stop, volatility stop, trailing stop, high low stop, Bollinger Bands, Keltner Channel, uniform channel, regression channel, swing lines, cycle forecast, on balance volume, overlay chart, point & figure, moving average, moving linear regression, upper envelope, lower envelope, % K, % D, % D slow, % D averaged, % R, RSI, momentum, acceleration, moving average oscillator, moving average momentum, moving average convergence-divergence oscillator, moving average convergence-divergence, MACD signal line, commodity channel index, rate of change in prices, on balance volume variance, standard deviation, volatility ratio, volatility, skew, kurtosis, Williams Accumulated Distribution, Arm's Ease of Movement, plus directional indicator, minus directional indicator, directional movement and average directional movement.

The lower chart 1904 displays the volume of the Bid and Ask prices traded during each interval. The four trend arrow indicators lights 1708 for the selected currency pair are displayed below the lower chart 1904. The trend arrow indicator with the yellow outline 1910 is the interval currently displayed in the graphs. At the bottom of the Chart Screen 1900 are controls that enable the user to view the desired time interval, show or hide the historical data for the selected symbol and print the charts. These controls are as follows:

Scrolling popup check box 1912—allows the user to view the interval information as the mouse moves over the chart;

Printer button 1914—used to print the charts;

Chart popup 1916—allows the user to have view multiple charts at once (there is no limit on the number of popups the user may view);

Exchange Pair list box 1918—allows the user to switch between the four selected exchange pairs on the Trading Screen;

Trend Indicators 1708—clicking on these indicators will change the charts 1902 and to reflect that time intervals information and a yellow outline 1910 appears around the arrow Trend Indicator;

SHOW/HIDE Data 1920 (See FIG. 21)—used to toggle between the volume graph and the historical data for the selected time interval (the user may toggle between the bars and the data grid by pressing the Alt-V Keys); and Default view radio button 1922 (See FIG. 20) and 20 interval view radio button 1924 (FIG. 19)—allows the user to switch between the number of intervals on the chart (the Alt-G keys allow the user to toggle between the two views).

Figure 20:
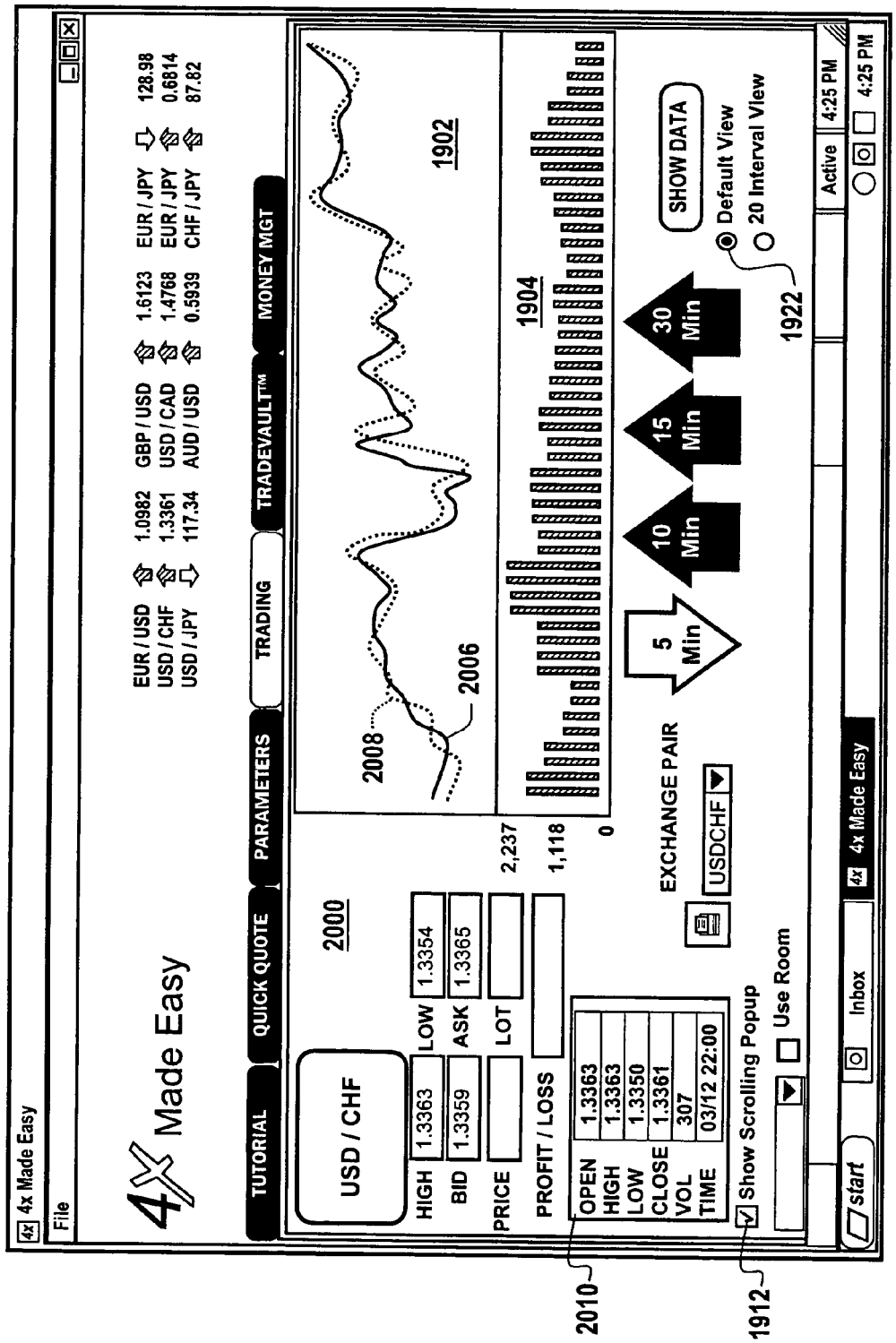

Referring now to FIG. 20, another Trading Screen 2000 is shown after clicking on the Default view radio button 1922. As with FIG. 19, Trading Screen 2000 has an upper graph 1902 and a lower graph 1904. The difference is that the upper graph 1902 and lower graph 1904 in Trading Screen 2000 display data for the entire day instead of only twenty intervals. The upper graph 1902 displays a red line 2006 and a green line 2008 generated using the present invention's algorithm against the selected time interval. In addition, the Show Scrolling Popup 1912 window 2010 is shown that allows the user to view the following data for a selected interval:

OPEN—the opening price for the time period;
HIGH—the highest price the currency pair reaches during this time frame;
LOW—the lowest price the currency pair reaches during this time frame;
CLOSE—the closing price for the time period;
VOL—the volume of Bid and Ask changes during the time period (Note that no volume is registered for Daily charts or longer); and
TIME—shows the time and date of the period that is being viewed.

The Scrolling Popup window 2010 is displayed by clicking in the white box beside the Show Scrolling Popup 1912 and clicking on the red line 2006 or green line 2008 in the upper graph 1902. This will cause the black boxes to appear at each time interval in the upper graph 1902. The user then clicks on the desired black box in the upper graph 1902. As the user scrolls the mouse to any black box, the appropriate data will appear in the Scrolling Popup window 2010. The user can hide the Scrolling Popup window 2010 by again clicking of the white box 1912 to uncheck it.

Figure 21:
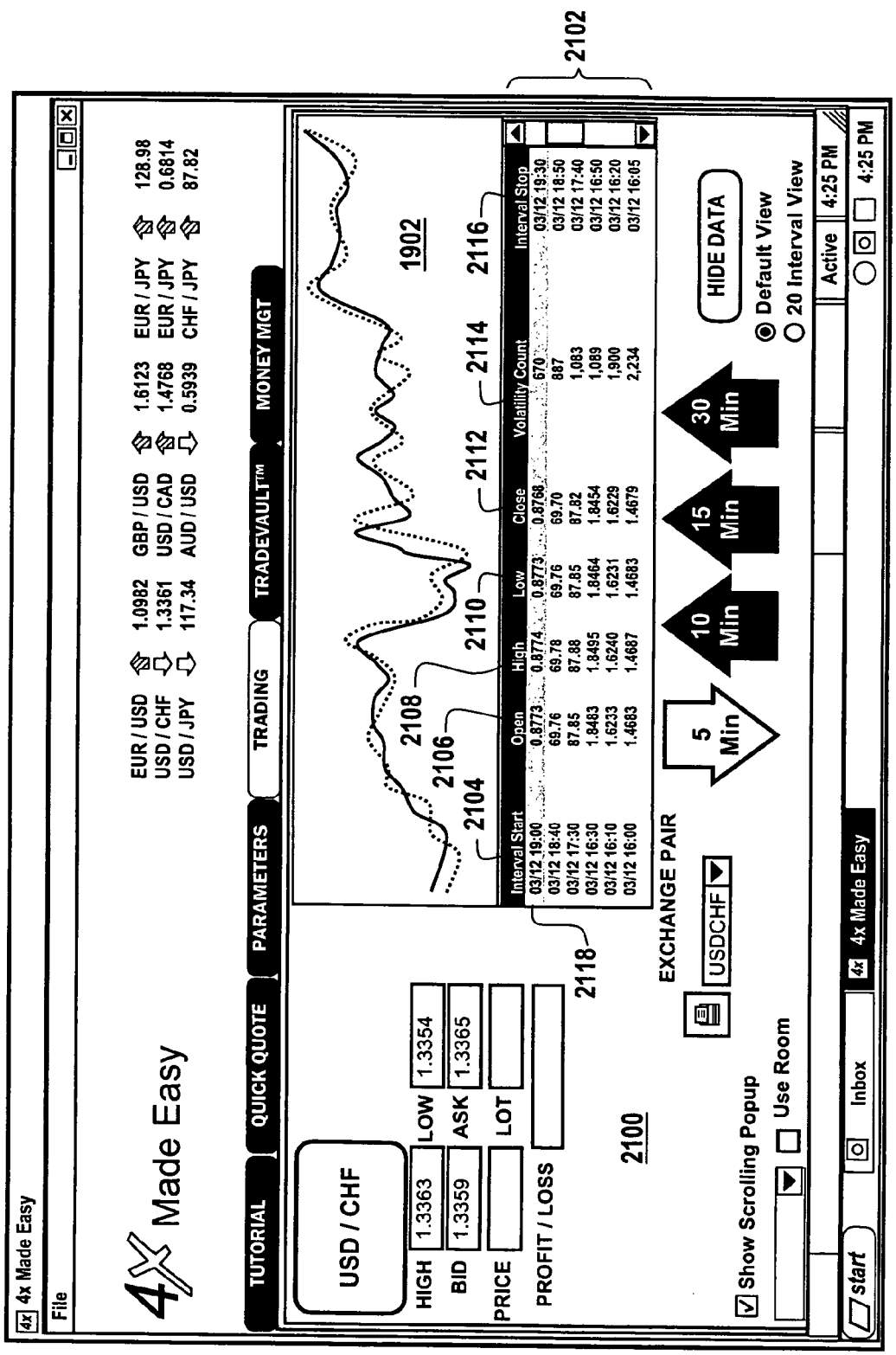

Now referring to FIG. 21 a trading Chart Screen 2100 is shown wherein the historical data 2102 is shown and the volume data 1904 (FIGS. 19 and 20) is hidden. The historical data 2102 is displayed by clicking on the yellow Show Data button 1920 (FIG. 19). Once this button 1920 is selected, the historical data 2102 will appear and the yellow button's 1920 caption changes to Hide Data. The historical data 2102 grid contains the following information:

Interval Start 2104—this is the intervals start time (for minute intervals, the start time is always at the zero second of the minute);
Open 2106—this is the opening price symbol for the selected time interval;
High 2108—this is the highest price the symbol reached during the selected time interval;
Low 2110—this is the lowest price the symbol reached during the selected time interval;
Close 2112—this is the last price for the symbol for the selected time interval;
Volatility Count 2114—this is a measure of the volatility during the selected time interval; and
Interval Stop 2116—this is the intervals stop time (for minute intervals the stop time is always at the 59th second of the minute).

As the mouse is moved across the upper graph1902, the historical data 2102 grid's highlighted row will change and correspond to the time interval that the cursor is pointing to. The highlighted row 2118 will have a blue foreground color and a white background color.

Figure 22:
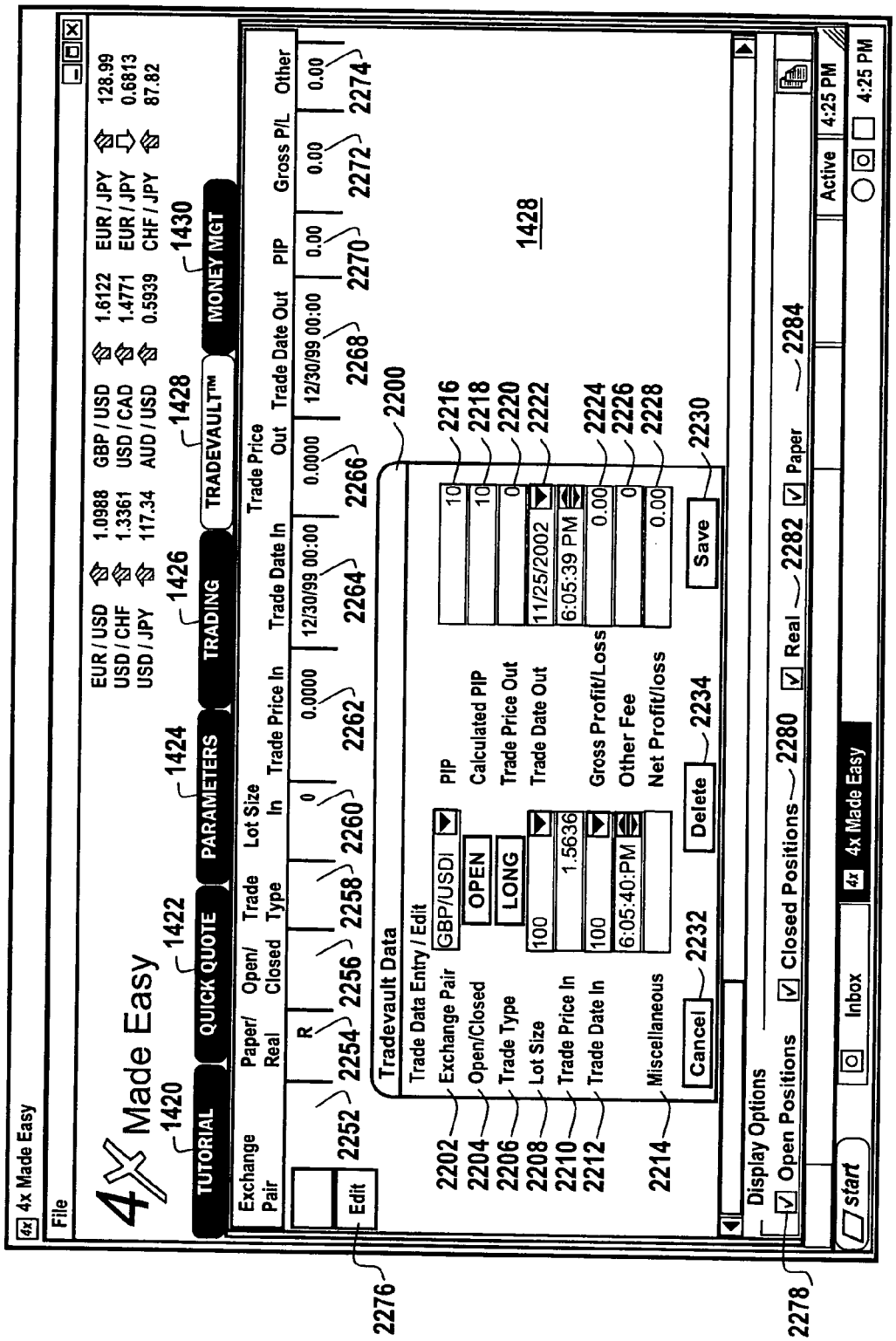
FIG. 22 is a Trade Vault Screen in accordance with a FOREX embodiment of the present invention.

Referring now to FIG. 22, the Trade Vault Screen 1428 is shown. The Trade Vault Screen 1428 is an extensive trade journal that tracks the user's complete trading history and is a valuable application to keep the user's trading profits organized for easy tax preparation purposes. When the Save button 1712 (FIG. 17) is clicked for a selected currency pair, a Tradevault pop up window 2200 is displayed to allow the user to add or modify all the information for adding paper and/or real trades. The Tradevault pop up window 2200 contains the following information:

Exchange Pair 2202—name of the symbol that the trade is associated with;
Open/Closed 2204—shows whether the trade is still active or closed out;
Trade Type 2206—shows if the trade was executed as a Long or Short position;
Lot Size 2208—shows the amount of lots traded;
Trade Price In 2210—shows the price the trade was executed at;
Trade Date In 2212—shows the date and time the trade was executed;
Miscellaneous 2214—allows the user to make a note about this trade;
PIP 2216—shows the spread commission paid to the broker;
Calculated PIP 2218—shows the calculated spread;
Trade Price Out 2220—the user enters in the exited price for the trade;
Trade Day Out 2222—shows the day and time the exited trade was executed;
Gross Profit/Loss 2224—shows the amount made or lost on the trade;
Other Fees 2226—any other fee that may take place during a trade, such as overnight interest, etc.; and Net Profit/Loss 2228—any profits or losses minus any other fees associated with the trade.

Once all the data is filled in, the user clicks the Save button 2230 to save the trade in the Tradevault, which in turn fill in the appropriate fields 2252-2274 on the Trade Vault Screen 1428. The transaction can be cancelled using the Cancel button 2232. In addition, the trade can be deleted using the Delete button 2234. The data is arranged with the open trades at the bottom, followed by the most recently closed trades. The trades can be edited by clicking on the edit button 2276. In addition, the trades displayed on the Trade Vault Screen 1428 are controlled by the Display Options boxes:

Open Positions 2278—displays open positions;
Closed Positions 2280—displays closed positions;
Real 2282—displays real trades; and
Paper 2284—displays paper trades.

If the Price 1726 (FIG. 17) and Lot 1728 (FIG. 17) text boxes on the Trading Screen 1426 (FIG. 17) have been filled in, that data is automatically transferred to the Tradevault pop up window 2200. Also, once a trade has been saved to Tradevault 1428 for a trade, the data for the Price1726 (FIG. 17), Lot 1728 (FIG. 17) and Short/Long button 1732 (FIG. 17) will repopulate for the symbol until the open trade is closed.

Figure 23:
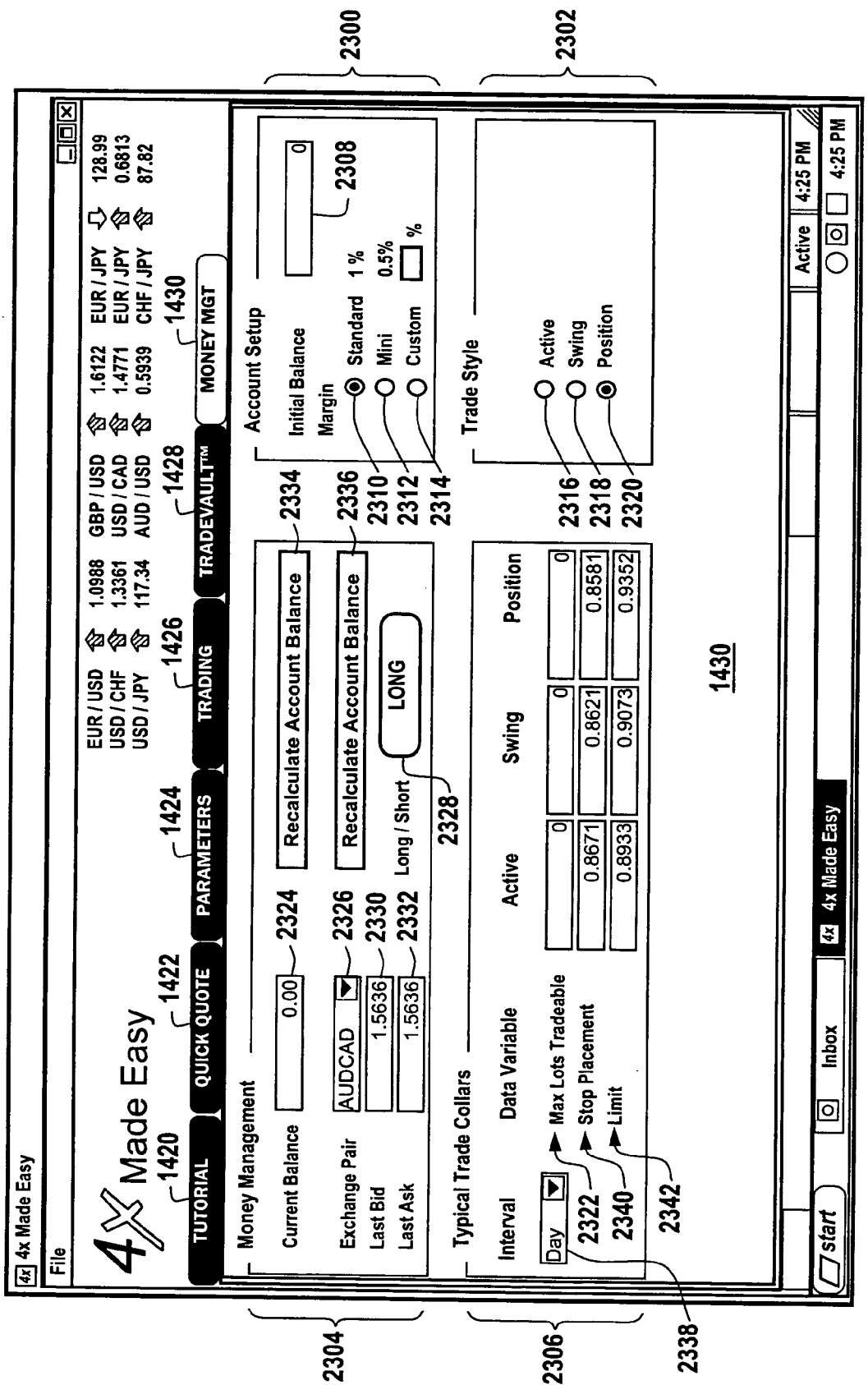
FIG. 23 is a Money Management Screen in accordance with a FOREX embodiment of the present invention.

Now referring to FIG. 23, the Money Management Screen 1430 is shown. The Money Management Screen includes an Account Setup section 2300, Trade Style section 2302, Money Management section 2304 and Typical Trade Collars sections 2306. The user enters his or her beginning account balance in the Initial Balance 2308 and selects the amount of margin to be used (Standard (1%) 2310, Mini (½%) 2312 or Custom (amount entered by user) 2314). The user also selects the type of trading style to be used (Active 2316, Swing 2318 or Position 2320). All of the user's wins and losses should be saved in the Tradevault 1428 to keep a running total of the user's balance for the built-in Leverage Ratio. The Leverage Ratio tells the user in the Max Lots Tradable 2322 how many lots one should be trading based on their account balance.

The Money Management section 2304 displays the Current Balance 2324, allows the user to select an Exchange Pair 2326 and whether it is Long or Short 2328, and displays the Last Bid 2330 and Last Ask 2332 for the selected exchange pair. The user may also Recalculate the Account Balance using button 2334 and Recalculate the Money Management screen using button 2336. Once the user selects an Interval 2338, the calculator determines the Max Lots Tradeable 2322, the Stop Placement 2340 and Limit 2342 for the three different trading styles (Active, Swing and Position). The user should use the longest chart (Interval) that he or she normally uses to be what the Risk Reward Ratios are calculated on. So if the user is using a 90-minute chart, the calculator should be set to 90. The 30-minute calculation is the shortest recommended interval. For example, a super active trader should use the 30 minute minimum calculations to provide the user both room for the trade to work and a large enough profit to allow the user to make money. Likewise, a long term trader should not use an interval longer than a Day calculation. Moreover, if the user's Stop Placement 2340 on the Position style exceeds 100 pips or more than $1,000 it would be wise to call the broker and be put on a 2% to 3% margin rather than 1% to provide plenty of room to move.

For example, an aggressive active trader would click on the Active button 2316, select the 30 chart calculations 2338 and use the Max Lots Tradeable 2322, Risk and Reward Ratios (Stop Placement 2340 and Limit 2342) under the Active column. A more conservative type of active trader would use the Swing column and a very conservative active trader would use the Position column. The Risk vs. Reward ratios go from 1 to 1 12 for Active to 1 to 2 for Swing and 1 to 3 for Position. This means for each dollar the user is willing to risk, the user is looking to make between 1 12 to 3 on the up side of the trade (a 5 PIP spread is figured into the calculations as well). The Stop Placement 2340 (Risk Ratio) are calculated to the Average True Range of the market to the trading style chosen. The Reward Ratio is then calculated 1 12 to 3 times the Risk for the upside potential. When using the Stop Placement 2340, the user should not increase the size of the stops. The user should only move the stops forward to protect profits or limit losses in the event the market moves in the direction of the user's trade.

For example, a user went Short on the USD/JPY at 120.50, the Stop Placement 2340 is calculated to 120.70 and the Limit 2342 is set to 120.20. If the market then moves in the expected direction and the current price of the USD/JPY is 120.35, the user would recalculate the Stop Placement 2340 and trail it down to either limit the user's losses or protect profits, wherever the calculator indicates. If the market moves against the user, the Stop Placement 2340 should not be increased. The calculator measures the Average Range of the market and if the Stop Placement 2340 is reached, then the likelihood of the market continuing in that direction is much higher than it is coming back the user's way.

Figure 24A:
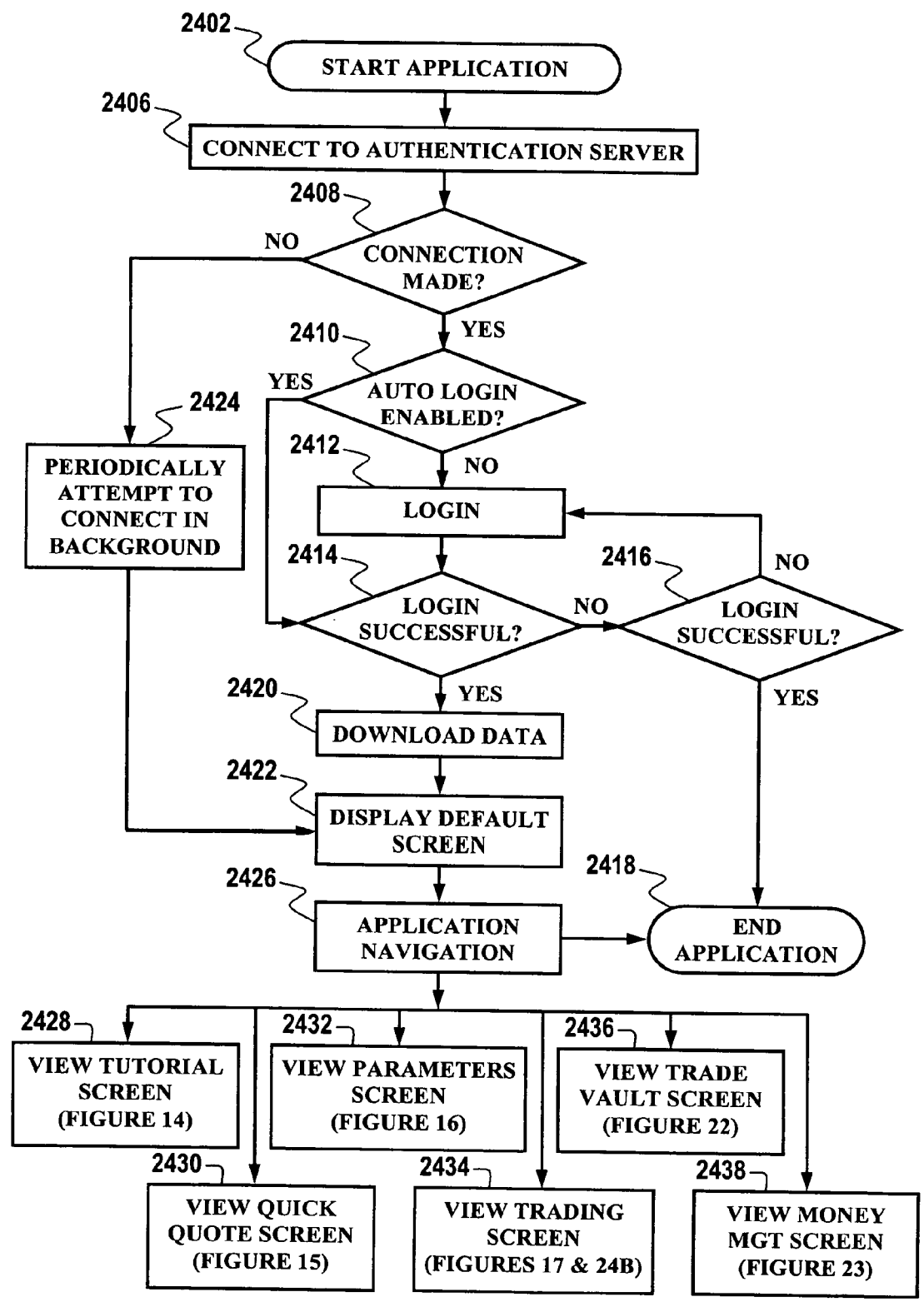
FIG. 24A is a flowchart illustrating the application start-up and processing flow in accordance with a FOREX embodiment of the present invention.
Figure 24B:
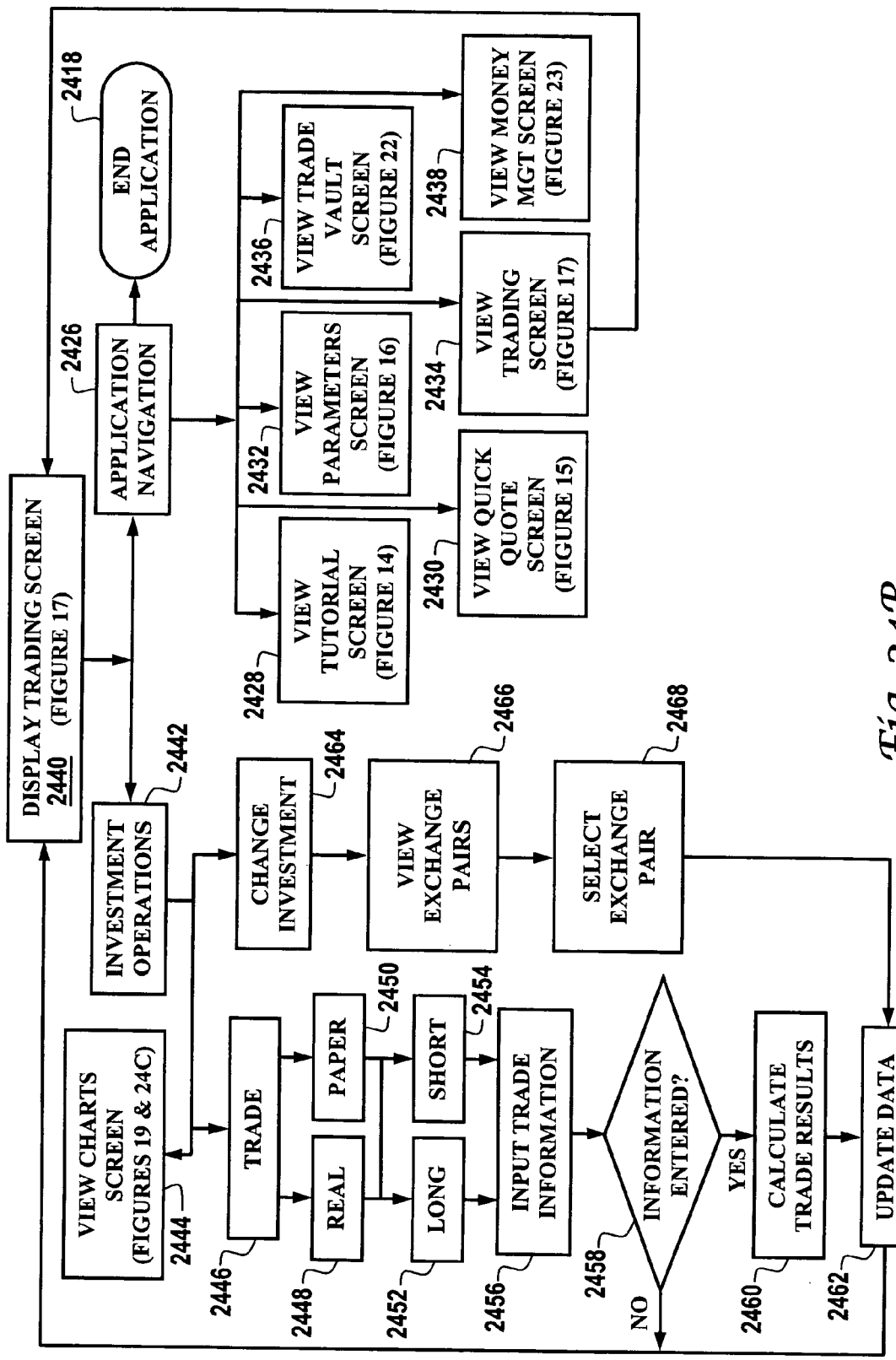
FIG. 24B is a flowchart illustrating the processing flow for the Trading Screen in accordance with a FOREX embodiment of the present invention.
Figure 24C:
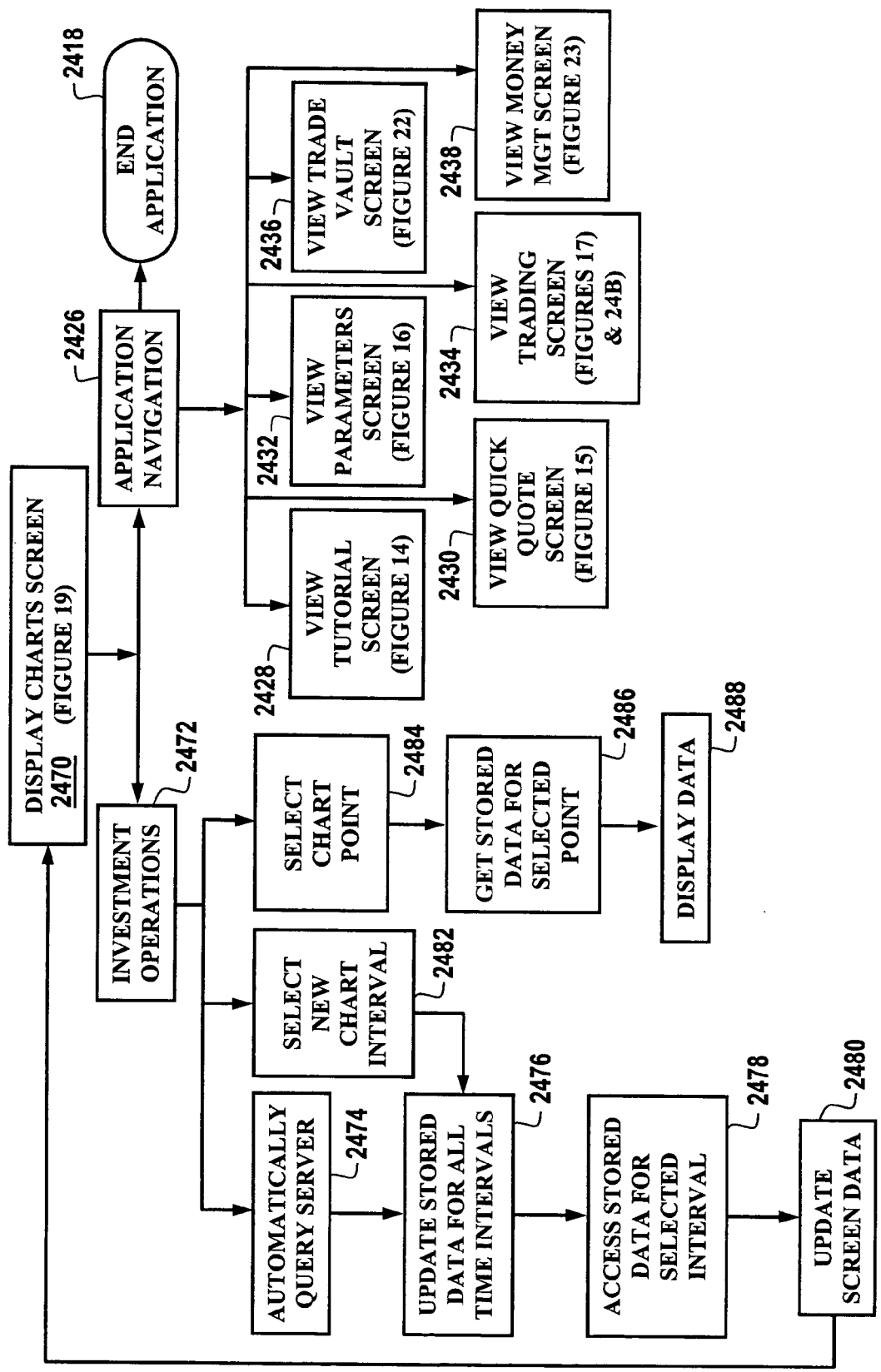
FIG. 24C is a flowchart illustrating the processing flow for the Charts Screen in accordance with a FOREX embodiment of the present invention.

FIGS. 24A-24C display the processing flows for the options of screens FIGS. 14-23. Application Navigation 2426 is the same in each of the system screens. Selecting View Tutorial Screen 2428 displays the screen shown in FIG. 14. Selecting View Quick Quote Screen 2430 displays the screen shown in FIG. 15. Selecting View Parameters Screen 2432 displays the screen shown in FIG. 16. Selecting View Trading Screen 2434 displays the screen shown in FIG. 17, enabling its associated processing of FIG. 24B. Selecting View Trade Vault Screen 2436 displays the screen shown in FIG. 22. Selecting View Money Management Screen 2438 displays the screen shown in FIG. 23.

FIG. 24A focuses on the application start-up of this embodiment of the present invention. The present invention starts in block 2402 where the investor 150-160 (FIG. 1) connects to the authentication server (FOREX commodity market 130 FIG. 1) in block 2406. The specific servers that may be connected to and the details regarding the connection to be established are typically setup during the installation process of the software. If the connection is made, as determined in decision block 2408, and the auto login is not enabled, as determined in decision block 2410, the present invention prompts the investor to login in block 2412, which preferably supplies investment information updates in real-time or near-real-time. If the login is successful, as determined in decision block 2412, the application downloads investment information (data) in block 2420 and displays the default screen in block 2422. If, however, the connection was not made, as determined in decision block 2408, the process will periodically attempt to connect to the authentication server in the background in block 2424 and display the default screen in block 2422. Thereafter, the investor is free to navigate through the application in block 2426. If, however, the auto login feature was enabled, as determined in decision block 2410, the investor's login information will be entered and the login will be automatically attempted, and if successful, as determined in decision block 2414, the investment information (data) will be downloaded in block 2420. If, however, the login was not successful, as determined in decision block 2414, and a maximum number of login attempts have not been made, as determined in decision block 2416, the investor is prompted to reenter the login information in block 2412. If, however, the maximum number of login attempts has been made, as determined in decision block 2416, the application ends in block 2418.

The processing of the Trading Screen 2434 (See FIG. 17) is shown in FIG. 24B. The Trading Screen 1426 (FIG. 17) is displayed in block 2440. As previously described, the investor can navigate through the application via block 2426 to the various screens 2428, 2430, 2432, 2434, 2436, 2438 or end the application in block 2418. The investor can also trade using the investment operations in block 2442. More specifically, the investor can view the Charts Screen (See FIGS. 19 and 24C) in block 2444, initiate a trade in block 2446 or change the investment being displayed in block 2464. To initiate a trade in block 2446, the investor selects either a real trade in block 2448 or a paper trade in block 2450, and either a long trade in block 2452 or a short trade in block 2454. The process flows for the real trade 2448, paper trade 2450, long trade 2452 and short trade 2454 are identical except for the data used and the calculations performed. These calculations were previously described above. In order to perform the calculations, the system must have trade information with which to operate. Therefore, the investor has to supply trade information in block 2456. If the investor has not input trade information, as determined in decision block 2458, the system continues to display the current Trading Screen in block 2440. If, however, the investor has entered the trade information, the system calculates the trade results in block 2460, updates the data in block 2462 and displays the Trading Screen in block 2440. If the investor wants to change the investment being displayed in block 2464, the investor views the exchange pairs in block 2466 and selects an exchange pair in block 2468. The system then updates the data in block 2462 and displays the Trading Screen in block 2440.

The processing of the Charts Screen 2470 (See FIG. 19) is shown in FIG. 24C. The Charts Screen 1900 (FIG. 19) is displayed in block 2470. As previously described, the investor can navigate through the application via block 2426 to the various screens 2428, 2430, 2432, 2434, 2436, 2438 or end the application in block 2418. The investor can also modify the charts using the chart data operations in block 2472. More specifically, the investor can update the data in block 2474, select a new chart interval in block 2482 or select a chart point in block 2484. As set forth in the Parameters Screen 1424 (FIG. 16), the system will periodically update the data by automatically querying the server in block 2474 and updating the stored data for all time intervals in block 2476. The stored data is then accessed for the selected interval in block 2478, the screen data is updated in block 2480 and the Charts Screen is displayed in block 2470. The investor may select a new chart interval in block 2482, whereby the system will access the stored data for the selected interval in block 2478, update the screen data in block 2480 and display the Charts Screen in block 2470. The investor can also select a chart point in block 2482, whereby the system will get the stored data for the selected point in block 2486 and display the data for the selected point in block 2488.

Referring now to FIGS. 25A-D, the following steps describe a blueprint for a successful trade using the present invention:

1. Identify your Trading style—determine the desired timeframe for holding a trade and select or customize a trading style in the Parameters Screen 1424 (FIG. 16) that meets the desired timeframe.
2. Check for Color—all four arrows 1708 should be the same color (green or red) in the Trading Screen 1426 (FIGS. 17-21) (Note that the lights only reveal the direction of movement (up or down), so when all arrows are the same color, the currency pair has an established trend).
3. Evaluate the Charts—look for NEW, STRONG, and STABLE movement using the F.A.S. criteria for evaluation: F—fresh cross (FIG. 25B), A—angle (FIG. 25C), S—separation (FIG. 25D). Review and use F.A.S.T. with every trade:
   F. Fresh Cross—indicates a New Movement—Green and Red Lines crossover in last 2 time frames of the chart;
   A. Angle—indicates a Strong Movement—Green and Red Lines traveling in the same direction;
   S. Separation—indicates a Stable Movement—Distinguishable separation between lines, the wider the better; and
   T. Timing—timing the entry and exit of the trade.
4. Time the Entry—the chart of the far right arrow, known as the Foundation Arrow, must have F.A.S. Then, the second arrow from the left, the Entry Arrow, must have F.A.S. Finally, check the far left arrow for good Angle and visible Separation. Utilizing these steps of evaluation will enhance the opportunity for maximize profitable trades.
5. Set the Exit—once the trade has been made, set a Stop Loss order to reduce risk and minimize losses. Also, set a Limit order to take profit at a specific price point. As the trade progresses in the direction towards the Limit Order, move the Stop Loss order towards the Limit order to lock in profits.
6. Money Management—the utilization of proper money management rules will preserve capital and reduce risk.
7. Check for Common Pitfalls—exceptions know no rules. Successful Forex traders are, therefore, aware of trading pitfalls such as: influence of economic events and news, trading without a Stop Loss, trading against the trend, changing plans mid-stream, and emotional trading. Check for common pitfalls in conjunction with steps 4 and 5.

Figure 25A:
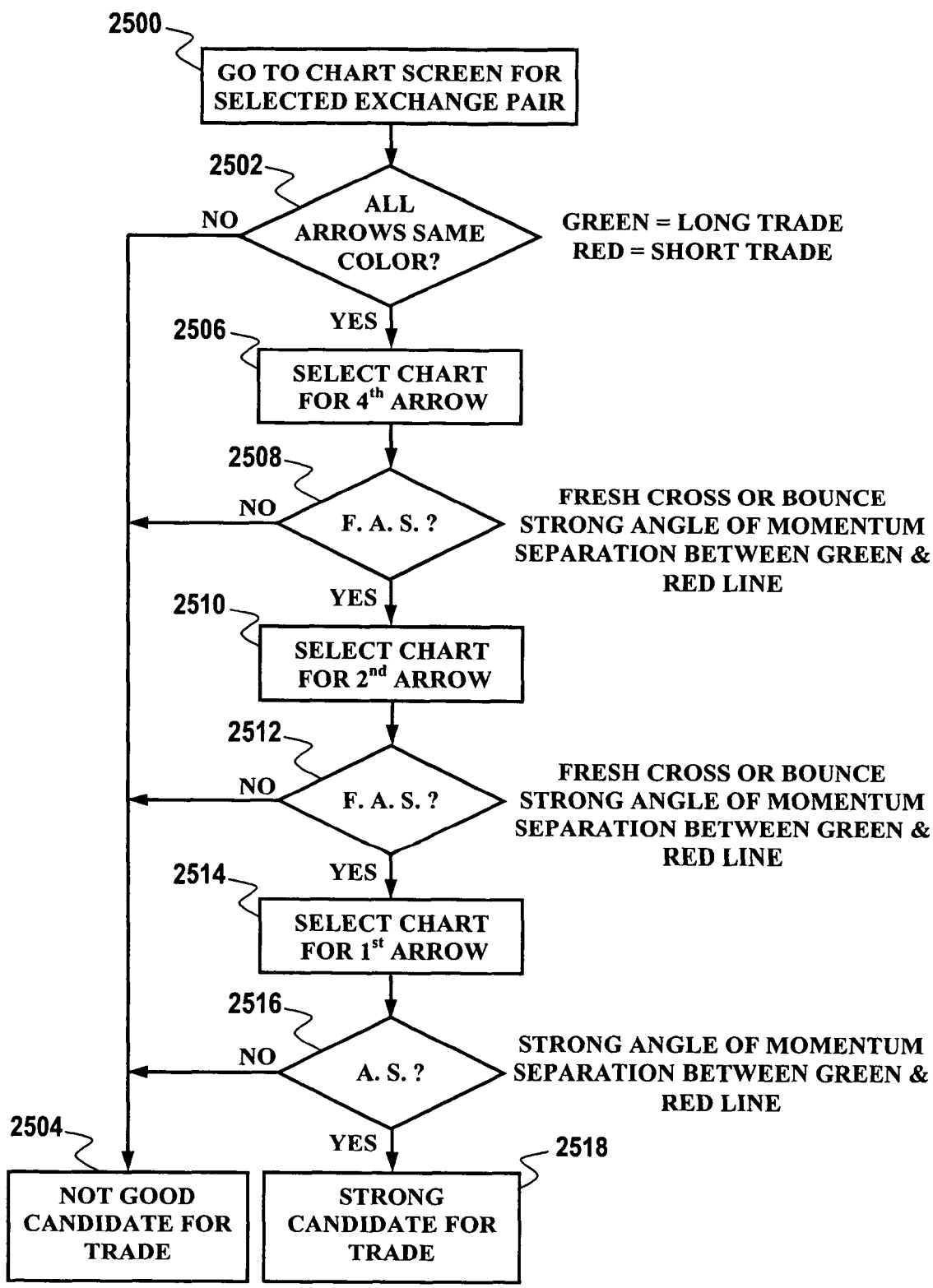
FIGS. 25A, 25B, 25C and 25D are charts describing a blueprint for a successful trade using the present invention.
Figure 25B:
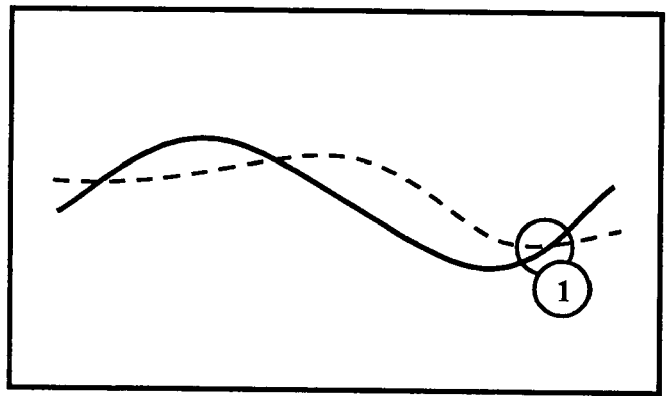
Figure 25C:
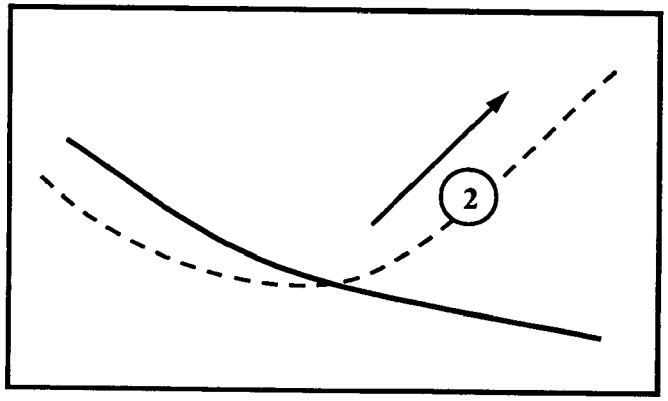
Figure 25D:
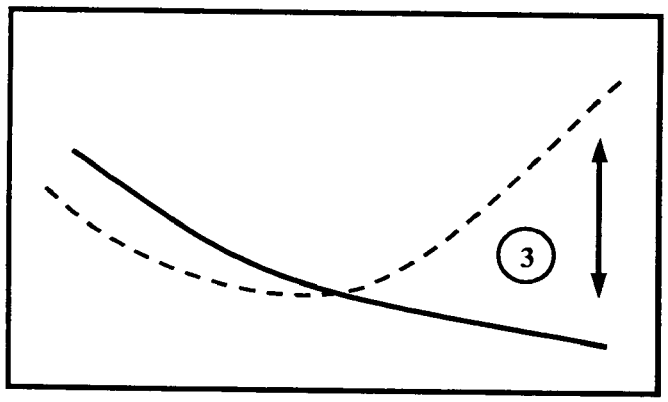

More specifically, steps 2, 3 and 4 are illustrated in FIG. 25A. The user goes to the Chart Screen for the currency that is to be analyzed in block 2500. If all of the light indicators are not the same color (Green for a long trade and Red for a short trade), as determined in decision block 2502, the currency is not a good candidate for a trade at this time as indicated by block 2504. If, however, all of the light indicators are the same color, as determined in decision block 2502, the chart for the fourth arrow (farthest to the right) is selected in block 2506. If the F.A.S criteria for the fourth arrow are not met, as determined in decision block 2508, the currency is not a good candidate for a trade at this time as indicated by block 2504. F. means that there is a fresh cross or bounce on the chart (See FIG. 25B). A. means that there is a strong angle or momentum (See FIG. 25C). S. means that there is separation between the green and red line (See FIG. 25D). If all of these criteria are met, as determined in decision block 2508, the chart for the Entry Window or second arrow (second from the left) is selected in block 2510. If the F.A.S criteria for the second arrow are not met, as determined in decision block 2512, the currency is not a good candidate for a trade at this time as indicated by block 2504. If, however, the F.A.S. criteria are met, as determined in decision block 2512, the chart for the first arrow (farthest to the left) is selected in block 2514. Note that if the Entry Window is 60 minutes or less, look for a FRESH CROSS in the last 3 time intervals; otherwise look for a FRESH CROSS in the last 2 time intervals. If the A.S criteria for the first arrow are not met, as determined in decision block 2516, the currency is not a good candidate for a trade at this time as indicated by block 2504. If, however, the A.S. criteria are met, as determined in decision block 2516, the currency is a strong candidate for a trade as indicated by block 2518.

The present invention can be implemented on a computer having the following specifications:

| | |
|---|---|
| Operating System: | Windows 98/ME/2000/XP/NT 4.0 (Service Pack 3) |
| RAM: | Minimum - 64 MB |
| | Recommended - 128 MB |
| Processor: | Minimum - 333 MHz Pentium II |
| | Recommended - 500 MHz Pentium III or compatible |
| CD-Rom Available Hard Disk Space: | 25 MB |
| Internet Connection: | DSL, Cable modem, T1, or ISDN is the preferred connection. 56K modem will work, but a connect speed of over 49K is recommended. You may experience slow throughput and updates with a connect speed lower then 49K. |
| Data Feed: | Level I or Level II |

It will be apparent that other programs are readily devised to create charts of the type described and that some commercially available charting programs can be adapted to display only the charts and not the trade indicators. It is not intended that the invention be limited to the particular format shown in FIGS. 1 through 25. As described above, Applicant's invention comprises the development of indicators and their display in such a manner that traders can anticipate price trends and trades using the cross over method signaling buys and sells opportunities.

What is claimed is:

1. A computerized method for determining and displaying trading trends comprising the steps of:

obtaining market information for a currency pair for a time period, wherein the market information comprises at least (a) a first set of market data for the currency pair based on a series of consecutive first time intervals within the time period comprising a first opening value and a first closing value for each consecutive first time interval, (b) a second set of market data for the currency pair based on a series of consecutive second time intervals within the time period comprising a second opening value and a second closing value for each consecutive second time interval, and (c) the first time interval is not equal to the second time interval;

calculating a first opening value trend for the first time intervals using a market trend indicator and the first opening values for the currency pair, and a second opening value trend for the second time intervals using the market trend indicator and the second opening values for the currency pair;

calculating a first closing value trend for the first time intervals using the market trend indicator and the first closing values for the currency pair, and a second closing value trend for the second time intervals using the market trend indicator and the second closing values for the currency pair;

simultaneously displaying in real-time at least a first visual favorable/unfavorable trade indicator for the first time intervals and a second visual favorable/unfavorable trade indicator for the second time intervals, wherein the first time intervals are not equal to the second time intervals;

wherein the first visual favorable/unfavorable trade indicator for the first time intervals is based on a comparison of the first opening value trend to the first closing value trend for the currency pair, wherein the first visual favorable/unfavorable trade indicator is a first color whenever the first closing value trend is greater than the first opening value trend and the first visual favorable/unfavorable trade indicator is a second color whenever the first closing value trend is lower than the first opening value trend;

wherein the second visual favorable/unfavorable trade indicator for the second time intervals is based on a comparison of the second opening value trend to the second closing value trend for the currency pair, wherein the second visual favorable/unfavorable trade indicator is the first color whenever the second closing value trend is greater than the second opening value trend and the second visual favorable/unfavorable trade indicator is the second color whenever the second closing value trend is lower than the second opening value trend;

wherein the first and second visual favorable/unfavorable trade indicators signal whether it will be favorable or unfavorable to execute a trade involving the currency pair for the respective time intervals; and wherein the forgoing steps are executed by a computer.

2. The method as recited in claim 1, wherein the opening value is an opening price and the closing value is a closing price.

3. The method as recited in claim 1, wherein the opening value is an opening trading volume and the closing value is a closing volume.

4. The method as recited in claim 1, wherein the first color is green.

5. The method as recited in claim 1, wherein the second color is red.

6. The method as recited in claim 1, wherein the first visual favorable/unfavorable trade indicator displays the first time interval and the second visual favorable/unfavorable trade indicator displays the second time interval.

7. The method as recited in claim 1, further comprising the step of displaying the first opening value trend as a first line and the first closing value trend as a second line in a graph.

8. The method as recited in claim 7, further comprising the step of displaying a list of information about a point selected on either the first line or the second line.

9. The method as recited in claim 1, wherein the market trend indicator comprises one or more regression algorithms selected from: stochastics, relative strength, directional movement, commodity channel, simple average, exponential average, weighted average, MACD (simple), MACD (exponential), momentum/ROC, midrange, William's %R, parabolic stop, volatility stop, trailing stop, high low stop, Bollinger Bands, Keltner Channel, uniform channel, regression channel, swing lines, cycle forecast, on balance volume, overlay chart, point & figure, moving average, moving linear regression, upper envelope, lower envelope, % K, % D, % D slow, %D averaged, % R, RSI, momentum, acceleration, moving average oscillator, moving average momentum, moving average convergence-divergence oscillator, moving average convergence-divergence, MACD signal line, commodity channel index, rate of change in prices, on balance volume variance, standard deviation, volatility ratio, volatility, skew, kurtosis, Williams Accumulated Distribution, Arm's Ease of Movement, plus directional indicator, minus directional indicator, directional movement and average directional movement.

10. The method as recited in claim 1, wherein the first opening value trend is calculated without using the first opening value from the most recent first time interval within the time period.

11. The method as recited in claim 1, further comprising the steps of:
selecting a market information source; and
communicably connecting to the market information source.

12. The method as recited in claim 1, further comprising the step of executing a trade involving the currency pair.

13. The method as recited in claim 1, further comprising the step of simulating an execution of a trade involving the currency pair.

14. The method as recited in claim 1, further comprising the step of calculating a potential tax liability for an execution of a trade involving the currency pair.

15. The method as recited in claim 1, further comprising the step of searching for one or more investment trading opportunities based on one or more search criteria.

16. The method as recited in claim 1, further comprising the step of selecting the first time interval or the second time interval.

17. The method as recited in claim 1, wherein the first time interval is a first preset time interval and the second time interval is a second preset time interval based on a user profile.

18. The method as recited in claim 1, further comprising the step of repeating the steps of obtaining the market information, calculating the opening value trends and the closing value trends, and displaying the visual favorable/unfavorable trade indicators for a set of different time intervals.

19. The method as recited in claim 18, wherein the set of different time intervals comprises five minutes, ten minutes, fifteen minutes and thirty minutes.

20. The method as recited in claim 1, further comprising the step of repeating the steps of obtaining the market information, calculating the opening value trends and the closing value trends, and displaying the visual favorable/unfavorable trade indicators for one or more other currency pairs.

21. The method as recited in claim 1, further comprising the step of updating the opening values, the closing values, the opening value trends, the closing value trends and the visual favorable/unfavorable trade indicators.

22. The method as recited in claim 21, further comprising the step of signaling a user whenever any of the visual favorable/unfavorable trade indicators change.

23. A computer program embodied in a computer readable medium that is executed by a computer for determining and displaying trading trends comprising:
obtaining market information for a currency pair for a time period, wherein the market information comprises at least (a) a first set of market data for the currency pair based on a series of consecutive first time intervals within the time period comprising a first opening value and a first closing value for each consecutive first time interval, (b) a second set of market data for the currency pair based on a series of consecutive second time intervals within the time period comprising a second opening value and a second closing value for each consecutive second time interval, and (c) the first time interval is not equal to the second time interval;
calculating a first opening value trend for the first time intervals using a market trend indicator and the first opening values for the currency pair, and a second opening value trend for the second time intervals using the market trend indicator and the second opening values for the currency pair;
calculating a first closing value trend for the first time intervals using the market trend indicator and the first closing values for the currency pair, and a second closing value trend for the second time intervals using the market trend indicator and the second closing values for the currency pair;
simultaneously displaying in real-time at least a first visual favorable/unfavorable trade indicator for the first time intervals and a second visual favorable/unfavorable trade indicator for the second time intervals, wherein the first time intervals are not equal to the second time intervals;
wherein the first visual favorable/unfavorable trade indicator for the first time intervals is based on a comparison of the first opening value trend to the first closing value trend for the currency pair, wherein the first visual favorable/unfavorable trade indicator is a first color whenever the first closing value trend is greater than the first opening value trend and the first visual favorable/unfavorable trade indicator is a second color whenever the first closing value trend is lower than the first opening value trend;
wherein the second visual favorable/unfavorable trade indicator for the second time intervals is based on a comparison of the second opening value trend to the second closing value trend for the currency pair, wherein the second visual favorable/unfavorable trade indicator is the first color whenever the second closing value trend is greater than the second opening value trend and the second visual favorable/unfavorable trade indicator is the second color whenever the second closing value trend is lower than the second opening value trend; and
wherein the first and second visual favorable/unfavorable trade indicators signal whether it will be favorable or unfavorable to execute a trade involving the currency pair for the respective time intervals.

24. The computer program as recited in claim 23, further comprising displaying the first opening value trend as a first line and the first closing value trend as a second line in a graph.

25. The computer program as recited in claim 24, further comprising displaying a list of information about a point selected on either the first line or the second line.

26. The computer program as recited in claim 23, wherein the market trend indicator comprises one or more regression algorithms selected from: stochastics, relative strength, directional movement, commodity channel, simple average, exponential average, weighted average, MACD (simple), MACD (exponential), momentum/ROC, midrange, William's %R, parabolic stop, volatility stop, trailing stop, high low stop, Bollinger Bands, Keltner Channel, uniform channel, regression channel, swing lines, cycle forecast, on balance volume, overlay chart, point & figure, moving average, moving linear regression, upper envelope, lower envelope, % K, % D, % D slow, % D averaged, % R, RSI, momentum, acceleration, moving average oscillator, moving average momentum, moving average convergence-divergence oscillator, moving average convergence-divergence, MACD signal line, commodity channel index, rate of change in prices, on balance volume variance, standard deviation, volatility ratio, volatility, skew, kurtosis, Williams Accumulated Distribution, Arm's Ease of Movement, plus directional indicator, minus directional indicator, directional movement and average directional movement.

27. The computer program as recited in claim 23, further comprising:
  selecting a market information source; and
  communicably connecting to the market information source.

28. The computer program as recited in claim 23, further comprising executing a trade involving the currency pair.

29. The computer program as recited in claim 23, further comprising simulating an execution of a trade involving the currency pair.

30. The computer program as recited in claim 23, further comprising calculating a potential tax liability for an execution of a trade involving the currency pair.

31. The computer program as recited in claim 23, further comprising searching for one or more investment trading opportunities based on one or more search criteria.

32. The computer program as recited in claim 23, further comprising selecting the first time interval or the second time interval.

33. The computer program as recited in claim 25, further comprising repeating the steps of obtaining the market information, calculating the opening value trends and the closing value trends, and displaying the visual favorable/unfavorable trade indicators for a set of different time intervals.

34. The computer program as recited in claim 23, further comprising repeating the steps of obtaining the market information, calculating the opening value trends and the closing value trends, and displaying the visual favorable/unfavorable trade indicators for one or more other currency pairs.

35. The computer program as recited in claim 23 further comprising updating the opening values, the closing values, the opening value trends, the closing value trends and the visual favorable/unfavorable trade indicators.

36. The computer program as recited in claim 35 further comprising signaling a user whenever any of the visual favorable/unfavorable trade indicators change.

37. An apparatus for determining and displaying trading trends comprising:
  a computer communicably connected to a market information source;
  a display communicably connected to the computer; and
  the computer (1) obtaining market information for a currency pair for a time period, wherein the market information comprises at least (a) a first set of market data for the currency pair based on a series of consecutive first time intervals within the time period comprising a first opening value and a first closing value for each consecutive first time interval, (b) a second set of market data for the currency pair based on a series of consecutive second time intervals within the time period comprising a second opening value and a second closing value for each consecutive second time interval, and (c) the first time interval is not equal to the second time interval, (2) calculating a first opening value trend for the first time intervals using a market trend indicator and the first opening values for the currency pair, and a second opening value trend for the second time intervals using the market trend indicator and the second opening values for the currency pair, (3) calculating a first closing value trend for the first time intervals using the market trend indicator and the first closing values for the currency pair, and a second closing value trend for the second time intervals using the market trend indicator and the second closing values for the currency pair, and (4) simultaneously displaying in real-time at least a first visual favorable/unfavorable trade indicator for the first time intervals and a second visual favorable/unfavorable trade indicator for the second time intervals, wherein the first time intervals are not equal to the second time intervals and the first visual favorable/unfavorable trade indicator for the first time intervals is based on a comparison of the first opening value trend to the first closing value trend for the currency pair, wherein the first visual favorable/unfavorable trade indicator is a first color whenever the first closing value trend is greater than the first opening value trend and the first visual favorable/unfavorable trade indicator is a second color whenever the first closing value trend is lower than the first opening value trend, the second visual favorable/unfavorable trade indicator for the second time intervals is based on a comparison of the second opening value trend to the second closing value trend for the currency pair, wherein the second visual favorable/unfavorable trade indicator is the first color whenever the second closing value trend is greater than the second opening value trend and the second visual favorable/unfavorable trade indicator is the second color whenever the second closing value trend is lower than the second opening value trend, and the first and second visual favorable/unfavorable trade indicators signal whether it will be favorable or unfavorable to execute a trade involving the currency pair for the respective time intervals.

* * * * *

UNITED STATES PATENT AND TRADEMARK OFFICE
CERTIFICATE OF CORRECTION

| | | |
|---|---|---|
| PATENT NO. | : 7,827,090 B2 | Page 1 of 1 |
| APPLICATION NO. | : 10/691257 | |
| DATED | : November 2, 2010 | |
| INVENTOR(S) | : George Thompson and Greg Schardt | |

It is certified that error appears in the above-identified patent and that said Letters Patent is hereby corrected as shown below:

On the Title page

Item 75 - 2nd listed inventor name:

Replace "George Schardt, Plano, TX (US)" with Greg Schardt, Plano TX (US)

Signed and Sealed this
Ninth Day of August, 2011

David J. Kappos
*Director of the United States Patent and Trademark Office*